(12) United States Patent
Lipscomb et al.

(10) Patent No.: US 11,013,211 B2
(45) Date of Patent: May 25, 2021

(54) METHOD FOR MAKING EXTRUDED GRANULAR ABSORBENT AND CLUMPING GRANULAR ABSORBENT PRODUCT

(71) Applicant: Pioneer Pet Products, LLC, Cedarburg, WI (US)

(72) Inventors: John M. Lipscomb, Cedarburg, WI (US); Omar I. Rodriguez, Cedarburg, WI (US); Chad C. Berge, Menomonee Falls, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 16/479,372

(22) PCT Filed: Jan. 30, 2018

(86) PCT No.: PCT/US2018/015912
§ 371 (c)(1),
(2) Date: Jul. 19, 2019

(87) PCT Pub. No.: WO2018/140929
PCT Pub. Date: Aug. 2, 2018

(65) Prior Publication Data
US 2019/0350162 A1    Nov. 21, 2019

Related U.S. Application Data

(63) Continuation-in-part of application No. 15/114,069, filed as application No. PCT/US2015/001269 on Jul. 25, 2016, now Pat. No. 10,882,238.

(60) Provisional application No. 62/452,348, filed on Jan. 30, 2017, provisional application No. 62/452,981, filed on Jan. 31, 2017, provisional application No. 61/931,609, filed on Jan. 25, 2014, provisional application No. 61/952,133, filed on Mar. 12, 2014.

(51) Int. Cl.
*A01K 1/01* (2006.01)
*A01K 1/015* (2006.01)
*B01J 20/24* (2006.01)
*B01J 20/30* (2006.01)
*B29B 9/06* (2006.01)
*B29B 9/12* (2006.01)
*B29B 9/16* (2006.01)
*F26B 17/10* (2006.01)

(52) U.S. Cl.
CPC ............. *A01K 1/0155* (2013.01); *B01J 20/24* (2013.01); *B01J 20/3007* (2013.01); *B29B 9/06* (2013.01); *B29B 9/12* (2013.01); *B29B 9/16* (2013.01); *B01J 2220/4831* (2013.01); *B29B 2009/166* (2013.01); *F26B 17/101* (2013.01)

(58) Field of Classification Search
CPC ......... A01K 1/01; A01K 1/0155; B01J 20/24; B01J 20/3007; B01J 2220/4831; Y02P 20/588; B29B 9/06; B29B 9/12; B29B 9/16; B29B 2009/166; F26B 17/101
USPC ........................................................ 502/404
See application file for complete search history.

(56) References Cited

U.S. PATENT DOCUMENTS

| 2011/0185977 A1 | 8/2011 | Dixon |
| 2013/0213312 A1 | 8/2013 | Wang et al. |

FOREIGN PATENT DOCUMENTS

| JP | 2015 532829 | 11/2015 |
| WO | 2015113006 | 7/2015 |
| WO | 2016146518 | 9/2016 |

*Primary Examiner* — Edward M Johnson
(74) *Attorney, Agent, or Firm* — Boyle Fredrickson S.C.

(57) ABSTRACT

A method of making an extruded granular absorbent is provided where the method includes providing an extruder and a starch-containing admixture, and pressurizing the starch containing admixture in the extruder under relatively high extrusion pressures to extrude the pressurized starch-containing admixture from the extruder, and producing a water absorbent and oil absorbent extrudate. The present invention further provides that the extruded granular absorbent may be combined with a non-extruded granular material with relatively high inert or cellulose content where there may be a greater proportion of extruded granular absorbent, and the extruded granular absorbent and non-extruded granular material agglutinate into a clump when wetted with water or urine.

46 Claims, 12 Drawing Sheets

| Product | Component % weight | Component % weight | Clumping Weight (20 mL delivery) (g) | Clumping Diameter (20 mL delivery) (inches) |
|---|---|---|---|---|
| | Paper (Biodac 8/16) | Sorb Up | | |
| Paper 100% | 100 | 0 | Does Not Clump | Does Not Clump |
| Paper / Sorb Up (80/20 Trial 1) | 80 | 20 | 51.2 | 1.30 |
| Paper / Sorb Up (80/20 Trial 2) | 80 | 20 | 50.2 | 1.32 |
| Paper / Sorb Up (80/20 Trial 3) | 80 | 20 | 51.8 | 1.37 |
| Paper / Sorb Up (80/20 Trial 4) | 80 | 20 | 50.2 | 1.38 |
| Mean | | | 50.85 | 1.34 |
| Paper / Sorb Up (75/25 Trial 1) | 75 | 25 | 48.6 | 2.07 |
| Paper / Sorb Up (75/25 Trial 2) | 75 | 25 | 48.5 | 1.74 |
| Paper / Sorb Up (75/25 Trial 3) | 75 | 25 | 47.2 | 1.88 |
| Paper / Sorb Up (75/25 Trial 4) | 75 | 25 | 48.6 | 1.92 |
| Mean | | | 48.225 | 1.90 |
| Paper / Sorb Up (70/30 Trial 1) | 70 | 30 | 46 | 2.00 |
| Paper / Sorb Up (70/30 Trial 2) | 70 | 30 | 48.2 | 1.69 |
| Paper / Sorb Up (70/30 Trial 3) | 70 | 30 | 45.2 | 1.90 |
| Paper / Sorb Up (70/30 Trial 4) | 70 | 30 | 49 | 1.83 |
| Mean | | | 47.1 | 1.85 |
| | Corn Cob | Sorb Up | | |
| Corn Cob 100% | 100 | 0 | Does Not Clump | Does Not Clump |
| Corn Cob / Sorb Up (80/20 Trial 1) | 80 | 20 | 48.6 | 1.94 |
| Corn Cob / Sorb Up (80/20 Trial 2) | 80 | 20 | 49.5 | 2.00 |
| Corn Cob / Sorb Up (80/20 Trial 3) | 80 | 20 | 48.9 | 1.81 |
| Corn Cob / Sorb Up (80/20 Trial 4) | 80 | 20 | 47.8 | 1.93 |

Figure 3A

| | | | |
|---|---|---|---|
| Mean | | 48.7 | 1.92 |
| | | | |
| Corn Cob / Sorb Up (75/25 Trial 1) | 75 | 25 | 46.2 | 1.88 |
| Corn Cob / Sorb Up (75/25 Trial 2) | 75 | 25 | 46.7 | 1.85 |
| Corn Cob / Sorb Up (75/25 Trial 3) | 75 | 25 | 46 | 1.75 |
| Corn Cob / Sorb Up (75/25 Trial 4) | 75 | 25 | 49.1 | 1.72 |
| Mean | | | 47 | 1.80 |
| | | | | |
| Corn Cob / Sorb Up (70/30 Trial 1) | 70 | 30 | 45.6 | 2.07 |
| Corn Cob / Sorb Up (70/30 Trial 2) | 70 | 30 | 47 | 1.89 |
| Corn Cob / Sorb Up (70/30 Trial 3) | 70 | 30 | 45.6 | 1.95 |
| Corn Cob / Sorb Up (70/30 Trial 4) | 70 | 30 | 45.2 | 1.96 |
| Mean | | | 45.85 | 1.97 |

Method References: GHL II-1016, II-1015, II-1012, II-1013, II-1014

Tested by: BS and CB

Date: 20160926

Figure 3B

| Clumping Depth (20 mL Delivery) (inches) | Clump Drop Strength (20 mL, 1 day) (grams pre-drop) | Clump Drop Strength (20 mL, 1 day) (grams post-drop) | Clump Drop Strength (20 mL, 1 day) (% retained) | Clump Piercing Strength (1 day) (N) | Bulk Density (g/(US dry pint)) |
|---|---|---|---|---|---|
| Does Not Clump | Does Not Clump | Does Not Clump | Does Not Clump | Does Not Clump | 360.9 |
| 2.83 | 44.2 | 26.1 | 59.0 | 2.5 | 366.6 |
| 2.99 | 45.8 | 24.0 | 52.4 | 1 | 365.2 |
| 3.03 | 47.8 | 31.5 | 65.9 | 1.5 | 360.9 |
| 3.12 | 45.5 | 28.7 | 63.1 | 1.5 | 363 |
| 3.00 | 45.8 | 27.6 | 60.1 | 1.625 | 363.925 |
| 1.79 | 43.4 | 42.9 | 98.8 | 6 | 355.5 |
| 1.91 | 43.9 | 43.0 | 97.9 | 4.5 | 352.6 |
| 1.74 | 42.6 | 42.0 | 98.6 | 4 | 356.7 |
| 1.74 | 43.9 | 43.3 | 98.6 | 4 | 355.5 |
| 1.79 | 43.5 | 42.8 | 98.5 | 4.625 | 355.075 |
| 1.68 | 41.7 | 41.1 | 98.6 | 5 | 350.1 |
| 2.27 | 43.7 | 42.6 | 97.5 | 2 | 352.6 |
| 1.58 | 41.3 | 40.8 | 98.8 | 5 | 350.3 |
| 2.21 | 43.8 | 43.1 | 98.4 | 3.5 | 348.5 |
| 1.93 | 42.6 | 41.9 | 98.3 | 3.875 | 350.375 |
| Does Not Clump | Does Not Clump | Does Not Clump | Does Not Clump | Does Not Clump | 277.2 |
| 2.81 | 38.7 | 10.2 | 26.4 | <1 | 267.2 |
| 2.83 | 44.7 | 14.6 | 32.7 | <1 | 268.1 |
| 2.87 | 43.7 | 8.2 | 18.8 | <1 | 267.5 |
| 2.41 | 42.7 | 16.2 | 37.9 | <1 | 279 |

Figure 3C

| 2.73 | 42.5 | 12.3 | 28.9 | #DIV/0! | 270.45 |
|---|---|---|---|---|---|
| 2.45 | 42.0 | 8.6 | 20.5 | <1 | 268.8 |
| 2.53 | 42.5 | 18.8 | 44.2 | <1 | 269.2 |
| 2.72 | 41.8 | 13.0 | 31.1 | <1 | 268.4 |
| 3.02 | 43.1 | 20.7 | 48.0 | <1 | 279 |
| 2.68 | 42.4 | 15.3 | 36.0 | #DIV/0! | 271.35 |
| 2.07 | 41.4 | 27.2 | 65.7 | 1.5 | 267.8 |
| 2.49 | 42.1 | 19.8 | 47.0 | 1.5 | 268.2 |
| 2.41 | 41.3 | 28.1 | 68.0 | 2 | 268.4 |
| 2.20 | 40.8 | 26.9 | 65.9 | 1.5 | 279 |
| 2.29 | 41.4 | 25.5 | 61.7 | 1.625 | 270.85 |

Figure 3D

| Bulk Density (lbs/ft³) | Moisture (%) | Sample Weight Sieved (g) | Retained On Sieve #10 (g) | Retained On Sieve #18 (g) | Retained On Sieve #100 (g) | Retained On Pan (g) | Sieve Recovery Weight Sieved (g) | Tare Sieve #10 (g) | Tare Sieve #18 (g) |
|---|---|---|---|---|---|---|---|---|---|
| 40.92 | 2.57 | | | | | | | | |
| 41.57 | 3.40 | 306.9 | 1035.8 | 1187.8 | 581.6 | 1088.6 | 307 | 1024.8 | 927.2 |
| 41.41 | 3.05 | | | | | | | | |
| 40.92 | 3.26 | | | | | | | | |
| 41.16 | | | | | | | | | |
| 41.27 | 3.24 | | | | | | | | |
| 40.31 | 3.77 | 303.1 | 1035.1 | 1171.7 | 594.8 | 1088.7 | 303.5 | 1024.8 | 927.2 |
| 39.98 | 3.76 | | | | | | | | |
| 40.45 | 3.72 | | | | | | | | |
| 40.31 | | | | | | | | | |
| 40.26 | 3.75 | | | | | | | | |
| 39.70 | 4.59 | 305.5 | 1035.2 | 1176.2 | 592.6 | 1088.6 | 305.8 | 1024.8 | 927.2 |
| 39.98 | 4.07 | | | | | | | | |
| 39.72 | 4.29 | | | | | | | | |
| 39.52 | | | | | | | | | |
| 39.73 | 4.32 | | | | | | | | |
| 31.43 | 7.58 | | | | | | | | |
| 30.30 | 7.25 | 309.2 | 1026.1 | 1103.2 | 678.4 | 1088.7 | 309.6 | 1024.8 | 927.2 |
| 30.40 | 7.33 | | | | | | | | |
| 30.33 | 7.28 | | | | | | | | |
| 31.64 | | | | | | | | | |

Figure 3E

| 30.67 | | 7.29 | | | | | | | |
|---|---|---|---|---|---|---|---|---|---|
| 30.48 | | 7.33 | | 295.2 | 1025.7 | 1086.6 | 681.2 | 1088.7 | 295.4 | 1024.8 | 927.2 |
| 30.52 | | 7.38 | | | | | | | |
| 30.43 | | 7.29 | | | | | | | |
| 31.64 | | | | | | | | | |
| 30.77 | | 7.33 | | | | | | | |
| 30.37 | | 6.97 | | 296.5 | 1025.7 | 1091.1 | 678 | 1088.7 | 296.7 | 1024.8 | 927.2 |
| 30.41 | | 7.23 | | | | | | | |
| 30.43 | | 7.18 | | | | | | | |
| 31.64 | | | | | | | | | |
| 30.71 | | 7.13 | | | | | | | |

Figure 3F

| Tare Sieve # 100 (g) | Tare Pan (g) | Sieve Recovery Difference (g) | Sieve Recovery Difference (%) | Above Sieve #10 (%) | Above Sieve #18 (%) | Above Sieve #100 (%) | On Pan (< 0.5 %) | Total (% weight) |
|---|---|---|---|---|---|---|---|---|
| 546.5 | 1088.3 | 0.1 | 0.032583904 | 3.6 | 84.9 | 11.4 | 0.1 | 100 |
| 546.5 | 1088.3 | 0.4 | 0.131969647 | 3.4 | 80.6 | 15.9 | 0.1 | 100 |
| 546.5 | 1088.3 | 0.3 | 0.098199673 | 3.4 | 81.4 | 15.1 | 0.1 | 100 |
| 546.5 | 1088.3 | 0.4 | 0.129366106 | 0.4 | 56.8 | 42.6 | 0.1 | 100 |

Figure 3G

| 546.5 | 1088.3 | 0.2 | 0.067750678 | 0.3 | 54.0 | 45.6 | 0.1 | 100 |
| 546.5 | 1088.3 | 0.2 | 0.067453626 | 0.3 | 55.2 | 44.3 | 0.1 | 100 |

Figure 3H

METHOD FOR MAKING EXTRUDED GRANULAR ABSORBENT AND CLUMPING GRANULAR ABSORBENT PRODUCT

FIELD

The present invention is directed to an optimized system and method for making extruded granular absorbent and more particularly to a system and method of making extruded granular absorbent under relatively high extrusion pressures producing more repeatably consistent absorbent extrudate. The present invention is further directed to a self-clumping granular absorbent blend of extruded granular absorbent and non-extruded granular filler, and more particularly to such a granular absorbent product composed of a blend having a high-percentage of non-extruded granular filler blended with extruded granular absorbent.

INTRODUCTION

Litters have evolved over the centuries, utilizing materials such as ash, paper, sand, sawdust, and other mediums into the modern era, where clay has become a centerpiece. Clay is a relatively dirt cheap option for litter usage, although it is also a relatively heavy product with potentially hazardous airborne dust containing crystalline silica.

Due to the heavy, hazardous, and non-biodegrading nature of this mainstream product, there has been a push by consumers for the industry to create a lighter, clumping, natural, biodegradable, renewably resourced, non-dusting, and economical option to use.

While historical attempts have been made to create lighter clumping litters through extruded blend combinations containing starch, none of those attempts have maximized the properties of starch that allows for the production of a clumping absorbent litter that can start from a single raw starch material and result in a stand-alone derivative that clumps without adding other ingredients. Other attempts to utilize starch based extruded materials for litter purposes have focused on the addition of starch material as a lightweight diluent that has plasticity forming dynamics through extrusion; the starch provides a medium that could be extruded and pelletized, while requiring other materials such as clay, polymers, or gums to be present in order to obtain clumping properties.

The present invention has maximized the properties of starch in ways that have not been applied before, yielding a product that is lightweight, natural, biodegradable, and self-clumping; a product that is so strong in performance, its activity can be diluted by other non-clumping carriers and diluents while still meeting the high expectations that the public has been looking for.

In addition, while many attempts have been made in the past to produce granular absorbent through extrusion of starch-containing material, very few have been commercially successful to date. This includes past efforts to produce an extruded granular absorbent well suited for use as animal, pet or cat litter.

Examples of such prior efforts to make extruded litter are disclosed in Sotillo, U.S. Pat. No. 6,220,206 ("'206 patent"), Fuchshuber, U.S. Patent Application Publication No. US 20100269758 A1 ("'758 publication"), and Dixon et al., U.S. Patent Application Publication No. US 20110185977 A1 ("'977 publication"). While each reference discloses a method of making extruded granular absorbent that purports to be suitable for use as cat, pet or animal litter, post-extrusion conditions including post-extrusion processing disclosed in each reference adversely affects one or more characteristics and/or properties of the litter undesirably adversely impacting performance of the litter.

The '206 patent discloses extruding an admixture composed of grain milling byproducts containing enough starch to form at least 30% gelatinized starch in each extruded pellet during extrusion with the gelatinized starch serving as a binder that keeps each extruded pellet from breaking apart. After extrusion, the '206 patent further discloses milling of the extruded pellets using a hammer mill into smaller particles with at least two different particle sizes that have a rough surface to enhance absorption by increasing the amount of the surface area available to absorb animal urine. Milling of the extruded pellets is done prior to drying them to minimize creation of dust. After milling, the '206 patent further teaches drying the extruded particles using heated air having a temperature of greater than 100 degrees Celsius until moisture content is reduced to between about 2% and about 10% by weight.

Unfortunately, even where post-extrusion milling of the extruded pellets is not performed, drying the pellets using heated air having a temperature greater than 100 degrees Celsius relatively rapidly retrogrades starch in the pellets reducing urine absorption capacity. Where hammer milling is performed before drying while the pellets are still moist to minimize dusting, post-extrusion hammer milling of the pellets not only physically modifies starch in a manner that reduces absorption, but hammer milling also simultaneously heats up the pellets thermally modifying starch in a manner causing absorption-reducing retrogradation. Absorption is even further reduced during hot air drying after hammer milling because of additional starch retrogradation taking place. The result is that post-extrusion processing performed in carrying out the litter making method disclosed in the '206 patent intended to enhance absorption actually has the unintended opposite effect of undesirably reducing absorption. The same is true with respect to any alleged or purported ability of litter of the '206 patent to form lumps when wetted.

The '758 publication discloses a somewhat similar litter making method where whole cereal grains are ground before being extruded into spheres which are then cooled using a cooler before being ground up using a roll mill to form an absorbing material purportedly suitable for use as animal litter. Though the spheres are cooled after extrusion before grinding them into absorbing material composed of smaller size particles using a roll mill, the relatively high moisture content of the spheres can lead to post-extrusion retrogradation of starch in the spheres which in turn can adversely impact the absorbing material formed of the ground spheres by reducing absorption and preventing clumping. Despite the spheres being cooled prior to grinding them into absorbing material, the roll mill nonetheless further adversely impacts absorption and clumping properties of the resultant absorbing material by both physically and thermally modifying and retrograding starches in the spheres being ground.

The '977 publication is directed to animal litter extruded from a mixture of starch-containing cereal grain and at least 10% clay producing extruded litter particles having clay throughout that fills in pores in the outer surface of the litter particles producing an outer film of clay and starch that prevents dust from forming. Despite the extruded litter particles containing at least 10% clay, the '977 publication teaches coating them with one or more swelling clays is what imparts a clumping property to the litter particles that enables them to clump when wetted. While the clay and starch film on the outer surface of the extruded litter particles is taught in the '977 publication as beneficial for preventing dust formation, a related counterpart, U.S. Pat. No. 8,733,287, acknowledges the film is undesirable because it decreases the absorption rate of the extruded litter particles and teaches the necessity of grinding the litter particles with a roller-equipped litter fragmenting device in order to fragment them in order to remove the film to increase absorption by exposing the interior of the litter particles.

U.S. Pat. Nos. 9,266,088, 9,266,089, 9,266,090 and 9,491,926 are each directed to an improved extruded granular absorbent well suited for use as litter and improved methods of making extruded granular absorbent where an admixture composed starch-containing material, preferably in the form of one or more cereal grains, is extruded from an extruder under conditions that modify at least some of the starch in the admixture forming a water soluble carbohydrate polymer binder that functions as a clumping agent to self-clump together pellets of the extruded granular absorbent. While the extruded granular absorbent to which these patents are directed has enjoyed substantial commercial success, improvements nonetheless remain desirable.

In this regard, it has been learned that moisture volatilized from pellets of the granular absorbent as the pellets are extruded from the extruder die and condenses on the outer surface of the extruded pellets detrimentally impacting one or more characteristics or properties of the extruded granular absorbent pellets adversely effecting granular absorbent performance, including when used as litter. It has been further learned that the condensed moisture adversely impacts pellet performance by undesirably affecting the state, structure, phase, or matrix of the starches in the extruded pellets in a manner that can cause the freshly extruded wet pellets to undesirably stick together right out of the extruder, can detrimentally reduce pellet absorption capacity, can undesirably increase bulk density, and can adversely impact the ability of the pellets to clump together when wetted with water or urine. It also has been learned that the excessive heat at which the pellets are extruded from the extruder die also can detrimentally affect the state, structure, phase, or matrix of the starches in the extruded pellets in a manner that also can adversely impact one or more such characteristics or properties of the pellets reducing their performance and effectiveness as a granular absorbent, particularly in litter applications. Finally, where any post-extrusion processing of the extruded granular absorbent is performed that involves physical contact, e.g., impact(s), mechanical engagement, e.g., crushing and/or compression, or other physical or thermal modification of the extruded pellets, such as what typically has occurred in the past when particle-size reduction has been performed on extruded pellets, it has been learned that such post-extrusion extruded granular absorbent processing carried out in performing such particle-size reduction can also adversely affect one or more of such properties or characteristics of the pellets even further detrimentally reducing their performance.

While there have been numerous attempts to produce a granular absorbent suitable for use as cat, animal or pet litter that is more natural and lighter in weight than conventional clay or silica-gel litter that also clumps when wetted by water, urine or moist fecal matter, commercial success has been difficult to achieve. It has proven a rather formidable challenge to produce such a lighter weight clay and silica-gel litter alternative that performs well enough for consumers to readily substitute in place of conventional clay and silica-gel litters.

While the marketplace abounds with many of so-called natural clay and silica-gel litter alternatives, very few pick up water and urine well and even fewer clump when wetted by water, urine or moist fecal matter. Types of natural litters presently on the market include litters composed of pine, recycled paper, corn cobs, corn, wheat, walnut shells and the like which typically have been ground up or otherwise comminuted into a desired reduced-size granular material having a consistency more suitable for litter usage.

While the more environmentally friendly makeup of such natural litters appeals to an ever-increasing number of present-day consumers, these natural litters must still perform well enough in comparison to conventional clay and silica-gel litters for consumers to keep purchasing and using them. During use, such natural litters often either do not absorb urine well or rapidly enough to prevent some urine from pooling on the bottom of the litter box which not only generates odors over time but which also is messy undesirably requiring more frequent litter box clean up than desired. Where such natural litters purport to be clumping, their clumps tend to lack good cohesion producing clumps that are crumbly possessing unacceptably poor clump retention making them difficult to scoop out without breaking apart and leaving spent or soiled litter behind in the litter box. To improve upon these and other deficiencies common to such so-called natural litters, chemical treatments are applied and/or chemical additives blended to improve absorption and/or facilitate clumping. Unfortunately, doing so not only makes it harder to market such litter as "natural" but it also can adversely impact its ability to biodegrade.

In other instances, lighter, lower costs filler materials can be blended not only with such natural litters but often are blended with conventional clay-based and silica-gel litters to make them lighter by reducing their bulk density as well as to reduce cost. Unfortunately, such lighter weight cost reducing fillers are typically viewed as diluents because they almost always adversely impact litter performance as a result of reducing or diluting the concentration of the useful or effective litter particles. Such fillers or diluents can and typically do reduce the clumping ability of clay-containing or clay-based clumping litters and quite often also reduce the overall capacity of the litter to absorb water, urine and liquefied fecal matter.

What is needed is a system and method for making extruded granular absorbent that reduces and preferably minimizes such adverse moisture, temperature and mechanically induced changes to starch in extruded granular absorbent pellets following extrusion.

SUMMARY OF THE INVENTION

The present invention is directed to an optimized system and method for making extruded granular absorbent and more particularly to a system and method of making extruded granular absorbent under relatively high extrusion pressures producing more repeatably consistent absorbent extrudate.

The present invention also is directed to a system and method for making extruded granular absorbent with much higher filler content, and more particular directed to an extruded granular absorbent system and method well suited for use in producing an extruded granular absorbent blend which has a relatively high inert or cellulose content.

The present invention also is directed toward a natural and biodegradable self-clumping granular absorbent litter whose activity is derived completely through the controlled extrusion of starch based materials, and whose activity can also significantly enhance the clumping properties of other non-clumping, low cost, natural and biodegradable litter material diluents, such as corn cob granules, paper pellets, or other cellulose derivatives without other additives.

The present invention is further directed toward the production of a natural and biodegradable self-clumping litter product that is derived from a natural starch source, such as preferably a cereal grain source, and which includes inert diluents such as corn cob granules, glass balls, glass pellets, glass beads, glass particles, plastic balls, plastic beads, plastic pellets, plastic pieces, minerals, paper granules, paper pellets, paper particles, other cellulose-containing or other cellulosic granules, pellets, balls, particles without requiring other adhesive or binder additives other than what is produced by physical and/or thermal modification of starches in an extruder during extrusion.

Various other features, advantages, and objects of the present invention will be made apparent from the following detailed description and any appended drawings.

DRAWINGS DESCRIPTION

One or more preferred exemplary embodiments of the invention are illustrated in the accompanying drawings in which like reference numerals represent like parts throughout and in which:

FIG. 1 is a schematic diagram of a first preferred but exemplary embodiment of an extruded granular absorbent manufacturing system constructed in accordance with the present invention in carrying out a preferred but exemplary method of making and post-extrusion processing of the extruded granular absorbent where extruded granular absorbent pellets are cold-processed upon extrusion and while being conveyed to a post-extrusion pellet processing subsystem that includes a device or machine that comminutes the pellets to improve at least one property or characteristic thereof in preparing the pellets for use or inclusion in a finished extruded granular absorbent product intended for retail, consumer or commercial sale and use; and FIG. 2 is a schematic diagram of a second preferred embodiment of an extruded granular absorbent manufacturing system constructed in accordance with the present invention in carrying out a preferred method of making and post-extrusion processing of the extruded granular absorbent where extruded granular absorbent pellets are cold-processed upon extrusion and while being conveyed to a post-extrusion pellet processing subsystem that includes a pellet size reduction comminution device that size reduces extruded pellets in a manner that produces a finished extruded granular absorbent product composed of as-extruded pellets, size-reduced pellets and even smaller fines produced from comminuting as-extruded pellets where the pellets and fines all have a particle size falling within a desired particle size range and/or particle size distribution.

FIG. 3A-3H is an 8-page data table showing various clump shape, size, and strength characteristics of clumps formed of various ratios of (a) absorbent extrudate granules extruded under ultrahigh extrusion pressure(s) from a sorghum admixture as disclosed below, and granules of cellulose or cellulosic material disclosed below, and (b) absorbent extrudate granules extruded under ultrahigh extrusion pressure(s) from a sorghum admixture as disclosed below, and granules of corn cob material, e.g., ground or comminuted corn cobs as disclosed below.

Figure 1:
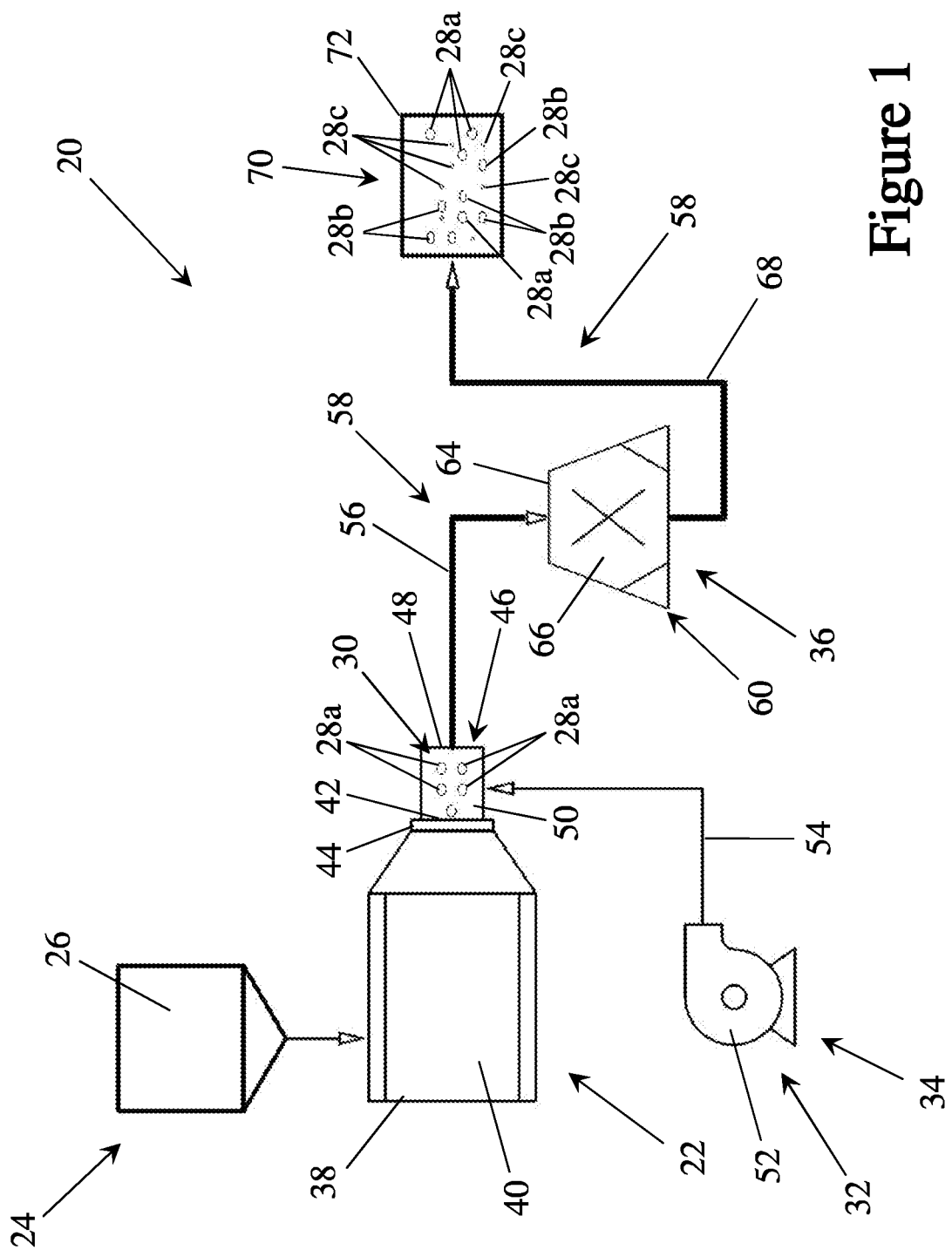

Before explaining one or more embodiments of the invention in detail, it is to be understood that the invention is not limited in its application to the details of construction and the arrangement of the components set forth in the following description or illustrated in any appended drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

At the core of understanding the inventive or novel extruded granular absorbent product's functionality is the fact that starch and water naturally adhere to each other through hydrogen bonding, or more descriptively, the intermolecular electrostatic force of attraction that is created between the hydrogen bound to an electronegative atom on one molecule to another electronegative atom from another molecule. The partially positive potential of the hydrogen atom extended out from the hydroxyl groups in a starch molecule are drawn toward the free electrons of the partially negative charge of oxygen atoms from the hydroxyl groups of neighboring starch molecules. The molecules then act like magnetic zipper or VELCRO as neighboring molecules come together.

As water enters this microscopic molecular world of starch interaction, water is a small hydroxyl group penetrant solvent that has enough penetrating power to overcome the starch to starch hydrogen bonding that had originally existed. This penetrating and separating characteristic of water with starch is one of the specific areas where a lot of previous attempts at lightweight starch based litter through extrusion have failed to apply a deeper hydrogen bond understanding to inherently produce a self-contained clumping nature. By adding other materials and/or large amounts of heat, the starch that may have been opened up through extrusion means actually becomes cross covalently bound on itself, caging the mobility of starch that is needed for the purposes of self-clumping after extrusion.

Another unique characteristic of this production process is the relatively low level of water that is present during extrusion, the purpose of which is to allow for very rapid solidification of the extruded material within a minimized time frame for plasticized surfaces to exist. Maintaining a very open and porous structure for fluid to penetrate is vital for a rapidly absorbent product.

The present invention also is directed to a system and method for making an improved extruded absorbent, preferably an improved extruded granular absorbent, from a starch-containing admixture using an ultrahigh extrusion pressure method of extrusion and extruder that extrudes the starch-containing admixture from the extruder at or under ultrahigh extrusion pressures believed not heretofore employed in starch, food, absorbent or adsorbent extrusion applications producing an improved absorbent extrudate in accordance with the present invention. While such an improved absorbent extrudate of the present invention can be in the form of one or more relatively long absorbent ropes, such as in the form substantially as extruded from the extruder, absorbent extrudate in accordance with the present invention preferably is broken up, such as by being divided, e.g., cut, into smaller absorbent pellets, and/or comminuted into even smaller-sized absorbent particles, upon or following extrusion from the extruder.

Such a system and method of the invention employs an ultrahigh pressure extruder, preferably a single screw extruder, which pressurizes a starch-containing admixture, containing at least 20% weight of starch, at least 30% weight of starch, at least 40 weight % of starch, preferably at least 50 weight % of starch, and more preferably at least 60 weight % of starch, by admixture weight, fed into the extruder to an ultrahigh extrusion pressure of at least 2000 pounds per square inch for a suitable residency time of at least about 5 seconds and no longer than about 25 seconds at a high enough extrusion temperature, of at least 80° Celsius, preferably at least 100° Celsius, in the extruder such that starch in the admixture is gelatinized in the extruder with at least some of the gelatinized starch modified, preferably physically modified, by or during ultrahigh pressure extrusion into an improved absorption modified starch contained in the extrudate extruded from the extruder which not only has an increased absorption capacity (absorbs at least one gram of water per gram of absorbent extrudate) but which also possesses a faster rate of absorption (of at least two grams of water per two grams of absorbent extrudate within no longer than twenty seconds, preferably within no longer than ten seconds, and more preferably within no longer than five seconds). In a method of making such an improved absorbent extrudate containing increased absorption modified starch, application of ultrahigh pressure to the starch-containing admixture in the extruder causes absorption-improving modification, preferably physical absorption-improving modification, of at least some of the starch of the admixture sufficient for the amount of absorption-increasing modified starch in the absorbent extrudate to not only significantly increase absorption capacity of the absorbent extrudate but which also significantly decreases absorption time.

In such an ultrahigh pressure extrusion system and method of the invention, extrusion of the starch-containing admixture at such an ultrahigh extrusion pressure from the extruder improves or increases the amount of water that can be picked up and retained by the absorbent extrudate by ultrahigh pressure extrusion causing at least plurality of pairs, i.e., at least three, of absorption-increasing and/or adsorption-increasing recesses, openings or pores to form in the outer surface of the absorbent extrudate. Such an ultrahigh pressure extrusion system and method preferably also results in at least a plurality, preferably at least a plurality of pairs, i.e., of spaced apart internal water pickup and retaining voids formed underneath the outer absorbent extrudate surface with at least one or more of the internal voids in liquid-flow communication with at least one or more of the recesses, openings or pores formed in the outer absorbent extrudate surface.

One preferred ultrahigh pressure extrusion system and method of the present invention results in at least a plurality, preferably at least a plurality of pairs of water-pickup capacity increasing recesses, opening or pores forming per square centimeter of surface area of the absorbent extrudate due to being extruded under ultrahigh pressure from the extruder. In such a preferred ultrahigh pressure extrusion system and method of the present invention results in at least a plurality, preferably at least a plurality of pairs of water-pickup capacity increasing internal voids forming per cubic centimeter of absorbent extrudate volume as a result of absorbent extrudate being extruded under ultrahigh pressure from the extruder.

Another preferred ultrahigh pressure extrusion system and method of the present invention results in at least a plurality, preferably at least a plurality of pairs of water-pickup capacity increasing recesses, opening or pores forming per ½ square centimeter of surface area of the absorbent extrudate due to being extruded under ultrahigh pressure from the extruder. In such a preferred ultrahigh pressure extrusion system and method of the present invention results in at least a plurality, preferably at least a plurality of pairs of water-pickup capacity increasing internal voids forming per cubic millimeter of absorbent extrudate volume as a result of absorbent extrudate being extruded under ultrahigh pressure from the extruder.

In one such system and method, ultrahigh pressure extrusion of such a starch-containing admixture at an ultrahigh extrusion pressure of at least 1850 PSI for a residency time within the extruder of at least five seconds and no longer than thirty seconds at a suitable extrusion temperature of at least 70° Celsius, preferably at least 80° Celsius, more preferably at least 90° Celsius, produces an absorbent extrudate in accordance with the present invention that not only readily picks up, e.g., absorbs water, such as urine, but which also has a relatively high capacity to pick up, e.g., adsorb oil. In another such system and method, ultrahigh pressure extrusion of such a starch-containing admixture at an ultrahigh extrusion pressure of at least 2000 PSI for a residency time within the extruder of at least eight seconds and no longer than twenty seconds at a suitable extrusion temperature of at least 80° Celsius, preferably at least 90° Celsius, more preferably at least 100° Celsius, produces an absorbent extrudate in accordance with the present invention that not only readily picks up, e.g., absorbs water, such as urine, and retains it, but which also has a relatively high capacity to pick up, e.g., adsorb oil. In a further such system and method, ultrahigh pressure extrusion of such a starch-containing admixture at an ultrahigh extrusion pressure of at least 2250 PSI for a residency time within the extruder of at least eight seconds and no longer than eighteen seconds at a suitable extrusion temperature of at least 80° Celsius, preferably at least 90° Celsius, more preferably at least 100° Celsius, produces an absorbent extrudate in accordance with the present invention that not only readily picks up, e.g., absorbs water, such as urine, and retains or hold it, but which also has a relatively high capacity to pick up, e.g., adsorb oil and retain or hold the oil. In still another such system and method, ultrahigh pressure extrusion of such a starch-containing admixture at an ultrahigh extrusion pressure of at least 2500 PSI for a residency time within the extruder of at least eight seconds and no longer than fifteen seconds at a suitable extrusion temperature of at least 80° Celsius, preferably at least 90° Celsius, more preferably at least 100° Celsius, produces an absorbent extrudate in accordance with the present invention that not only readily picks up, e.g., absorbs water, such as urine, and retains or hold it, but which also has a relatively high capacity to pick up, e.g., adsorb oil and retain or hold the oil. In yet another such system and method, ultrahigh pressure extrusion of such a starch-containing admixture at an ultrahigh extrusion pressure of at least 3000 PSI for a residency time within the extruder of at least eight seconds and no longer than fifteen seconds at a suitable extrusion temperature of at least 80° Celsius, preferably at least 90° Celsius, more preferably at least 100° Celsius, produces an absorbent extrudate in accordance with the present invention that not only readily picks up, e.g., absorbs water, such as urine, and retains or hold it, but which also has a relatively high capacity to pick up, e.g., adsorb oil and retain or hold the oil. In such a preferred system and method, subjecting such a starch-containing admixture to such an ultrahigh extrusion pressure within the extruder not only gelatinizes substantially all of the starch in the admixture but also further modifies, preferably at least physically modifies, at least some of the gelatinized starch into an absorption or adsorption increasing modified starch that not only improves the water absorption or water adsorption capacity of the high-pressure extruded absorbent but which also is oil-adsorptive and/or oil-adsorptive.

Such a preferred ultrahigh pressure absorbent extrudate, e.g., extruded granular absorbent, system and method extrudes a starch-containing admixture that resides within an ultrahigh pressure extruder for at least five seconds and no more than thirty seconds at an ultrahigh extrusion pressure of at least 2000 PSI and at a suitable extrusion temperature of at least 80° Celsius, preferably at least 100° Celsius, modifying at least some of the starch in the admixture into a water-soluble binder that preferably is a cold water soluble binder that is water soluble at room temperature that preferably is substantially uniformly distributed throughout the absorbent extrudate extruded from the ultrahigh pressure extruder. In one preferred ultrahigh pressure extrusion system and method, a starch-containing admixture containing at least 40 wt % starch is subjected to an ultrahigh extrusion pressure of at least 2500 PSI at a high enough extrusion temperature of at least 100° Celsius for a residency time of at least eight seconds and no greater than twenty seconds with such an ultrahigh pressure physically modifying enough starch in the admixture into water-soluble binder, preferably cold water soluble binder, for the extruded absorbent extrudate to be composed of at least 5%, preferably at least 7.5%, more preferably at least 10%, water-soluble binder, preferably cold water soluble binder, by weight of the absorbent extrudate.

Such an amount of at least 5%, preferably at least 7.5%, and more preferably at least 10% water soluble binder present in the absorbent extrudate is a sufficient amount of water soluble binder present by absorbent extrudate weight for self-clumping of absorbent extrudate to occur when wetted with water, urine, or another water-containing liquid, such as an aqueous liquid, e.g., aqueous liquid waste, an aqueous solution, e.g., aqueous liquid waste solution, or another liquid composed of at least some water. In a preferred ultrahigh pressure extrusion system and embodiment, absorbent extrudate can be (a) cut into absorbent pellets upon or after extrusion from the extruder and/or (b) comminuted into smaller sized absorbent particles with one or both the extruded absorbent pellets and/or extruded absorbent particles used in an absorbent product, such as a general purpose granular absorbent product, a food-grade food-waste granular absorbent product, a biodegradable waste remediation granular absorbent product, a radiation waste remediation granular absorbent product, and/or cat, pet or animal litter, which agglutinates together into an agglutinated mass of at least a plurality of pairs, i.e., at least three, of extruded absorbent pellets and/or extruded absorbent particles when wetted with or by water, urine, aqueous liquid, e.g., aqueous liquid waste, an aqueous solution, e.g., aqueous liquid waste solution, or another liquid composed of at least some water.

When wetted with water, urine or another water-containing liquid, such absorbent extrudate, e.g., extruded granular absorbent pellets and/or extruded granular absorbent particles, produced using such an ultrahigh pressure extrusion system and method of the present invention agglutinates with at least some of the cold water soluble binder in the absorbent extrudate (a) becoming sticky or tacky, (b) becoming flowable, i.e., a flowable adhesive, and/or (c) forming an adhesive gel whose viscosity can and preferably does increase over time as the flowable adhesive and/or adhesive gel thickens during the agglutination process. Cold water soluble binder in absorbent extrudate of the present invention is an agglutinating agent that causes absorbent extrudate to agglutinate together when wetted and which also further serves as a clumping agent and/or clump hardening agent as the agglutinated absorbent extrudate transforms into clumps that become increasingly harder over time as the agglutinated absorbent extrudate dries.

Such absorbent extrudate pellets, particles and/or other sized pieces made with such an ultrahigh pressure extrusion system and method of the present invention substantially instantaneously begins agglutinating upon being wetted with a wetting liquid with the agglutinated mass of pellets, particles, and/or other-sized pieces of absorbent extrudate hardening into a solid relatively hard clump as the agglutinated mass dries to a moisture content of no greater than about 15%, preferably no greater than about 12%±2%, and more preferably no greater than 12%, having a clump compressive strength, preferably clump crush strength, of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%. In a preferred embodiment, pellets, particles and/or other-sized pieces of absorbent extrudate of the present invention agglutinates into a conglomerated coherent mass containing at least a plurality of pairs of, at least three, pellets, particles and/or pieces of absorbent extrudate per cubic centimeter and preferably per cubic millimeter of the wet or moist agglutinated mass or dried hardened clump formed substantially completely from such absorbent extrudate pellets, particles and/or pieces, e.g., homogenous absorbent extrudate clump, having a clump moisture content of no greater than about 12%±2%, preferably no greater than 12%, by clump weight has a dried and hardened clump compressive, preferably clump crush strength of at least of at least 600 PSI or at least 4137 kPa, preferably at least 750 PSI or at least 5171 kPa, more preferably at least 900 PSI or at least 6205 kPa at a clump retention rate of at least 85%, preferably at least 90% and more preferably at least 92%.

As such, absorbent extrudate of the present invention is self-agglutinating or of self-agglutinating construction, e.g., self-agglutinating composition, with at least a plurality of pairs, i.e., at least three, of pellets, particles or other pieces of the absorbent extrudate adjacent or near one another being drawn together or agglutinate into a conglomerated mass when wetted with water, urine, or a water-containing composition, e.g., water-containing liquid or aqueous solution. Such pellets, particles and/or other pieces of self-agglutinating absorbent extrudate are adjacent or near enough to one another to self-agglutinate when wetted by (i) adjoining other pellets, particles and/or pieces of absorbent extrudate, (ii) being in contact with other pellets, particles and/or pieces of absorbent extrudate, and/or (iii) being within 0.5 millimeters of other pellets, particles and/or pieces of absorbent extrudate. In a preferred embodiment, pellets, particles and other pieces of self-agglutinating absorbent extrudate in accordance with the present invention contain a sufficient amount of cold water soluble binder by absorbent extrudate weight for pellets, particles and pieces of the absorbent extrudate spaced within a relatively close self-agglutinating distance of about one millimeter (i.e., 1 mm±0.5 mm) of one another to be drawn together and self-agglutinate when wetted with enough aqueous wetting liquid, e.g., water, urine or another aqueous liquid, for at least some of the wetting liquid to flow in and around at least some of the absorbent extrudate pellets, particles and/or pieces. In one such preferred embodiment, pellets, particles and other pieces of self-agglutinating absorbent extrudate in accordance with the present invention contain a enough cold water soluble binder by absorbent extrudate weight for pellets, particles and pieces of the absorbent extrudate spaced a self-agglutinating distance of no farther away than one millimeter such that pellets, particles and/or other pieces of absorbent extrudate spaced within one millimeter of other pellets, particles and/or other pieces of absorbent extrudate will be drawn together or cohere when wetted with wetting liquid. In another such preferred embodiment, pellets, particles and other pieces of self-agglutinating absorbent extrudate in accordance with the present invention contain a enough cold water soluble binder by absorbent extrudate weight for pellets, particles and pieces of the absorbent extrudate spaced a self-agglutinating distance of no farther away than two millimeters such that pellets, particles and/or other pieces of absorbent extrudate spaced within two millimeters of other pellets, particles and/or other pieces of absorbent extrudate will be drawn together or cohere when wetted with an amount wetting liquid sufficient to not only wet the pellets, particles and/or pieces of absorbent extrudate but has wetting liquid that flows along, around and/or in between the absorbent extrudate pellets, particles and/or pieces.

Such absorbent extrudate made using such an ultra-high pressure extrusion system and method of the present invention has a sufficiently high amount of cold water soluble binder by weight percent of the absorbent extrudate that wetting with such aqueous wetting liquid causes agglutinating gelling to occur that facilitates agglutination and hardened clump formation. Wetting with enough wetting liquid so as to substantially completely wet, even saturate, at least a plurality of pairs of, i.e., at least three, pellets, particles and/or pieces of absorbent extrudate with the wetting liquid solubilizing at least some of the cold water soluble binder of the wetted absorbent extrudate forming flowable adhesive and/or an agglutinating adhesive gel that agglutinates at least a plurality of pairs of, i.e., at least three, pellets, particles and/or pieces of absorbent extrudate. In a preferred embodiment, wetting with enough wetting liquid so as to substantially completely wet, even saturate, at least a plurality of pairs of, i.e., at least three, pellets, particles and/or pieces of absorbent extrudate with the wetting liquid solubilizing at least some of the cold water soluble binder of the wetted absorbent extrudate forming flowable adhesive and/or an agglutinating adhesive gel that forms agglutinated masses and clumps containing at least a plurality of pairs of, i.e., at least three, pellets, particles and/or pieces of absorbent extrudate per cubic centimeter, preferably per cubic millimeter of the wet or moist agglutinated mass and dry hardened clump.

Water soluble binder in ultrahigh pressure absorbent extrudate produced using such an ultrahigh pressure absorbent extrusion system using such an ultrahigh extrusion system of the present invention gels when wetted water or urine forming a water-soluble adhesive colloid that preferably is or includes a cold-water soluble binder gel disposed about at least a portion of the exterior, e.g., outer surface, of the wetted ultrahigh pressure absorbent extrudate. When wetted with water or urine, in addition to gelling or forming such a water-soluble adhesive colloid disposed around or about the exterior, e.g., outer surface, of the wetted ultrahigh pressure absorbent extrudate, wetting of the ultrahigh pressure absorbent extrudate with water or urine also causes the ultrahigh pressure absorbent extrudate to swell such that ultrahigh pressure absorbent extrudate of the present invention both gels and swells when wetted with water or urine. In swelling when wetted, wetting of the ultrahigh pressure absorbent extrudate with water or urine causes the absorbent extrudate to swell so as to occupy a greater space or volume than the same absorbent extrudate occupied prior to being wetted with the water or urine.

In a preferred embodiment, the ultrahigh pressure extrusion system and method of the invention produces absorbent extrudate with water-soluble binder distributed throughout, preferably substantially homogenously throughout, the absorbent extrudate with an exterior or outer surface of the absorbent extrudate also being composed of water-soluble binder. When wetted with water or urine, the absorbent extrudate both gels and swells with gelling occurring due to production of a water-soluble adhesive colloid, preferably a cold-water soluble adhesive gel, which agglutinates adjacent absorbent extrudate, and swelling occurring because wetting with water or urine causes the wetted absorbent extrudate to expand in size or volume at least 1%, preferably at least 2%, and more preferably at least 3% than prior to wetting. In addition, gelling preferably also causes at least some of the water-soluble adhesive colloid produced by wetting to flow from the wetted absorbent extrudate around and adjacent other absorbent extrudate agglutinating the absorbent extrudate preferably forming a generally hard clump thereof after drying thereof.

In such a preferred gelling and swelling absorbent extrudate of the present invention, the ultrahigh pressure extrusion system and method produce absorbent extrudate with at least 5% by weight of the water-soluble binder distributed throughout, preferably substantially homogenously throughout, the absorbent extrudate with an exterior or outer surface of the absorbent extrudate also being composed of water-soluble binder in an amount of at least 2% by weight, preferably at least 3% by weight, and more preferably at least 5% by weight. In another such preferred embodiment, the ultrahigh pressure extrusion system and method produce absorbent extrudate with at least 7.5% by weight of the water-soluble binder distributed throughout, preferably substantially homogenously throughout, the absorbent extrudate with an exterior or outer surface of the absorbent extrudate also being composed of water-soluble binder in an amount of at least 3% by weight, preferably at least 5% by weight, and more preferably at least 7% by weight. In a further such preferred embodiment, the ultrahigh pressure extrusion system and method produce absorbent extrudate with at least 10% by weight of the water-soluble binder distributed throughout, preferably substantially homogenously throughout, the absorbent extrudate with an exterior or outer surface of the absorbent extrudate also being composed of water-soluble binder in an amount of at least 5% by weight, preferably at least 7% by weight, and more preferably at least 9% by weight. In a further such preferred embodiment, the ultrahigh pressure extrusion system and method produce absorbent extrudate with at least 15% by weight of the water-soluble binder distributed throughout, preferably substantially homogenously throughout, the absorbent extrudate with an exterior or outer surface of the absorbent extrudate also being composed of water-soluble binder in an amount of at least 7% by weight, preferably at least 10% by weight, and more preferably at least 12% by weight. In a preferred embodiment, the water-soluble binder in any of the above embodiments can be cold-water soluble binder, include cold-water soluble binder, and/or be formed in part of cold-water soluble binder including in any of the aforementioned weight percent(s) recited above in this paragraph.

In another preferred embodiment, when wetted with water or urine, the absorbent extrudate both gels and swells with gelling occurring due to production of a water-soluble adhesive colloid, preferably a cold-water soluble adhesive gel, which agglutinates adjacent absorbent extrudate, and swelling occurring because wetting with water or urine causes the wetted absorbent extrudate to expand in size or volume at least 4%, preferably at least 5%, and more preferably at least 7% than before wetting. In addition, gelling preferably also causes at least some of the water-soluble adhesive colloid produced by wetting to flow from the wetted absorbent extrudate around and adjacent other absorbent extrudate agglutinating the absorbent extrudate preferably forming a generally hard clump thereof after drying thereof.

In one such preferred embodiment, the ultrahigh pressure extrusion system and method of the invention produces absorbent extrudate with water-soluble binder distributed throughout, preferably substantially homogenously throughout, the absorbent extrudate with an exterior or outer surface of the absorbent extrudate also being composed of water-soluble binder In a preferred embodiment, the ultrahigh pressure extrusion system and method produce absorbent extrudate with at least 5% by weight of the water-soluble binder distributed throughout, preferably substantially homogenously throughout, the absorbent extrudate with an exterior or outer surface of the absorbent extrudate also being composed of water-soluble binder in an amount of at least 2% by weight, preferably at least 3% by weight, and more preferably at least 5% by weight. In another preferred embodiment, the ultrahigh pressure extrusion system and method produce absorbent extrudate with at least 7.5% by weight of the water-soluble binder distributed throughout, preferably substantially homogenously throughout, the absorbent extrudate with an exterior or outer surface of the absorbent extrudate also being composed of water-soluble binder in an amount of at least 3% by weight, preferably at least 5% by weight, and more preferably at least 7% by weight. In a further preferred embodiment, the ultrahigh pressure extrusion system and method produce absorbent extrudate with at least 7.5% by weight of the water-soluble binder distributed throughout, preferably substantially homogenously throughout, the absorbent extrudate with an exterior or outer surface of the absorbent extrudate also being composed of water-soluble binder in an amount of at least 3% by weight, preferably at least 5% by weight, and more preferably at least 7% by weight.

Such a swelling and gelling ultrahigh extrusion pressure produced absorbent extrudate can advantageously \ be blended with such pellets, beads, balls or the like made of cellulosic material, e.g., recycled paper, paper, wood, fiber, glass, plastic, mineral, corn-cob, or other non-extruded material that can be and which preferably also is inert, e.g., an inert diluent, of lower cost, lighter weight, e.g., lower density, and/or which is non-absorptive and/or non-adsorptive to form another preferred finished granular absorbent product of the invention that self-agglutinates when wetted with water or urine producing substantially hard clumps thereof when dry.

In certain embodiments, an inert diluent is added pre-extrusion and extruded with the absorbent component to yield the absorbent extrudate. In a preferred embodiment, the inert diluent is a mineral, most preferably talc. An example absorbent extrudate according to the invention contains about 60% sorghum and 40% talc.

The present invention is directed to an extrusion system, method of extrusion and absorbent granular product formed of extruded granular absorbent pellets, particles or pieces which can be and preferably are mixed or blended with other types of pellets, particles or pieces composed of a different material that can be or function as a cheaper or lower cost insert diluent in an amount up to no more than 70%, preferably no more than 60%, and more preferably no more than 50% of the weight of the granular absorbent product and still be self-agglutinating which agglutinate together in masses when wetted with water or urine which form substantially hard clumps when the agglutinated mass dries.

To produce such a finished absorbent granular product that is a blend of such extruded granular absorbent and non-extruded non-absorbent granular diluent or filler, such an extrusion system, method of extrusion, and extruded granular absorbent of the present invention advantageously exploits hydrogen bonding characteristics of starch and water in carrying out an extrusion process that:

(a) opens up starch in starch-containing admixture extruded by an extruder via physical and/or thermal modification preferably also stretching out starch molecules or polymers producing a starch matrix or starch-based matrix that is more finely porous and which increases the internal surface area available for aqueous products such as urine to adsorb onto. As an available metaphor, we can think of this as having a solid ball made of LEGOS, where individual LEGOS represent individual molecules; if we separate the pieces and then recombine them all into a larger, less dense skeletal form that contains all of the same pieces, this is what we are doing. This physical expansion of the starch happens through water's expanding vapor pressure from a liquid to a gas as the extrusion pressure at the die is released. As the extruder's pressure increases, the starch mixture plasticizes and the molecules become more mobile. Upon exiting the extruder's die, water's expansion into the gaseous state is what forces the plasticized starch to open up, to stretch and expand. As water evaporates, it also adds a cooling effect to the newly expanded starch structure, and with the additional cooling from cooler air blowers on the die, the starch structure crystallizes or solidifies into an expanded structure with a porous state;

(b) modifies starches during extrusion shifting the molecular distribution of the modified starches toward more medium and shorter sized molecules (e.g., dextrinizing), which allows a fraction of the starch to become very mobile under both pressure induced plasticization (during production) and a flash aqueous influence (during litter clumping with aqueous products such as urine). This molecular distribution reduction happens through the relatively dry cutting action of the early stage of extrusion performed on the starch in the admixture in the extruder.

(c) avoids the undesirable impact of heat or heating produced by or during extrusion that adversely affects the post-extrusion properties of extrudate that covalently connects, binds, or cages nearby starch molecules that advantageously remains more mobile, preferably remains substantially mobile, and more preferably remains substantially unconnected, unbound and/or uncaged as a result of the below-described cold-processing that is performed on absorbent extrudate of the present invention substantially immediately upon exiting the extruder and for a substantially period of time thereafter including during transport away from the extruder and/or during post-extrusion processing of the novel extruded granular absorbent. If the LEGOS metaphor is revisited, extrudate made with a conventional extrusion process is like melting some of the LEGOS or starch molecules together, so that they become larger pieces that can no longer slide apart from one another. In carrying out an extrusion method or process of the present invention, including one where post-extrusion cold processing is performed, at least some of the LEGOS or starch molecules, particularly those having a size less than the largest LEGOS or starch molecules, e.g., medium-sized LEGOS or medium-sized or medium molecular weight starch molecules remain movable in the extruded granular absorbent of the present invention such that they are available for quick un-zippering and re-zippering when they or extruded granular absorbent containing them comes into contact with water, urine or other aqueous fluid. The heat that builds-up in the starch-containing admixture during extrusion through the increased pressure dynamics and friction of being gelatinized in the extruder and/or extruded by or from the extruder, is quickly lost upon pressure release upon being discharged or extruded from the extruder, including as a result of water's thermal draw through evaporation, and the additionally applied cooling air of the post-extrusion cold-processing system and method discussed in more detail below. By rapidly cooling, drying and removing heat upon extrusion of the extruded granular absorbent by cold-processing the extruded granular absorbent, it avoids the problem that starch-containing foods typically suffer from when overcooked as it prevents the formation of caged starch structures that form by or during overcooking that are substantially water insoluble because of inability of these retrograded starch caged structures to unzipper when contacting water thereby making them unable to pick-up, hold, retain, absorb and/or adsorb the water. In addition, such irreversible retrogradation that prevents enzymatic starch breakdown in such overcooked caged un-zipperable starch molecules or LEGOS is substantially avoided, preferably substantially completely avoided by cold-processing the extruded granular absorbent of the present invention. This advantageously not only enables zippering when contacting water or urine which produces rapid pickup or absorption thereof but it also can be enzymatically broken down advantageously producing extruded granular absorbent that is biodegradable.

(d) can be used with higher than normal extrusion pressures, including with an ultrahigh extrusion pressure system and method as discussed above, to liquefy or plasticize the starch with a relatively low presence of water advantageously putting the starch in the admixture being pressurized in the extruder into a temporarily moldable and flexible state for the expanding steam to shape without "over-cooking" the absorbent extrudate as the absorbent extrudate is discharged or extruded from the extruder. By utilizing the phase shifting characteristics through pressure, the thermal energy that would remain with or in the absorbent extrudate after extrusion that would ordinarily cage and destroy these uncaged zipper-able starch molecules, preferably medium-size or medium molecular weight starch molecules, in the extrudate is rapidly reduced or removed by and during cold-processing of the extruded granular absorbent beginning immediately upon extrusion from the extruder.

Controlling starch extruded production, starch-modification during extrusion and/or post-extrusion retention or preservation of such modified starches in the extruded granular absorbent via cold processing in this way allows us to take the hydrogen bonding dynamics to a new functional level, where upon a localized flooding of aqueous based fluid, such as urine in a litterbox, allows us to utilize the cold-processing preserved molecular mobility of starch through solvent based re-plasticization and progressive starch encasement of surrounding materials as the flooded aqueous fluid thins out and water evaporates. Anything carried by the urine or aqueous fluid will be caught up and trapped by such starch encasement in the extruded absorbent granules, including when part of a finished or final granular absorbent product formed by blending such cold-process extruded granular absorbent of the invention together with other cost effective, non-adhesive, diluent portions, e.g., corn cob granules, glass balls, glass pellets, glass beads, glass particles, plastic balls, plastic beads, plastic pellets, plastic pieces, paper granules, paper pellets, paper particles, other cellulose-containing or other cellulosic granules, pellets, balls, and combinations thereof. By cold processing and quenching the pellets to remove the water the present invention has de-plasticized the starch in the admixture. That is the starch is not in a mobile state that could retrograde such that post-extrusion retrogradation is prevented once extruded and cold-processed.

The present invention is also directed to a multicomponent blended granular absorbent product composed of one component that is extruded granular absorbent that self-clumps when wetted that is blended with at least one other component that is a non-extruded granular material that does not itself ordinarily self-clump when wetted producing such a blended granular absorbent product of the invention that nonetheless still self-clumps when wetted despite being composed of a significant amount, preferably at least 20% by weight, of the non-extruded material as a proportion of the granular absorbent product. A preferred blended granular absorbent product of the present invention is composed of at least a plurality of pairs, i.e. at least three, of granules of the non-extruded granular material and at least a plurality of pairs, i.e. at least three, of granules of extruded granular absorbent per cubic centimeter of the blended granular absorbent product with the granules of extruded granular absorbent containing a sufficient amount of water-soluble binder, preferably cold water soluble binder, to agglutinate at least a plurality of both types of granules when wetted with water or urine that forms a solid clump of the granules when dried. Such a blended granular absorbent product of the present invention not only is self-agglutinating and preferably self-clumping, but also possesses a good capacity to pick up and retain water and urine wetting granules of the absorbent product by being able to pick up and retain at least one time, preferably at least a plurality of times, and more preferably at least a plurality of pairs of times its weight in water or urine during absorbent product use.

In a preferred blended granular absorbent product method and embodiment, the granules of extruded granular absorbent are formed by extruding a starch-containing admixture under sufficient extrusion pressure and at a high enough extrusion temperature to form a sufficient amount of water-soluble binder, preferably cold water soluble binder, more preferably in amylopectin-based cold water soluble binder, by weight of the extruded granular absorbent to self-agglutinate and preferably self-clump at least a plurality, preferably at least a plurality of pairs, of granules of both extruded granular absorbent and non-extruded granular material. In one preferred method and embodiment, a starch-containing admixture containing at least 40% starch by admixture weight is extruded at an ultrahigh extrusion pressure of at least 1850 PSI, preferably at least 2000 PSI, and more preferably at least 2250 PSI, at an extrusion temperature of at least 70° Celsius, preferably at least 80° Celsius, and more preferably at least 100° Celsius that at least physically modifies and preferably both physically and thermally modifies starch in the admixture into water soluble binder, preferably cold water soluble binder, and more preferably amylopectin based cold water soluble binder that forms at least 2%, preferably at least 3%, and more preferably at least 5% of each extruded granular absorbent granule by weight sufficient to self-agglutinate and/or self-clump at least a plurality of pairs of both types of granules of the granular absorbent product of the present invention.

In another preferred method and embodiment, a starch-containing admixture containing at least 40% starch by admixture weight is extruded at an ultrahigh extrusion pressure of at least 2000 PSI, preferably at least 2250 PSI, and more preferably at least 2500 PSI, at an extrusion temperature of at least 75° Celsius, preferably at least 85° Celsius, and more preferably at least 100° Celsius that at least physically modifies and preferably both physically and thermally modifies starch in the admixture into water soluble binder, preferably cold water soluble binder, and more preferably amylopectin based cold water soluble binder that forms at least 5%, preferably at least 7%, and more preferably at least 10% of each extruded granular absorbent granule by weight sufficient to self-agglutinate and/or self-clump at least a plurality of pairs of both types of granules of the granular absorbent product of the present invention. In a further preferred method and embodiment, a starch-containing admixture containing at least 40% starch by admixture weight provided by one or more cereal grains is gelatinized and extruded at an ultrahigh extrusion pressure of at least 2000 PSI, preferably at least 2500 PSI, and more preferably at least 3000 PSI, at an extrusion temperature of at least 75° Celsius, preferably at least 85° Celsius, and more preferably at least 100° Celsius thereby at least physically modifying and preferably both physically and thermally modifying starch in the admixture into water soluble binder, preferably cold water soluble binder, and more preferably amylopectin based cold water soluble binder such that each extruded absorbent granule contains at least 5%, preferably at least 10%, and more preferably at least 15% by weight of such water-soluble binder sufficient to self-agglutinate and/or self-clump at least a plurality of pairs of both types of granules of the granular absorbent product of the present invention without the presence of any agglutinating agent additive or clumping agent additive when wetted with water or urine during granular absorbent product use. Such water-soluble binder is or serves as a water soluble agglutinating agent or clumping agent, which preferably is a cold water soluble agglutinating agent or clumping agent, and which more preferably is an amylopectin based cold water soluble agglutinating agent or clumping agent.

Where starch is provided by or from one or more cereal grains, a preferred admixture is composed of enough sorghum and/or corn to produce an admixture having at least 20% starch, at least 30% starch, at least 40% starch, and which preferably has at least 50% starch, more preferably at least 60% starch, by admixture weight. Such an admixture has a moisture content of no greater than about 25%, preferably no greater than about 20%, and more preferably no greater than about 15% when entering the extruder, preferably a single screw extruder, with no additional moisture added to the admixture while being fed into the extruder and while in the extruder, including during absorbent pellet extrusion.

In certain embodiments, an inert diluent is added pre-extrusion and extruded with the absorbent component to yield the absorbent extrudate. In a preferred embodiment, the inert diluent is a mineral, most preferably talc. An example absorbent extrudate contains about 60% sorghum and 40% talc.

In one preferred admixture, the admixture is composed of enough sorghum, preferably whole grain sorghum, which can also be degermed and/or decorticated sorghum, e.g., degermed and/or decorticated whole grain sorghum, to produce an admixture having at least 40% starch and which preferably has at least 50% starch, more preferably at least 60% starch, by admixture weight, preferably dry admixture weight before any water is added to the admixture prior to and/or during extrusion. In one presently preferred admixture, the admixture is composed at least 70%, preferably at least 80%, more preferably at least 90% of such sorghum. In another preferred admixture, the admixture is composed of at least 95% sorghum and preferably is substantially completely composed of sorghum. Such an admixture has a moisture content of no greater than about 20%, preferably no greater than about 17%, and more preferably no greater than about 14% when entering the extruder, preferably a single screw extruder, with no additional moisture added to the admixture while being fed into the extruder and while in the extruder, including during extrusion.

Extruding such an admixture(s) at such an ultrahigh extrusion pressure(s) in an extruder that preferably is a single screw extruder produces extruded granular absorbent in accordance with the present invention that is well suited for use in or as part of the granular absorbent product of the present invention that is blended with non-extruded granular material as the extruded granular absorbent has enough water-soluble binder, preferably cold water soluble binder, more preferably amylopectin based cold water soluble binder that functions as an agglutinating agent or clumping agent when wetted with water or urine which preferably flows from wetted extruded granular absorbent along and around contacting, adjoining and/or adjacent non-extruded granular material agglutinating and preferably clumping the extruded granular absorbent and the non-extruded granular material. In a preferred method and embodiment, extruding such an admixture(s) at such an ultrahigh extrusion pressure(s) from an extruder that preferably is a single screw extruder produces granules of absorbent extrudate in accordance with the present invention composed of enough water-soluble binder, preferably cold water soluble binder, more preferably amylopectin based cold water soluble binder such that wetting with water or urine causes at least some of the aforementioned binder to at least partially solubilize or dissolve in the water or urine and flow therefrom along and/or in between a plurality of pellets of absorbent extrudate and/or non-extruded granular material.

In such a preferred embodiment, water or urine wetting granules of the ultrahigh pressure absorbent extrudate solubilizes or dissolves at least some of the water-soluble binder causing it to flow in the form of a flowable adhesive, e.g., flowable agglutinating adhesive, from the wetted granules, along and around the wetted granules as well as along and/or around granules of the non-extruded granular material. Such a flowable adhesive preferably is in the form of a water-soluble adhesive colloid, preferably a cold water soluble adhesive colloid, and more preferably an amylopectin based cold water soluble adhesive colloid whose viscosity increases as it thickens into a gel whose flow or movement substantially decreases agglutinating those granules in contact therewith. Such granules of ultrahigh pressure absorbent extrudate thereby preferably gel when wetted with water or urine exuding water-soluble binder from the wetted extruded absorbent granules in the form of water-soluble flowable adhesive that flows therefrom along and around at least a plurality of wetted extruded granules and along and around at least a plurality of granules of non-extruded material rapidly thickening into an adhesive colloid gel that solidifies agglutinating together the granules in contact therewith.

In addition to gelling when wetted, granules of ultrahigh pressure absorbent extrudate also swell from being wetted due to at least some of the water or urine wetting the granules being picked up by the wetted granules, such as being absorbed or adsorbed by the wetted granules. This is due to a liquid-attracting starch matrix formed in each extruded absorbent granule that includes and/or which is composed of or from starch in the admixture physically and/or thermally modified in the extruder by application of ultrahigh pressure during ultrahigh pressure extrusion whose state, phase and/or structure is frozen or locked by cold processing each granule upon extrusion to at least rapidly reduce its temperature from its extrusion or discharge temperature upon exiting the extrusion die to a reduced temperature suitably low enough to do so. Such cold processing of each granule exiting the extruder not only freezes or locks in the state, phase and/or structure of the water retaining ultrahigh pressure modified starch matrix in each granule, doing so also advantageously produces granules each with such starch matrix that is substantially retrogradation proof at room temperature, e.g., between 68° Fahrenheit and 77° Fahrenheit, at a humidity level of no greater than 85% relative humidity, preferably no greater than 70% relative humidity, and more preferably no greater than about 60% relative humidity.

In a preferred method and embodiment, such a liquid-retaining starch matrix is substantially preserved in its as extruded state by each absorbent extrudate granule being cold processed upon discharge from the extruder die by being rapidly cooled in a manner that reduces its temperature by at least at least 5° Celsius, preferably at least 10° Celsius, and more preferably at least 15° Celsius from its extruder die discharge temperature within 5 seconds, preferably within 3 seconds, and more preferably within 1 second of the granule being discharged from the extruder die. In one such preferred absorbent extrudate granule cold processing method and embodiment, each granule is cold processed substantially immediately upon leaving contact with the extruder die in a manner that not only rapidly reduces its extruder die discharge temperature by at least 5° Celsius, preferably at least 10° Celsius, and more preferably at least 15° Celsius within 5 seconds, preferably within 3 seconds, and more preferably within 1 second of leaving extruder die contact, but which also dries each granule reducing its moisture content by at least ½%, preferably by at least 1%, and more preferably by at least 1.5% by granule weight from the extruder die discharge moisture content the granule had upon leaving contact with the extruder die.

In one preferred cold processing method and embodiment, cold processing is performed by air quenching the absorbent extrudate granules upon extrusion preferably by directing a great enough volumetric flow rate of turbulently flowing air onto the absorbent extrudate granules being discharged from the extruder in real time during extruder operation with the volumetric flow rate of turbulently flowing air being sufficient to convectively cool each extruded absorbent granule by at least at least 5° Celsius, preferably at least 10° Celsius, and more preferably at least 15° Celsius from its extruder die discharge temperature within 5 seconds, preferably within 3 seconds, and more preferably within 1 second of the granule being discharged from the extruder die. In one such preferred air quenching cold processing method and embodiment, the volumetric flow rate of turbulently flowing air used to air quench the pellets to cool them as discussed above in this paragraph preferably also dries the granules by reducing their moisture content by at least ½%, preferably by at least 1%, and more preferably by at least 1.5% by granule weight from the extruder die discharge moisture content the granule had upon leaving contact with the extruder die. Where air quenching is employed, the quenching air preferably is ambient air at room temperature and humidity preferably having a temperature of between 60° Fahrenheit and 95° Fahrenheit at a relative humidity of no greater than about 80%. In one preferred air quenching extruded absorbent granule cold processing system and method, the humidity of the quenching air is reduced by dehumidification, preferably by passing the quenching air through a dehumidifier, to remove at least some of the moisture and humidity thereby carried by the quenching air before the quenching air is turbulently discharged into a knife cage of the extruder whose absorbent extrudate granules are being air quenched to cold process them to freeze the state of their ultrahigh extrusion pressure modified starch matrix so that retrogradation thereof is prevented in the future thereby optimizing the water pickup capacity or water retention, e.g., water absorption capacity and/or water adsorption capacity, of the granules when used in the granular absorbent product of the present invention.

As previously indicated, in addition to gelling when wetted, granules of ultrahigh pressure absorbent extrudate also swell from being wetted due to at least some of the water or urine wetting the granules being picked up by the wetted granules, such as being absorbed or adsorbed by the wetted granules. In a preferred absorbent extrudate granule embodiment, such absorbent extrudate granules formed using such an ultrahigh extrusion pressure method of the invention preferably swell by at least 2% in size when wetted by enough water or urine to pick up and preferably retain at least some of the water or urine. In another preferred instantly gelling and swelling absorbent extrudate granule embodiment, such absorbent extrudate granules formed using such an ultrahigh extrusion pressure method of the present invention swell by at least 3% in size when enough water or urine comes into contact and is picked up, e.g., absorbed and/or adsorbed, by and preferably into the starch matrix within the granule. In a further preferred instantly gelling and swelling absorbent extrudate granule embodiment, such absorbent extrudate granules formed using such an ultrahigh extrusion pressure method of the present invention swell by at least 5% in size when enough water or urine comes into contact and is picked up, e.g., absorbed and/or adsorbed, by and preferably into the starch matrix within the granule. In still another preferred instantly gelling and swelling absorbent extrudate granule embodiment, such absorbent extrudate granules formed using such an ultrahigh extrusion pressure method of the present invention swell by at least 5% in size when enough water or urine comes into contact and is picked up, e.g., absorbed and/or adsorbed, by and preferably into the starch matrix within the granule.

As previously indicated, a multicomponent blended granular absorbent product in accordance with the present invention also includes granules of a non-extruded granular material that is blended with the absorbent extrudate granules preferably in a relatively high percentage, proportion or volumetric ratio relative to the amount or volume of the extruded absorbent granules in the blended granular absorbent product. While such non-extruded granular material can be composed of just about any kind of a material suitable for use in liquid, e.g., water and/or oil, absorbent applications, granules of such non-extruded granular material can be made of a lower cost material, lighter weight material, a more buoyant material, a less buoyant material, a material having a composition configured release one or more constituents, e.g. chemicals, compounds, molecules, etc., into the surrounding area and/or liquid when wetted with liquid, a material having a composition configured to dissolve over time to controllably release one or more constituents, e.g. chemicals, compounds, molecules, etc., into the surrounding area and/or liquid when wetted with liquid, to break down, e.g. biodegrade, and provide nourishment or nutrients to the surrounding area and/or liquid in contact therewith, to remediate toxic liquid waste containing hydrocarbons, chemicals and/or other contaminants, and/or a material composed or otherwise configured to nourish, remediate, encapsulate, or otherwise treat soil, groundwater, lake water, river water, ocean water, landfills and the like. As a result, such a multicomponent blended granular absorbent product of the present invention can be configured or tailored to provide or otherwise impart one or more properties, benefits or characteristics not previously hereto for seen in granular absorbent product of any kind. In this regard, such a multicomponent blended granular absorbent product of the present invention can therefore the formulated with a non-extruded, carrier, diluent and/or filler component of non-extruded granular composition that imparts to the overall blended granular absorbent product of the invention one or more properties, characteristics and/or benefits not previously found in granular absorbent formed substantially completely of absorbent extrudate granules. Where the multicomponent blended granular absorbent product of the invention is formulated for use as litter, one or more of such constituents of non-extruded, carrier, diluent and/or filler material can be included and collectively treated or viewed as being the component or components opposite the granular absorbent extrudate component.

Such non-extruded granular material is composed of granules that can be in the form of balls, pellets, peas, beads, flakes, discs, saucers, particles, fines, and/or be in or have one or more other/different shapes and/or sizes, which can be dependent on the particular absorbent application for which the granular absorbent product is intended to be used. If desired, such non-extruded granular material can be made or otherwise be formed via an agglomeration process, a pelletizing process, a comminution process, or another non-extrusion granule or granular material forming process.

In one preferred blended granular absorbent product embodiment, the other or non-extruded component of the granular absorbent product is composed of, formed of or otherwise includes non-extruded granules of a cellulosic material that preferably is a fibrous cellulosic or cellulose fibrous material with fibrous cellulose or cellulosic fibers being provided by or composed of plant fiber. In a preferred multicomponent granular absorbent product embodiment where cellulose-containing or cellulosic granules are blended with granules of absorbent extrudate, the cellulose or cellulosic granules can be composed of, be derived of, provided by and/or otherwise include wood, paper, recycled paper, paper sludge, corn cob(s), beets, sugar cane, rice hulls, peanut hulls, citrus pulp, citrus skins, citrus peels, apple skin, apple pulp, apple pumice, cotton, cotton burrs, potatoes, potato skins, tree bark, grain(s), distillers grain, corn stalks, corn leaves, other plant stalks, other plant leaves, and other types or sources of plant fiber. Such cellulose-containing or cellulosic granules preferably are composed of at least 30%, preferably at least 40%, and more preferably at least 45% cellulose, e.g., cellulose fiber, and/or cellulosic fibrous material, in granule or granular form, e.g. agglomerated, pelletized, etc., with a preferred cellulose-containing or cellulosic granule formulation being composed of between 30-65%, preferably between 35-60%, more preferably between 40-55% by weight of cellulose fiber and/or cellulosic fibrous material, preferably paper fiber, with the remainder composed of one or more other constituents including one or more of clay, e.g., preferably kaolin clay, carbonate, preferably calcium carbonate, and/or one or more oxides, e.g. one or more dioxides, preferably titanium dioxide.

In another preferred cellulose or cellulosic granular material, corn cobs can be substituted in place for part of or all of the aforementioned cellulose and/or cellulose fiber content provided by paper fiber. In yet another preferred cellulose or cellulosic granular material, one or more of wood, paper sludge, beets, beet pulp, sugar cane, sugar cane pulp, rice hulls, peanut hulls, citrus pulp, citrus skins, citrus peels, apple skin, apple pulp, apple pumice, cotton, cotton burrs, potatoes, potato skins, tree bark, grain(s), distillers grain, corn stalks, corn leaves, other types of plant stalks, and/or other types of plant leaves can be substituted in place for part of or all of the aforementioned cellulose and/or cellulose fiber content provided by paper fiber and/or corn cobs.

Where such granular cellulose fiber and/or cellulosic fibrous material contains one or more such other constituents, the composition of such one or more other constituents preferably is or includes about/between 15-45% clay, e.g., kaolin clay, preferably about/between 20-40% clay, e.g., kaolin clay, and more preferably about/between 25-35% clay, e.g., kaolin clay; about/between 5-30% carbonate, e.g., calcium carbonate, preferably about/between 8-25% carbonate, e.g., calcium carbonate, and more preferably about/between 10-22% carbonate, e.g., calcium carbonate; and preferably no more than 10%, preferably no more than about 5% and more preferably no more than about 1.5% oxide(s), e.g., dioxides, such as titanium dioxide. In a preferred embodiment, granules of such a cellulosic material or composition having such a formulation are provided in one or more granule or particle sizes, such as being provided in one or more mesh size ranges, e.g., having a particle size ranging between 4-20 mesh, between 8-30 mesh, between 12-20 mesh, between 16-30 mesh and/or between 20-50 mesh. In one such preferred embodiment, the granules of such a cellulosic material or composition having such a formulation preferably have a generally round or spherical shape such as by being formed into round balls but which can also be generally oval, oblong or shaped in or as elongate pellets or beads. The granules of such a preferred cellulosic material or composition having such a formulation can have a granule or particle size both a wider and longer than the corresponding lengthwise in widthwise extent of the largest size absorbent extrudate granule used in a multicomponent blended granular absorbent product of the present invention because been though larger in granule or particle size, agglutination and clumping remains unaffected as does the water and urine pick up and retention capacity of the granular absorbent product.

In a preferred multicomponent blended granular absorbent product of the present invention, the ratio or proportion of the aforementioned cellulosic granular material to extruded granular absorbent ranges between 30% cellulosic granules and 70% absorbent extrudate granules, and 70% cellulosic granules and 30% absorbent extrudate granules by volume or weight of the multicomponent blended granular absorbent product. In one such preferred formulation, the multicomponent blended granular absorbent product is composed of at least 30% cellulosic granules and no more than 70% absorbent extrudate granules by weight or volume of the product. In another such preferred formulation, the multicomponent blended granular absorbent product is composed of at least 35% cellulosic granules and no more than 65% absorbent extrudate granules by weight or volume of the product. In a further such preferred formulation, the multicomponent blended granular absorbent product is composed of at least 40% cellulosic granules and no more than 60% absorbent extrudate granules by weight or volume of the product. In still another such preferred formulation, the multicomponent blended granular absorbent product is composed of at least 45% cellulosic granules and no more than 55% absorbent extrudate granules by weight or volume of the product. In yet another such preferred formulation, the multicomponent blended granular absorbent product is composed of at least 50% cellulosic granules and no more than 50% absorbent extrudate granules by weight or volume of the product. In a still further such preferred formulation, the multicomponent blended granular absorbent product is composed of at least 55% cellulosic granules and no more than 45% absorbent extrudate granules by weight or volume of the product. In another such preferred formulation, the multicomponent blended granular absorbent product is composed of at least 60% cellulosic granules and no more than 40% absorbent extrudate granules by weight or volume of the product. In yet another such preferred formulation, the multicomponent blended granular absorbent product is composed of at least 65% cellulosic granules and no more than 35% absorbent extrudate granules by weight or volume of the product. In a further such preferred formulation, the multicomponent blended granular absorbent product is composed of at least 70% cellulosic granules and no more than 30% absorbent extrudate granules by weight or volume of the product. In yet another such preferred formulation, the multicomponent blended granular absorbent product is composed of at least 75% cellulosic granules and no more than 25% absorbent extrudate granules by weight or volume of the product.

Such a preferred multicomponent blended granular absorbent product that is wetted with water or urine, preferably wetting at least a plurality of pairs, i.e., at least three, of granules of extruded granular absorbent with water or urine, preferably at least 10 milliliters of water or urine, agglutinates at least a plurality of the granules of extruded granular absorbent and at least a plurality of the granules of the non-extruded granular cellulosic form, defines or produces a clump thereof when dried to a steady state moisture content after three days, preferably five days, and more preferably seven days of drying of no more than 15% moisture content, preferably no more than 13% moisture content, and more preferably no more than about 12% moisture content by dried clump weight that has a clump crush strength or clump compressive strength of at least 250 PSI, preferably at least 300 PSI, and more preferably at least 400 PSI. Such a preferred multicomponent blended granular absorbent product that is wetted with water or urine, preferably wetting at least a plurality of pairs, i.e., at least three, of granules of extruded granular absorbent with water or urine, preferably at least 10 milliliters of water or urine, agglutinates at least a plurality of the granules of extruded granular absorbent and at least a plurality of the granules of the non-extruded granular cellulosic form, defines or produces a clump thereof when dried to a steady state moisture content after three days, preferably five days, and more preferably seven days of drying of no more than 15% moisture content, preferably no more than 13% moisture content, and more preferably no more than about 12% moisture content by dried clump weight that possesses a clump retention rate of at least 85%, preferably of at least 90%, and more preferably of at least 92%.

Another such preferred multicomponent blended granular absorbent product that is wetted with water or urine, preferably wetting at least a plurality of pairs, i.e., at least three, of granules of extruded granular absorbent with water or urine, preferably at least 10 milliliters of water or urine, agglutinates at least a plurality of the granules of extruded granular absorbent and at least a plurality of the granules of the non-extruded granular cellulosic form, defines or produces a clump thereof when dried to a steady state moisture content after three days, preferably five days, and more preferably seven days of drying of no more than 15% moisture content, preferably no more than 13% moisture content, and more preferably no more than about 12% moisture content by dried clump weight that possesses (a) clump crush strength or clump compressive strength of at least 250 PSI, preferably at least 300 PSI, and more preferably at least 400 PSI, and/or (b) one of a clump retention rate of at least 85%, preferably of at least 90%, and more preferably of at least 92%. A further such preferred multicomponent blended granular absorbent product that is wetted with water or urine, preferably wetting at least a plurality of pairs, i.e., at least three, of granules of extruded granular absorbent with water or urine, preferably at least 10 milliliters of water or urine, agglutinates at least a plurality of the granules of extruded granular absorbent and at least a plurality of the granules of the non-extruded granular cellulosic form, defines or produces a clump thereof when dried to a steady state moisture content after three days, preferably five days, and more preferably seven days of drying of no more than 15% moisture content, preferably no more than 13% moisture content, and more preferably no more than about 12% moisture content by dried clump weight that possesses (a) clump crush strength or clump compressive strength of at least 250 PSI, preferably at least 300 PSI, and more preferably at least 400 PSI, and/or (b) one of a clump retention rate of at least 93%, preferably of at least 95%, and more preferably of at least 98%.

In another preferred blended granular absorbent product embodiment, the other or non-extruded component of the granular absorbent product is composed of, formed or otherwise includes non-extruded granules of smooth and/or non-porous, e.g., imperforate, construction that can be made of a plastic, glass or another type of material producing such smooth and/or imperforate granules. As previously indicated, such smooth and/or imperforate granules can be of sacrificial composition being configured or formulated to dispense, e.g., such as by dissolving and/or biodegrading, one or more chemicals, treatments, compounds, molecules, fragrances, bacteriostats, antifungals, anti-yeasts, antivirals, herbicides, insecticides, bacteria, vectors, water remediation treatment(s), oil remediation treatment(s), pet or animal medicaments, anti-parasitic compounds, or another type of chemical, compound, treatment or the like.

Such granules of smooth, imperforate, dissolvable, biodegradable, dispensing, plastic and/or glass material can contain and/or be formulated with one or more other constituents, such as including or being further composed of about/between 15-45% clay, e.g., kaolin clay, preferably about/between 20-40% clay, e.g., kaolin clay, and more preferably about/between 25-35% clay, e.g., kaolin clay; about/between 5-30% carbonate, e.g., calcium carbonate, preferably about/between 8-25% carbonate, e.g., calcium carbonate, and more preferably about/between 10-22% carbonate, e.g., calcium carbonate; and preferably no more than 10%, preferably no more than about 5% and more preferably no more than about 1.5% oxide(s), e.g., dioxides, such as titanium dioxide. In a preferred embodiment, granules of such a smooth, imperforate, dissolvable, biodegradable, dispensing, plastic and/or glass material or composition having such a formulation are provided in one or more granule or particle sizes, such as being provided in one or more mesh size ranges, e.g., having a particle size ranging between 4-20 mesh, between 8-30 mesh, between 12-20 mesh, between 16-30 mesh and/or between 20-50 mesh. In one such preferred embodiment, the granules of such a smooth, imperforate, dissolvable, biodegradable, dispensing, plastic and/or glass material or composition having such a formulation preferably have a generally round or spherical shape such as by being formed into round balls but which can also be generally oval, oblong or shaped in or as elongate pellets or beads. The granules of such a preferred smooth, imperforate, dissolvable, biodegradable, dispensing, plastic and/or glass material or composition having such a formulation can have a granule or particle size both a wider and longer than the corresponding lengthwise in widthwise extent of the largest size absorbent extrudate granule used in a multicomponent blended granular absorbent product of the present invention because been though larger in granule or particle size, agglutination and clumping remains unaffected as does the water and urine pick up and retention capacity of the granular absorbent product.

In a preferred multicomponent blended granular absorbent product of the present invention, the ratio or proportion of the aforementioned smooth, imperforate, dissolvable, biodegradable, dispensing, plastic and/or glass granular material to extruded granular absorbent ranges between 30% smooth, imperforate, dissolvable, biodegradable, dispensing, plastic and/or glass granules and 70% absorbent extrudate granules, and 70% smooth, imperforate, dissolvable, biodegradable, dispensing, plastic and/or glass granules and 30% absorbent extrudate granules by volume or weight of the multicomponent blended granular absorbent product. In one such preferred formulation, the multicomponent blended granular absorbent product is composed of at least 30% smooth, imperforate, dissolvable, biodegradable, dispensing, plastic and/or glass granules and no more than 70% absorbent extrudate granules by weight or volume of the product. In another such preferred formulation, the multicomponent blended granular absorbent product is composed of at least 35% smooth, imperforate, dissolvable, biodegradable, dispensing, plastic and/or glass granules and no more than 65% absorbent extrudate granules by weight or volume of the product. In a further such preferred formulation, the multicomponent blended granular absorbent product is composed of at least 40% smooth, imperforate, dissolvable, biodegradable, dispensing, plastic and/or glass granules and no more than 60% absorbent extrudate granules by weight or volume of the product. In still another such preferred formulation, the multicomponent blended granular absorbent product is composed of at least 45% smooth, imperforate, dissolvable, biodegradable, dispensing, plastic and/or glass granules and no more than 55% absorbent extrudate granules by weight or volume of the product. In yet another such preferred formulation, the multicomponent blended granular absorbent product is composed of at least 50% smooth, imperforate, dissolvable, biodegradable, dispensing, plastic and/or glass granules and no more than 50% absorbent extrudate granules by weight or volume of the product. In a still further such preferred formulation, the multicomponent blended granular absorbent product is composed of at least 55% smooth, imperforate, dissolvable, biodegradable, dispensing, plastic and/or glass granules and no more than 45% absorbent extrudate granules by weight or volume of the product. In another such preferred formulation, the multicomponent blended granular absorbent product is composed of at least 60% smooth, imperforate, dissolvable, biodegradable, dispensing, plastic and/or glass granules and no more than 40% absorbent extrudate granules by weight or volume of the product. In yet another such preferred formulation, the multicomponent blended granular absorbent product is composed of at least 65% smooth, imperforate, dissolvable, biodegradable, dispensing, plastic and/or glass granules and no more than 35% absorbent extrudate granules by weight or volume of the product. In a further such preferred formulation, the multicomponent blended granular absorbent product is composed of at least 70% smooth, imperforate, dissolvable, biodegradable, dispensing, plastic and/or glass granules and no more than 30% absorbent extrudate granules by weight or volume of the product. In yet another such preferred formulation, the multicomponent blended granular absorbent product is composed of at least 75% smooth, imperforate, dissolvable, biodegradable, dispensing, plastic and/or glass granules and no more than 25% absorbent extrudate granules by weight or volume of the product.

Such a preferred multicomponent blended granular absorbent product that is wetted with water or urine, preferably wetting at least a plurality of pairs, i.e., at least three, of granules of extruded granular absorbent with water or urine, preferably at least 10 milliliters of water or urine, agglutinates at least a plurality of the granules of extruded granular absorbent and at least a plurality of the granules of the non-extruded granular smooth, imperforate, dissolvable, biodegradable, dispensing, plastic and/or glass material form, defines or produces a clump thereof when dried to a steady state moisture content after three days, preferably five days, and more preferably seven days of drying of no more than 15% moisture content, preferably no more than 13% moisture content, and more preferably no more than about 12% moisture content by dried clump weight that has a clump crush strength or clump compressive strength of at least 250 PSI, preferably at least 300 PSI, and more preferably at least 400 PSI. Such a preferred multicomponent blended granular absorbent product that is wetted with water or urine, preferably wetting at least a plurality of pairs, i.e., at least three, of granules of extruded granular absorbent with water or urine, preferably at least 10 milliliters of water or urine, agglutinates at least a plurality of the granules of extruded granular absorbent and at least a plurality of the granules of the non-extruded granular smooth, imperforate, dissolvable, biodegradable, dispensing, plastic and/or glass material form, defines or produces a clump thereof when dried to a steady state moisture content after three days, preferably five days, and more preferably seven days of drying of no more than 15% moisture content, preferably no more than 13% moisture content, and more preferably no more than about 12% moisture content by dried clump weight that possesses a clump retention rate of at least 85%, preferably of at least 90%, and more preferably of at least 92%.

Another such preferred multicomponent blended granular absorbent product that is wetted with water or urine, preferably wetting at least a plurality of pairs, i.e., at least three, of granules of extruded granular absorbent with water or urine, preferably at least 10 milliliters of water or urine, agglutinates at least a plurality of the granules of extruded granular absorbent and at least a plurality of the granules of the granular smooth, imperforate, dissolvable, biodegradable, dispensing, plastic and/or glass material form, defines or produces a clump thereof when dried to a steady state moisture content after three days, preferably five days, and more preferably seven days of drying of no more than 15% moisture content, preferably no more than 13% moisture content, and more preferably no more than about 12% moisture content by dried clump weight that possesses (a) clump crush strength or clump compressive strength of at least 250 PSI, preferably at least 300 PSI, and more preferably at least 400 PSI, and/or (b) one of a clump retention rate of at least 85%, preferably of at least 90%, and more preferably of at least 92%. A further such preferred multicomponent blended granular absorbent product that is wetted with water or urine, preferably wetting at least a plurality of pairs, i.e., at least three, of granules of extruded granular absorbent with water or urine, preferably at least 10 milliliters of water or urine, agglutinates at least a plurality of the granules of extruded granular absorbent and at least a plurality of the granules of the smooth, imperforate, dissolvable, biodegradable, dispensing, plastic and/or glass material form, defines or produces a clump thereof when dried to a steady state moisture content after three days, preferably five days, and more preferably seven days of drying of no more than 15% moisture content, preferably no more than 13% moisture content, and more preferably no more than about 12% moisture content by dried clump weight that possesses (a) clump crush strength or clump compressive strength of at least 250 PSI, preferably at least 300 PSI, and more preferably at least 400 PSI, and/or (b) one of a clump retention rate of at least 93%, preferably of at least 95%, and more preferably of at least 98%.

Such an ultrahigh pressure extrusion method of making granules of extruded granular absorbent of the present invention has maximized the properties of starch in ways that have not been applied before, yielding absorbent extrudate granules used in the blended granular absorbent product of the invention that are lightweight, natural, biodegradable, and self-clumping; a product that is so strong in performance, its activity can be diluted by fillers, non-clumping carriers, and other granules made of non-extruded material, e.g., diluents, while still performing suitably well as litter as it is advantageously able to meet the high expectations that the public has been looking for in such a blended granular absorbent product.

At the core of understanding the inventive or novel absorbent extrudate granules of the extruded granular absorbent product's functionality is the fact that starch and water naturally adhere to each other through hydrogen bonding, or more descriptively, the intermolecular electrostatic force of attraction that is created between the hydrogen bound to an electronegative atom on one molecule to another electronegative atom from another molecule. The partially positive potential of the hydrogen atom extended out from the hydroxyl groups in a starch molecule are drawn toward the free electrons of the partially negative charge of oxygen atoms from the hydroxyl groups of neighboring starch molecules. The molecules then act like magnetic zipper or VELCRO as neighboring molecules come together.

As water enters this microscopic molecular world of starch interaction, water is a small hydroxyl group penetrant solvent that has enough penetrating power to overcome the starch to starch hydrogen bonding that had originally existed. This penetrating and separating characteristic of water with starch is one of the specific areas where a lot of previous attempts at lightweight starch based litter through extrusion have failed to apply a deeper hydrogen bond understanding to inherently produce a self-contained clumping nature. By adding other materials and/or large amounts of heat, the starch that may have been opened up through extrusion means actually becomes cross covalently bound on itself, caging the mobility of starch that is needed for the purposes of self-clumping after extrusion.

Another unique characteristic of this production process is the relatively low level of water that is present during extrusion, the purpose of which is to allow for very rapid solidification of the extruded material within a minimized time frame for plasticized surfaces to exist. Maintaining a very open and porous structure for fluid to penetrate is vital for a rapidly absorbent product that is able to pick up and retain water and urine rather quickly, preferably being able to pick up and retain 10 milliliters of water or urine within 30 seconds, preferably within 20 seconds, and more preferably within 10 seconds. In another such preferred blended granular absorbent product of the present invention, the absorbent extrudate granules enable 10 milliliters of water or urine poured into a litter box over ½ filled with the blended granular absorbent product to pick up and retain the water or urine as fast as it is poured onto granules of the blended granular absorbent product preferably doing so within 10 seconds, preferably within 5 seconds, and more preferably within 3 seconds of being poured onto the blended granular absorbent product.

The present invention also is directed to a system and method for making an improved extruded absorbent, preferably an improved extruded granular absorbent, from a starch-containing admixture using an ultrahigh extrusion pressure method of extrusion and extruder that extrudes the starch-containing admixture from the extruder at or under ultrahigh extrusion pressures believed not heretofore employed in starch, food, absorbent or adsorbent extrusion applications producing an improved absorbent extrudate in accordance with the present invention. While such an improved absorbent extrudate of the present invention can be in the form of one or more relatively long absorbent ropes, such as in the form substantially as extruded from the extruder, absorbent extrudate in accordance with the present invention preferably is broken up, such as by being divided, e.g., cut, into smaller absorbent pellets, and/or comminuted into even smaller-sized absorbent particles, upon or following extrusion from the extruder.

Such a system and method of the invention employs an ultrahigh pressure extruder, preferably a single screw extruder, which pressurizes a starch-containing admixture, containing at least 20 weight % of starch, at least 30 weight % of starch, at least 40 weight % of starch, preferably at least 50 weight % of starch, and more preferably at least 60 weight % of starch, by admixture weight, fed into the extruder to an ultrahigh extrusion pressure of at least 2000 pounds per square inch for a suitable residency time of at least about 5 seconds and no longer than about 25 seconds at a high enough extrusion temperature, of at least 80° Celsius, preferably at least 100° Celsius, in the extruder such that starch in the admixture is gelatinized in the extruder with at least some of the gelatinized starch modified, preferably physically modified, by or during ultrahigh pressure extrusion into an improved absorption modified starch contained in the extrudate extruded from the extruder which not only has an increased absorption capacity (absorbs at least one gram of water per gram of absorbent extrudate) but which also possesses a faster rate of absorption (of at least two grams of water per two grams of absorbent extrudate within no longer than twenty seconds, preferably within no longer than ten seconds, and more preferably within no longer than five seconds). In a method of making such an improved absorbent extrudate containing increased absorption modified starch, application of ultrahigh pressure to the starch-containing admixture in the extruder causes absorption-improving modification, preferably physical absorption-improving modification, of at least some of the starch of the admixture sufficient for the amount of absorption-increasing modified starch in the absorbent extrudate to not only significantly increase absorption capacity of the absorbent extrudate but which also significantly decreases absorption time.

In such an ultrahigh pressure extrusion system and method of the invention, extrusion of the starch-containing admixture at such an ultrahigh extrusion pressure from the extruder improves or increases the amount of water that can be picked up and retained by the absorbent extrudate by ultrahigh pressure extrusion causing at least plurality of pairs, i.e., at least three, of absorption-increasing and/or adsorption-increasing recesses, openings or pores to form in the outer surface of the absorbent extrudate. Such an ultrahigh pressure extrusion system and method preferably also results in at least a plurality, preferably at least a plurality of pairs, i.e., of spaced apart internal water pickup and retaining voids formed underneath the outer absorbent extrudate surface with at least one or more of the internal voids in liquid-flow communication with at least one or more of the recesses, openings or pores formed in the outer absorbent extrudate surface.

One preferred ultrahigh pressure extrusion system and method of the present invention results in at least a plurality, preferably at least a plurality of pairs of water-pickup capacity increasing recesses, opening or pores forming per square centimeter of surface area of the absorbent extrudate due to being extruded under ultrahigh pressure from the extruder. In such a preferred ultrahigh pressure extrusion system and method of the present invention results in at least a plurality, preferably at least a plurality of pairs of water-pickup capacity increasing internal voids forming per cubic centimeter of absorbent extrudate volume as a result of absorbent extrudate being extruded under ultrahigh pressure from the extruder.

Another preferred ultrahigh pressure extrusion system and method of the present invention results in at least a plurality, preferably at least a plurality of pairs of water-pickup capacity increasing recesses, opening or pores forming per ½ square centimeter of surface area of the absorbent extrudate due to being extruded under ultrahigh pressure from the extruder. In such a preferred ultrahigh pressure extrusion system and method of the present invention results in at least a plurality, preferably at least a plurality of pairs of water-pickup capacity increasing internal voids forming per cubic millimeter of absorbent extrudate volume as a result of absorbent extrudate being extruded under ultrahigh pressure from the extruder.

In one such system and method, ultrahigh pressure extrusion of such a starch-containing admixture at an ultrahigh extrusion pressure of at least 1850 PSI for a residency time within the extruder of at least five seconds and no longer than thirty seconds at a suitable extrusion temperature of at least 70° Celsius, preferably at least 80° Celsius, more preferably at least 90° Celsius, produces an absorbent extrudate in accordance with the present invention that not only readily picks up, e.g., absorbs water, such as urine, but which also has a relatively high capacity to pick up, e.g., adsorb oil. In another such system and method, ultrahigh pressure extrusion of such a starch-containing admixture at an ultrahigh extrusion pressure of at least 2000 PSI for a residency time within the extruder of at least eight seconds and no longer than twenty seconds at a suitable extrusion temperature of at least 80° Celsius, preferably at least 90° Celsius, more preferably at least 100° Celsius, produces an absorbent extrudate in accordance with the present invention that not only readily picks up, e.g., absorbs water, such as urine, and retains it, but which also has a relatively high capacity to pick up, e.g., adsorb oil. In a further such system and method, ultrahigh pressure extrusion of such a starch-containing admixture at an ultrahigh extrusion pressure of at least 2250 PSI for a residency time within the extruder of at least eight seconds and no longer than eighteen seconds at a suitable extrusion temperature of at least 80° Celsius, preferably at least 90° Celsius, more preferably at least 100° Celsius, produces an absorbent extrudate in accordance with the present invention that not only readily picks up, e.g., absorbs water, such as urine, and retains or hold it, but which also has a relatively high capacity to pick up, e.g., adsorb oil and retain or hold the oil. In still another such system and method, ultrahigh pressure extrusion of such a starch-containing admixture at an ultrahigh extrusion pressure of at least 2500 PSI for a residency time within the extruder of at least eight seconds and no longer than fifteen seconds at a suitable extrusion temperature of at least 80° Celsius, preferably at least 90° Celsius, more preferably at least 100° Celsius, produces an absorbent extrudate in accordance with the present invention that not only readily picks up, e.g., absorbs water, such as urine, and retains or hold it, but which also has a relatively high capacity to pick up, e.g., adsorb oil and retain or hold the oil. In yet another such system and method, ultrahigh pressure extrusion of such a starch-containing admixture at an ultrahigh extrusion pressure of at least 3000 PSI for a residency time within the extruder of at least eight seconds and no longer than fifteen seconds at a suitable extrusion temperature of at least 80° Celsius, preferably at least 90° Celsius, more preferably at least 100° Celsius, produces an absorbent extrudate in accordance with the present invention that not only readily picks up, e.g., absorbs water, such as urine, and retains or hold it, but which also has a relatively high capacity to pick up, e.g., adsorb oil and retain or hold the oil. In such a preferred system and method, subjecting such a starch-containing admixture to such an ultrahigh extrusion pressure within the extruder not only gelatinizes substantially all of the starch in the admixture but also further modifies, preferably at least physically modifies, at least some of the gelatinized starch into an absorption or adsorption increasing modified starch that not only improves the water absorption or water adsorption capacity of the high-pressure extruded absorbent but which also is oil-adsorptive and/or oil-adsorptive.

Such a preferred ultrahigh pressure absorbent extrudate, e.g., extruded granular absorbent, system and method extrudes a starch-containing admixture that resides within an ultrahigh pressure extruder for at least five seconds and no more than thirty seconds at an ultrahigh extrusion pressure of at least 2000 PSI and at a suitable extrusion temperature of at least 80° Celsius, preferably at least 100° Celsius, modifying at least some of the starch in the admixture into a water-soluble binder that preferably is a cold water soluble binder that is water soluble at room temperature that preferably is substantially uniformly distributed throughout the absorbent extrudate extruded from the ultrahigh pressure extruder. In one preferred ultrahigh pressure extrusion system and method, a starch-containing admixture containing at least 40 wt % starch is subjected to an ultrahigh extrusion pressure of at least 2500 PSI at a high enough extrusion temperature of at least 100° Celsius for a residency time of at least eight seconds and no greater than twenty seconds with such an ultrahigh pressure physically modifying enough starch in the admixture into water-soluble binder, preferably cold water soluble binder, for the extruded absorbent extrudate to be composed of at least 5%, preferably at least 7.5%, more preferably at least 10%, water-soluble binder, preferably cold water soluble binder, by weight of the absorbent extrudate. Such an amount of at least 5%, preferably at least 7.5%, and more preferably at least 10% water soluble binder present in the absorbent extrudate is a sufficient amount of water soluble binder present by absorbent extrudate weight for self-clumping of absorbent extrudate to occur when wetted with water, urine, or another water-containing liquid, such as an aqueous liquid, e.g., aqueous liquid waste, an aqueous solution, e.g., aqueous liquid waste solution, or another liquid composed of at least some water. In a preferred ultrahigh pressure extrusion system and embodiment, absorbent extrudate can be (a) cut into absorbent pellets upon or after extrusion from the extruder and/or (b) comminuted into smaller sized absorbent particles with one or both the extruded absorbent pellets and/or extruded absorbent particles used in an absorbent product, such as a general purpose granular absorbent product, a food-grade food-waste granular absorbent product, a biodegradable waste remediation granular absorbent product, a radiation waste remediation granular absorbent product, and/or cat, pet or animal litter, which agglutinates together into an agglutinated mass of at least a plurality of pairs, i.e., at least three, of extruded absorbent pellets and/or extruded absorbent particles when wetted with or by water, urine, aqueous liquid, e.g., aqueous liquid waste, an aqueous solution, e.g., aqueous liquid waste solution, or another liquid composed of at least some water.

When wetted with water, urine or another water-containing liquid, such absorbent extrudate, e.g., extruded granular absorbent pellets and/or extruded granular absorbent particles, produced using such an ultrahigh pressure extrusion system and method of the present invention agglutinates with at least some of the cold water soluble binder in the absorbent extrudate (a) becoming sticky or tacky, (b) becoming flowable, i.e., a flowable adhesive, and/or (c) forming an adhesive gel whose viscosity can and preferably does increase over time as the flowable adhesive and/or adhesive gel thickens during the agglutination process. Cold water soluble binder in absorbent extrudate of the present invention is an agglutinating agent that causes absorbent extrudate to agglutinate together when wetted and which also further serves as a clumping agent and/or clump hardening agent as the agglutinated absorbent extrudate transforms into clumps that become increasingly harder over time as the agglutinated absorbent extrudate dries.

Such absorbent extrudate pellets, particles and/or other sized pieces made with such an ultrahigh pressure extrusion system and method of the present invention substantially instantaneously begins agglutinating upon being wetted with a wetting liquid with the agglutinated mass of pellets, particles, and/or other-sized pieces of absorbent extrudate hardening into a solid relatively hard clump as the agglutinated mass dries to a moisture content of no greater than about 15%, preferably no greater than about 12%±2%, and more preferably no greater than 12%, having a clump compressive strength, preferably clump crush strength, of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%. In a preferred embodiment, pellets, particles and/or other-sized pieces of absorbent extrudate of the present invention agglutinates into a conglomerated coherent mass containing at least a plurality of pairs of, at least three, pellets, particles and/or pieces of absorbent extrudate per cubic centimeter and preferably per cubic millimeter of the wet or moist agglutinated mass or dried hardened clump formed substantially completely from such absorbent extrudate pellets, particles and/or pieces, e.g., homogenous absorbent extrudate clump, having a clump moisture content of no greater than about 12%±2%, preferably no greater than 12%, by clump weight has a dried and hardened clump compressive, preferably clump crush strength of at least of at least 600 PSI or at least 4137 kPa, preferably at least 750 PSI or at least 5171 kPa, more preferably at least 900 PSI or at least 6205 kPa at a clump retention rate of at least 85%, preferably at least 90% and more preferably at least 92%.

As such, absorbent extrudate of the present invention is self-agglutinating or of self-agglutinating construction, e.g., self-agglutinating composition, with at least a plurality of pairs, i.e., at least three, of pellets, particles or other pieces of the absorbent extrudate adjacent or near one another being drawn together or agglutinate into a conglomerated mass when wetted with water, urine, or a water-containing composition, e.g., water-containing liquid or aqueous solution. Such pellets, particles and/or other pieces of self-agglutinating absorbent extrudate are adjacent or near enough to one another to self-agglutinate when wetted by (i) adjoining other pellets, particles and/or pieces of absorbent extrudate, (ii) being in contact with other pellets, particles and/or pieces of absorbent extrudate, and/or (iii) being within 0.5 millimeters of other pellets, particles and/or pieces of absorbent extrudate. In a preferred embodiment, pellets, particles and other pieces of self-agglutinating absorbent extrudate in accordance with the present invention contain a sufficient amount of cold water soluble binder by absorbent extrudate weight for pellets, particles and pieces of the absorbent extrudate spaced within a relatively close self-agglutinating distance of about one millimeter (i.e., 1 mm±0.5 mm) of one another to be drawn together and self-agglutinate when wetted with enough aqueous wetting liquid, e.g., water, urine or another aqueous liquid, for at least some of the wetting liquid to flow in and around at least some of the absorbent extrudate pellets, particles and/or pieces. In one such preferred embodiment, pellets, particles and other pieces of self-agglutinating absorbent extrudate in accordance with the present invention contain a enough cold water soluble binder by absorbent extrudate weight for pellets, particles and pieces of the absorbent extrudate spaced a self-agglutinating distance of no farther away than one millimeter such that pellets, particles and/or other pieces of absorbent extrudate spaced within one millimeter of other pellets, particles and/or other pieces of absorbent extrudate will be drawn together or cohere when wetted with wetting liquid. In another such preferred embodiment, pellets, particles and other pieces of self-agglutinating absorbent extrudate in accordance with the present invention contain a enough cold water soluble binder by absorbent extrudate weight for pellets, particles and pieces of the absorbent extrudate spaced a self-agglutinating distance of no farther away than two millimeters such that pellets, particles and/or other pieces of absorbent extrudate spaced within two millimeters of other pellets, particles and/or other pieces of absorbent extrudate will be drawn together or cohere when wetted with an amount wetting liquid sufficient to not only wet the pellets, particles and/or pieces of absorbent extrudate but has wetting liquid that flows along, around and/or in between the absorbent extrudate pellets, particles and/or pieces.

Such absorbent extrudate made using such an ultra-high pressure extrusion system and method of the present invention has a sufficiently high amount of cold water soluble binder by weight percent of the absorbent extrudate that wetting with such aqueous wetting liquid causes agglutinating gelling to occur that facilitates agglutination and hardened clump formation. Wetting with enough wetting liquid so as to substantially completely wet, even saturate, at least a plurality of pairs of, i.e., at least three, pellets, particles and/or pieces of absorbent extrudate with the wetting liquid solubilizing at least some of the cold water soluble binder of the wetted absorbent extrudate forming flowable adhesive and/or an agglutinating adhesive gel that agglutinates at least a plurality of pairs of, i.e., at least three, pellets, particles and/or pieces of absorbent extrudate. In a preferred embodiment, wetting with enough wetting liquid so as to substantially completely wet, even saturate, at least a plurality of pairs of, i.e., at least three, pellets, particles and/or pieces of absorbent extrudate with the wetting liquid solubilizing at least some of the cold water soluble binder of the wetted absorbent extrudate forming flowable adhesive and/or an agglutinating adhesive gel that forms agglutinated masses and clumps containing at least a plurality of pairs of, i.e., at least three, pellets, particles and/or pieces of absorbent extrudate per cubic centimeter, preferably per cubic millimeter of the wet or moist agglutinated mass and dry hardened clump.

Water soluble binder in ultrahigh pressure absorbent extrudate produced using such an ultrahigh pressure absorbent extrusion system using such an ultrahigh extrusion system of the present invention gels when wetted water or urine forming a water-soluble adhesive colloid that preferably is or includes a cold-water soluble binder gel disposed about at least a portion of the exterior, e.g., outer surface, of the wetted ultrahigh pressure absorbent extrudate. When wetted with water or urine, in addition to gelling or forming such a water-soluble adhesive colloid disposed around or about the exterior, e.g., outer surface, of the wetted ultrahigh pressure absorbent extrudate, wetting of the ultrahigh pressure absorbent extrudate with water or urine also causes the ultrahigh pressure absorbent extrudate to swell such that ultrahigh pressure absorbent extrudate of the present invention both gels and swells when wetted with water or urine. In swelling when wetted, wetting of the ultrahigh pressure absorbent extrudate with water or urine causes the absorbent extrudate to swell so as to occupy a greater space or volume than the same absorbent extrudate occupied prior to being wetted with the water or urine.

In a preferred embodiment, the ultrahigh pressure extrusion system and method of the invention produces absorbent extrudate with water-soluble binder distributed throughout, preferably substantially homogenously throughout, the absorbent extrudate with an exterior or outer surface of the absorbent extrudate also being composed of water-soluble binder. When wetted with water or urine, the absorbent extrudate both gels and swells with gelling occurring due to production of a water-soluble adhesive colloid, preferably a cold-water soluble adhesive gel, which agglutinates adjacent absorbent extrudate, and swelling occurring because wetting with water or urine causes the wetted absorbent extrudate to expand in size or volume at least 1%, preferably at least 2%, and more preferably at least 3% than prior to wetting. In addition, gelling preferably also causes at least some of the water-soluble adhesive colloid produced by wetting to flow from the wetted absorbent extrudate around and adjacent other absorbent extrudate agglutinating the absorbent extrudate preferably forming a generally hard clump thereof after drying thereof.

In such a preferred gelling and swelling absorbent extrudate of the present invention, the ultrahigh pressure extrusion system and method produce absorbent extrudate with at least 5% by weight of the water-soluble binder distributed throughout, preferably substantially homogenously throughout, the absorbent extrudate with an exterior or outer surface of the absorbent extrudate also being composed of water-soluble binder in an amount of at least 2% by weight, preferably at least 3% by weight, and more preferably at least 5% by weight. In another such preferred embodiment, the ultrahigh pressure extrusion system and method produce absorbent extrudate with at least 7.5% by weight of the water-soluble binder distributed throughout, preferably substantially homogenously throughout, the absorbent extrudate with an exterior or outer surface of the absorbent extrudate also being composed of water-soluble binder in an amount of at least 3% by weight, preferably at least 5% by weight, and more preferably at least 7% by weight. In a further such preferred embodiment, the ultrahigh pressure extrusion system and method produce absorbent extrudate with at least 10% by weight of the water-soluble binder distributed throughout, preferably substantially homogenously throughout, the absorbent extrudate with an exterior or outer surface of the absorbent extrudate also being composed of water-soluble binder in an amount of at least 5% by weight, preferably at least 7% by weight, and more preferably at least 9% by weight. In a further such preferred embodiment, the ultrahigh pressure extrusion system and method produce absorbent extrudate with at least 15% by weight of the water-soluble binder distributed throughout, preferably substantially homogenously throughout, the absorbent extrudate with an exterior or outer surface of the absorbent extrudate also being composed of water-soluble binder in an amount of at least 7% by weight, preferably at least 10% by weight, and more preferably at least 12% by weight. In a preferred embodiment, the water-soluble binder in any of the above embodiments can be cold-water soluble binder, include cold-water soluble binder, and/or be formed in part of cold-water soluble binder including in any of the aforementioned weight percent(s) recited above in this paragraph.

In another preferred embodiment, when wetted with water or urine, the absorbent extrudate both gels and swells with gelling occurring due to production of a water-soluble adhesive colloid, preferably a cold-water soluble adhesive gel, which agglutinates adjacent absorbent extrudate, and swelling occurring because wetting with water or urine causes the wetted absorbent extrudate to expand in size or volume at least 4%, preferably at least 5%, and more preferably at least 7% than before wetting. In addition, gelling preferably also causes at least some of the water-soluble adhesive colloid produced by wetting to flow from the wetted absorbent extrudate around and adjacent other absorbent extrudate agglutinating the absorbent extrudate preferably forming a generally hard clump thereof after drying thereof.

In one such preferred embodiment, the ultrahigh pressure extrusion system and method of the invention produces absorbent extrudate with water-soluble binder distributed throughout, preferably substantially homogenously throughout, the absorbent extrudate with an exterior or outer surface of the absorbent extrudate also being composed of water-soluble binder In a preferred embodiment, the ultrahigh pressure extrusion system and method produce absorbent extrudate with at least 5% by weight of the water-soluble binder distributed throughout, preferably substantially homogenously throughout, the absorbent extrudate with an exterior or outer surface of the absorbent extrudate also being composed of water-soluble binder in an amount of at least 2% by weight, preferably at least 3% by weight, and more preferably at least 5% by weight. In another preferred embodiment, the ultrahigh pressure extrusion system and method produce absorbent extrudate with at least 7.5% by weight of the water-soluble binder distributed throughout, preferably substantially homogenously throughout, the absorbent extrudate with an exterior or outer surface of the absorbent extrudate also being composed of water-soluble binder in an amount of at least 3% by weight, preferably at least 5% by weight, and more preferably at least 7% by weight. In a further preferred embodiment, the ultrahigh pressure extrusion system and method produce absorbent extrudate with at least 7.5% by weight of the water-soluble binder distributed throughout, preferably substantially homogenously throughout, the absorbent extrudate with an exterior or outer surface of the absorbent extrudate also being composed of water-soluble binder in an amount of at least 3% by weight, preferably at least 5% by weight, and more preferably at least 7% by weight.

Such a swelling and gelling ultrahigh extrusion pressure produced absorbent extrudate can advantageously \ be blended with such pellets, beads, balls or the like made of cellulosic material, e.g., recycled paper, paper, wood, fiber, glass, plastic, corn-cob, or other non-extruded material that can be and which preferably also is inert, e.g., an inert diluent, of lower cost, lighter weight, e.g., lower density, and/or which is non-absorptive and/or non-adsorptive to form another preferred finished granular absorbent product of the invention that self-agglutinates when wetted with water or urine producing substantially hard clumps thereof when dry.

FIG. 1 illustrates a preferred but exemplary embodiment of a system 20 for producing extruded granular absorbent in accordance with the invention that employs an extruder 22 which gelatinizes starch in a starch-containing admixture delivered into the extruder 22 from an admixture-holding container 24, e.g., a hopper or bin 26, and extrudes the gelatinized starch-containing admixture from the extruder 22 in the form of at least a plurality of pairs of, i.e., at least three, pellets 28a of granular absorbent extrudate 30 per second of extruder operation that are processed after extrusion using a cold-processing arrangement 32 and method of the present invention that cools, dries and thereafter processes the cooled and dried extruded pellets 28a in a manner that changes at least one characteristic or property of the pellets 28a in preparation for granular absorbent use. The cold-processing arrangement 32 includes a cooling and drying subsystem 34 that is configured to cold-process the extruded pellets 28a by at least one of cooling and drying the pellets 28a, and a granular absorbent processing subsystem 36 that post-extrusion processes the cooled and/or dried pellets 28a in a manner that changes and/or preferably improves at least one characteristic or property of the pellets 28a while maintaining the pellets 28a in a cold-processed condition during processing.

The granular absorbent pellets 28a are therefore cold-processed upon extrusion from the extruder 22 by at least cooling the pellets 28a and preferably also by drying the pellets 28a immediately upon extrusion using such a cold-processing arrangement 32 to thereby advantageously preserve and preferably substantially freeze at least one of the state, structure, phase and/or matrix of one or more of the starches in the pellets 28a modified by or during extrusion of the starch-containing admixture from the extruder 22 producing pellets 28a of extruded granular absorbent of the present invention that better maintain(s) their starch state(s), starch structure(s), starch phase(s), starch matrix, liquid absorbent properties and/or solubility of starch in the pellets 28a during granular absorbent use. Not only does cold-processing of the pellets 28a, beginning the instant the pellets are extruded out of the die 44 of the extruder 22, preserve and preferably substantially freeze the state, structure, phase and/or matrix of the extruder-modified starches in the pellets 28a, including by preventing rapid phase retrogradation of starch, including water soluble binder, in the pellets 28a, cold-processing of the pellets 28a also advantageously prevents post-extrusion shrinkage of the pellets 28a that otherwise would typically occur immediately upon extrusion from the die 44 of the extruder 22. Such cold-processing of the pellets 28a immediately upon extrusion further advantageously enables post-extrusion processing to be carried out by the post-extrusion granular absorbent pellet processing subsystem 36 on the cooled and/or dried pellets 28a in a manner that changes and which preferably improves at least one characteristic or property of the pellets 28a during or as a result of post-extrusion processing while maintaining the pellets 28a substantially in the cold-processed condition during post-extrusion pellet processing.

With continued reference to FIG. 1, the extruded granular absorbent production system 20 has at least one extruder 22 that preferably is a single-screw food-type, snack-type or extrusion-cooker extrusion machine 38, e.g., single-screw extruder 38, which employs a rotary screw drive motor (not shown) having a horsepower rating of at least twenty (20) horsepower and preferably no greater than two-hundred (200) horsepower, preferably between forty (40) and one-hundred fifty (150) horsepower, and more preferably between fifty (50) and one-hundred (100) horsepower, which drives a single generally horizontal elongate screw or auger received inside an elongate horizontally oriented generally cylindrical chamber of a barrel of the extruder 38 that can be heated and form part of or be disposed within an elongate generally horizontally extending extruder housing 40. The extruder 22 has a generally circular die 42 disposed at a discharge end 44 of the extruder that has at least one and preferably at least a plurality of annular rings or arrays of die through-holes (not shown) formed therein with each ring or array having at least a plurality of pairs of, i.e., at least three, die through-holes (not shown) each with a length, depth, diameter, throat and/or other die hole configuration suitable for discharging or expelling extrudate, e.g., ropes of starch-containing granular absorbent extrudate extruded from a starch-containing admixture, therethrough during extruder operation used to form extruded starch-containing pellets 28a having a desired width or diameter preferably falling within an acceptable range of widths or diameters suitable for the intended granular absorbent use or application. As the ropes of granular absorbent extrudate are expelled or discharged under pressure through the holes in the extruder die 42, a rotating cutter (not shown) equipped with at least a plurality, preferably at least a plurality of pairs of, i.e., at least three, cutter arms (not shown) each carrying a replaceable knife or blade is rotated by an electric motor at a rotational speed of at least 2,500 revolutions per minute (RPM), preferably at least 3,500 RPM, and more preferably at least 4,000 RPM to cut the granular absorbent extrudate ropes being discharged from or expelled out the holes of the die 42 into discrete pellets 28a that are elongate, preferably oblong, and which have a desired pellet length that preferably falls within an acceptable range of lengths suitable for the intended granular absorbent use of the pellets 28a. Each one of the extruded pellets 28a is not only elongate but can be oblong, e.g. generally oval, and preferably irregularly shaped, e.g., having one or more lobes, fibrils, fingers, or other outwardly extending projections, having a porous outer surface with at least a plurality of spaced apart pores, holes, or recesses formed in the pellet outer surface, and having a void filled pellet interior that includes at least a plurality, preferably at least a plurality of pairs of, i.e. at least three, internal voids within the pellet 28a preferably forming a void-filled internal starch pellet matrix. Although also not shown in FIG. 1, the rotary pellet cutter is received in a knife cage 46 that houses the cutter and also forms a pellet-collecting enclosure 48, e.g., pellet collector 48, disposed at the discharge end 44 of the extruder 22, e.g., discharge end 44 of single-screw extruder 38, which also encloses the extruder die 42 such that the pellets 28a cut by the cutter from the extrudate expelled or discharged out the holes of the die 42 during extruder operation are expelled or discharged into a chamber 50 defined within cage 46 or pellet-collecting enclosure 48.

An extruded granular absorbent production system 20 in accordance with the present invention can employ the extruded granular absorbent extruding methods and/or equipment, use the starch-containing admixture formulations, and/or blend the resultant pellets 28a of extruded granular absorbent in accordance with those disclosed or otherwise described in commonly owned U.S. application Ser. Nos. 13/842,534, 13/868,073, 13/868,084, 14/426,483, 14/605,045, 14/656,086, 14/656,692, and 14/668,975, respectively published as U.S. Patent Application Publication Nos. US20140069344, US20140069345, US20140069346, US20150238931, US20150145164, US20150181832, US20150181834, and US20150196005 including to produce extruded granular absorbent pellets 28a, including that which is well suited for use as cat, dog, pet or animal litter such that each of U.S. Patent Application Publication Nos. US20140069344, US20140069345, US20140069346, US20150238931, US20150145164, US20150181832, US20150181834, and US20150196005 are hereby expressly incorporated herein by reference. In addition, it is also contemplated that select portions of the extruded granular absorbent production method and extruded granular absorbent production system 20 can be incorporated into and/or used with the extruded granular absorbent and/or litter making methods, systems, production lines, equipment and/or extruders disclosed in one or more of U.S. Patent Application Publication Nos. US20140069344, US20140069345, US20140069346, US20150238931, US20150145164, US20150181832, US20150181834, and/or US20150196005, in accordance with the present invention including with respect to implementation and/or carrying out the present invention. More specifically, it is contemplated that portions of the extruded granular absorbent production method and extruded granular absorbent production system 20 that can be incorporated into or used with the extruded granular absorbent and/or litter making methods, systems, production lines, equipment and/or extruders disclosed in one or more of U.S. Patent Application Publication Nos. US20140069344, US20140069345, US20140069346, US20150238931, US20150145164, US20150181832, US20150181834, and/or US20150196005 include at least those method steps and/or system components, e.g. equipment, responsible for cold-processing of the extruded pellets 28a upon or after extrusion, including the cold-processing arrangement 32, preferably at least the cooling and drying subsystem 34 thereof, and/or that which relates to post-extrusion processing of the pellets including post-extrusion granular absorbent, e.g., pellet 28a, processing subsystem 36, which includes related equipment, including one or more of the post-extrusion processing devices, machines and/or mills disclosed and or shown elsewhere herein.

In an improved presently preferred extruded granular absorbent production method that employs an improved extruded granular absorbent production system 20 of the present invention, a starch-containing admixture having at least 35% starch, preferably at least 40% starch, and more preferably at least 45% starch by dry admixture weight, and a moisture content of no greater than 30%, preferably no greater than about 25%±3.5%, and more preferably no greater than about 20%±2.5%, by dry admixture weight is delivered from the hopper 26, such as via gravity feed, into the extruder 22, preferably single-screw extruder 38, where the admixture in the extruder is subjected to an extrusion pressure at or adjacent the extruder discharge end 44 or at the die 42 during extrusion of at least 2,000 pounds per square inch (PSI) or at least 13791 kilopascals (kPa), preferably at least 2,500 PSI or at least 17236 kPa, and more preferably at least about 3,000 PSI±10% or at least about 20684 kPa±10%, and an extrusion temperature at or adjacent the extruder discharge end 44 or at the die 42 during extrusion of at least 100 degrees Celsius or at least 212 degrees Fahrenheit, preferably at least 120° C. or at least 248° F., and more preferably at least about 135° C.±10° C. or at least about 275° F.±18° F. such that at least some of the starch gelatinized in the extruder during extrusion is physically and/or thermally modified into forming a starch-based water soluble binder in each extruded pellet 28a in an amount by pellet weight sufficient to cause at least a plurality of pairs, i.e., at least three, of the pellets 28a to self-clump together forming an agglutinated mass composed of at least a plurality of pairs of the pellets 28a when wetted by water or urine, e.g., cat, dog, pet or other animal urine making such pellets 28a suitable for use as granular absorbent litter. In a preferred admixture and granular absorbent extrusion method, each one of the extruded pellets 28a preferably has enough starch-based water soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith.

No additional moisture or water is added to the admixture while in the extruder 22 during starch gelatinization and pellet extrusion. In one preferred admixture, the at least at least 35% starch, preferably at least 40% starch, and more preferably at least 45% starch by dry admixture weight is provided from whole grain sorghum having a moisture content no greater than 18%, preferably no greater than 15%, and more preferably no greater than about 14%±1% by weight of the admixture, with a preferred admixture composed of at least 50% whole grain sorghum, preferably at least 65% whole grain sorghum, and more preferably at least 75% whole grain sorghum by dry admixture weight with the entirety of such an admixture having a total moisture content of no greater than 18%, preferably no greater than 15%, and more preferably no greater than about 14%±1% by weight of the admixture. No additional moisture or water is added to the admixture while in the extruder 22 during starch gelatinization and pellet extrusion. In such a preferred sorghum-based admixture and granular absorbent extrusion method, each one of the extruded pellets 28a preferably has enough starch-based water soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith.

In another preferred admixture, the at least at least 35% starch, preferably at least 40% starch, and more preferably at least 45% starch by dry admixture weight is provided from corn, preferably comminuted or ground corn in the form of cornmeal, and more preferably degermed cornmeal having a moisture content no greater than 30%, preferably no greater than 25%, and more preferably no greater than about 20%±2.5% by weight of the admixture, with a preferred admixture composed of at least 50% of the corn, preferably cornmeal, and more preferably degermed cornmeal, preferably at least 65% of the corn, preferably cornmeal, and more preferably degermed cornmeal, and more preferably at least 75% of the corn, preferably cornmeal, and more preferably degermed cornmeal by dry admixture weight with the entirety of such an admixture having a total moisture content of no greater than 30%, preferably no greater than 25%, and more preferably no greater than about 20%±2.5% by weight of the admixture. No additional moisture or water is added to the admixture while in the extruder 22 during starch gelatinization and pellet extrusion. In such a preferred corn-containing admixture and granular absorbent extrusion method, each one of the extruded pellets 28a preferably has enough starch-based water soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith.

A scoopable clump is formed of such an agglutinated mass of such wetted pellets 28a within two minutes of the plurality of pairs of pellets 28a being wetted that can be readily scooped from other pellets 28a of extruded granular absorbent litter in a litter box and produces a hardened clump when the agglutinated mass is dried to a moisture content of no greater than about 12%±2%, preferably less than 12%, by clump weight having a clump compressive crush strength of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%.

In a preferred extruded granular absorbent method and embodiment, such an admixture having at least admixture having at least 35% starch, preferably at least 40% starch, and more preferably at least 45% starch by dry admixture weight, and a moisture content of no greater than 30%, preferably no greater than about 25%±3.5%, and more preferably no greater than about 20%±2.5%, by dry admixture weight is gelatinized in the extruder 22, preferably single-screw extruder 38, and subjected to an extrusion pressure at or adjacent the extruder discharge end 44 or at the die 42 during extrusion of at least 2,000 pounds per square inch (PSI) or at least 13791 kilopascals (kPa), preferably at least 2,500 PSI or at least 17236 kPa, and more preferably at least about 3,000 PSI±10% or at least about 20684 kPa±10%, and an extrusion temperature at or adjacent the extruder discharge end 44 or at the die 42 during extrusion of at least 100 degrees Celsius or at least 212 degrees Fahrenheit, preferably at least 120° C. or at least 248° F., and more preferably at least about 135° C.±10° C. or at least about 275° F.±18° F. such that at least some of the starch gelatinized in the extruder during extrusion is physically and/or thermally modified into forming at least 5% starch-based water soluble binder, preferably least 5% water-soluble carbohydrate polymer binder, and more preferably at least 5% cold water soluble starch or starch-based binder by pellet weight in each extruded pellet 28a that functions as a water-soluble clumping agent that preferably is an amount great enough in each extruded granular absorbent pellet 28a to self-clump together at least a plurality of pairs of, i.e., at least three, pellets 28a, without the presence of any other clumping agent or binder, forming an agglutinated mass of the pellets 28a when the at least a plurality of pairs of the pellets 28a are wetted with water or urine. No additional moisture or water is added to the admixture while in the extruder 22 during starch gelatinization and pellet extrusion. In one preferred admixture, the at least at least 35% starch, preferably at least 40% starch, and more preferably at least 45% starch by dry admixture weight is provided from whole grain sorghum having a moisture content no greater than 18%, preferably no greater than 15%, and more preferably no greater than about 14%±1% by weight of the admixture, with a preferred admixture composed of at least 50% whole grain sorghum, preferably at least 65% whole grain sorghum, and more preferably at least 75% whole grain sorghum by dry admixture weight with the entirety of such an admixture having a total moisture content of no greater than 18%, preferably no greater than 15%, and more preferably no greater than about 14%±1% by weight of the admixture. No additional moisture or water is added to the admixture while in the extruder 22 during starch gelatinization and pellet extrusion. In another preferred admixture, the at least at least 35% starch, preferably at least 40% starch, and more preferably at least 45% starch by dry admixture weight is provided from corn, preferably comminuted or ground corn in the form of cornmeal, and more preferably degermed cornmeal having a moisture content no greater than 30%, preferably no greater than 25%, and more preferably no greater than about 20%±2.5% by weight of the admixture, with a preferred admixture composed of at least 50% of the corn, preferably cornmeal, and more preferably degermed cornmeal, preferably at least 65% of the corn, preferably cornmeal, and more preferably degermed cornmeal, and more preferably at least 75% of the corn, preferably cornmeal, and more preferably degermed cornmeal by dry admixture weight with the entirety of such an admixture having a total moisture content of no greater than 30%, preferably no greater than 25%, and more preferably no greater than about 20%±2.5% by weight of the admixture. No additional moisture or water is added to the admixture while in the extruder 22 during starch gelatinization and pellet extrusion. In such a preferred admixture and granular absorbent extrusion method, each one of the extruded pellets 28a preferably has enough starch-based water soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith. A scoopable clump is formed of such an agglutinated mass of such wetted pellets 28a within two minutes of the plurality of pairs of pellets 28a being wetted that can be readily scooped from other pellets 28a of extruded granular absorbent litter in a litter box and produces a hardened clump when the agglutinated mass is dried to a moisture content of no greater than about 12%±2%, preferably less than 12%, by clump weight having a clump compressive crush strength of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%.

In another preferred extruded granular absorbent method and embodiment, such an admixture having at least admixture having at least 35% starch, preferably at least 40% starch, and more preferably at least 45% starch by dry admixture weight, and a moisture content of no greater than 30%, preferably no greater than about 25%±3.5%, and more preferably no greater than about 20%±2.5%, by dry admixture weight is gelatinized in the extruder 22, preferably single-screw extruder 38, and subjected to an extrusion pressure at or adjacent the extruder discharge end 44 or at the die 42 during extrusion of at least 2,000 pounds per square inch (PSI) or at least 13791 kilopascals (kPa), preferably at least 2,500 PSI or at least 17236 kPa, and more preferably at least about 3,000 PSI±10% or at least about 20684 kPa±10%, and an extrusion temperature at or adjacent the extruder discharge end 44 or at the die 42 during extrusion of at least 100 degrees Celsius or at least 212 degrees Fahrenheit, preferably at least 120° C. or at least 248° F., and more preferably at least about 135° C.±10° C. or at least about 275° F.±18° F. such that at least some of the starch gelatinized in the extruder during extrusion is physically and/or thermally modified into forming at least 7.5% starch-based water soluble binder, preferably least 7.5% water-soluble carbohydrate polymer binder, and more preferably at least 7.5% cold water soluble starch or starch-based binder in each extruded pellet 28a by pellet weight that functions as a water-soluble clumping agent that preferably is an amount great enough in each extruded granular absorbent pellet 28a to self-clump at least a plurality of pairs of pellets 28a, without the presence of any other clumping agent or binder, into an agglutinated mass of the pellets 28a when the at least a plurality of pairs of the pellets 28a are wetted with water or urine. No additional moisture or water is added to the admixture while in the extruder 22 during starch gelatinization and pellet extrusion. In one preferred admixture, the at least at least 35% starch, preferably at least 40% starch, and more preferably at least 45% starch by dry admixture weight is provided from whole grain sorghum having a moisture content no greater than 18%, preferably no greater than 15%, and more preferably no greater than about 14%±1% by weight of the admixture, with a preferred admixture composed of at least 50% whole grain sorghum, preferably at least 65% whole grain sorghum, and more preferably at least 75% whole grain sorghum by dry admixture weight with the entirety of such an admixture having a total moisture content of no greater than 18%, preferably no greater than 15%, and more preferably no greater than about 14%±1% by weight of the admixture. No additional moisture or water is added to the admixture while in the extruder 22 during starch gelatinization and pellet extrusion. In another preferred admixture, the at least at least 35% starch, preferably at least 40% starch, and more preferably at least 45% starch by dry admixture weight is provided from corn, preferably comminuted or ground corn in the form of cornmeal, and more preferably degermed cornmeal having a moisture content no greater than 30%, preferably no greater than 25%, and more preferably no greater than about 20%±2.5% by weight of the admixture, with a preferred admixture composed of at least 50% of the corn, preferably cornmeal, and more preferably degermed cornmeal, preferably at least 65% of the corn, preferably cornmeal, and more preferably degermed cornmeal, and more preferably at least 75% of the corn, preferably cornmeal, and more preferably degermed cornmeal by dry admixture weight with the entirety of such an admixture having a total moisture content of no greater than 30%, preferably no greater than 25%, and more preferably no greater than about 20%±2.5% by weight of the admixture. No additional moisture or water is added to the admixture while in the extruder 22 during starch gelatinization and pellet extrusion. A scoopable clump is formed of such an agglutinated mass of such wetted pellets 28a within two minutes of the plurality of pairs of pellets 28a being wetted that can be readily scooped from other pellets 28a of extruded granular absorbent litter in a litter box and which is an agglutinated mass of the pellets 28a that produces a hardened clump when the agglutinated pellet mass is dried to a moisture content of no greater than about 12%±2%, preferably less than 12%, by clump weight having a clump compressive crush strength of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%. In such a preferred admixture and granular absorbent extrusion method, each one of the extruded pellets 28a preferably has enough starch-based water soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith.

In still another preferred extruded granular absorbent method and embodiment, such an admixture having at least admixture having at least 35% starch, preferably at least 40% starch, and more preferably at least 45% starch by dry admixture weight, and a moisture content of no greater than 30%, preferably no greater than about 25%±3.5%, and more preferably no greater than about 20%±2.5%, by dry admixture weight is gelatinized in the extruder 22, preferably single-screw extruder 38, and subjected to an extrusion pressure at or adjacent the extruder discharge end 44 or at the die 42 during extrusion of at least 2,000 pounds per square inch (PSI) or at least 13791 kilopascals (kPa), preferably at least 2,500 PSI or at least 17236 kPa, and more preferably at least about 3,000 PSI±10% or at least about 20684 kPa±10%, and an extrusion temperature at or adjacent the extruder discharge end 44 or at the die 42 during extrusion of at least 100 degrees Celsius or at least 212 degrees Fahrenheit, preferably at least 120° C. or at least 248° F., and more preferably at least about 135° C.±10° C. or at least about 275° F.±18° F. such that at least some of the starch gelatinized in the extruder during extrusion is physically and/or thermally modified into forming at least 10% starch-based water soluble binder, preferably least 10% water-soluble carbohydrate polymer binder, and more preferably at least 10% cold water soluble starch or starch-based binder in each extruded pellet 28a by pellet weight that functions as a water-soluble clumping agent that preferably is an amount great enough in each extruded granular absorbent pellet 28a to self-clump at least a plurality of pairs of pellets 28a, without the presence of any other clumping agent or binder, into forming an agglutinated mass of the pellets 38 when the at least a plurality of pairs of the pellets 28a are wetted with water or urine. No additional moisture or water is added to the admixture while in the extruder 22 during starch gelatinization and pellet extrusion. In one preferred admixture, the at least at least 35% starch, preferably at least 40% starch, and more preferably at least 45% starch by dry admixture weight is provided from whole grain sorghum having a moisture content no greater than 18%, preferably no greater than 15%, and more preferably no greater than about 14%±1% by weight of the admixture, with a preferred admixture composed of at least 50% whole grain sorghum, preferably at least 65% whole grain sorghum, and more preferably at least 75% whole grain sorghum by dry admixture weight with the entirety of such an admixture having a total moisture content of no greater than 18%, preferably no greater than 15%, and more preferably no greater than about 14%±1% by weight of the admixture. No additional moisture or water is added to the admixture while in the extruder 22 during starch gelatinization and pellet extrusion. In such a preferred sorghum-containing admixture and granular absorbent extrusion method, each one of the extruded pellets 28a preferably has enough starch-based water soluble binder that at least some of the water-soluble binder forms a flowable adhesive when pellets 28a are wetted that flows from, around and in between each wetted pellet 28a and at least one other pellet 28a adjacent thereto, adjoining therewith, or in contact therewith. In another preferred admixture, the at least at least 35% starch, preferably at least 40% starch, and more preferably at least 45% starch by dry admixture weight is provided from corn, preferably comminuted or ground corn in the form of cornmeal, and more preferably degermed cornmeal having a moisture content no greater than 30%, preferably no greater than 25%, and more preferably no greater than about 20%±2.5% by weight of the admixture, with a preferred admixture composed of at least 50% of the com, preferably cornmeal, and more preferably degermed cornmeal, preferably at least 65% of the com, preferably cornmeal, and more preferably degermed cornmeal, and more preferably at least 75% of the com, preferably cornmeal, and more preferably degermed cornmeal by dry admixture weight with the entirety of such an admixture having a total moisture content of no greater than 30%, preferably no greater than 25%, and more preferably no greater than about 20%±2.5% by weight of the admixture. In such a preferred cornmeal-containing admixture and granular absorbent extrusion method, each one of the extruded pellets 28a preferably has enough starch-based water soluble binder that at least some of the water-soluble binder forms a flowable adhesive when pellets 28a are wetted that flows from, around and in between each wetted pellet 28a and at least one other pellet 28a, preferably at least a plurality of other pellets 28a, disposed adjacent thereto, adjoining therewith, or in contact therewith. No additional moisture or water is added to the admixture while in the extruder 22 during starch gelatinization and pellet extrusion. A scoopable clump is formed of such an agglutinated mass of such wetted pellets 28a within two minutes of the plurality of pairs of pellets 28a being wetted that is scoopable from other surrounding unwetted pellets 28a of extruded granular absorbent litter in a litter box and which is an agglutinated mass of the pellets 28a that produces a hardened clump of the pellets 28a when the agglutinated pellet mass is dried to a moisture content of no greater than about 12%±2%, preferably less than 12%, by clump weight having a clump compressive crush strength of at least 200 pounds per square inch (PSI) or at least 1378 kilopascals (kPa), preferably at least 350 PSI or at least 2413 kPa, and more preferably at least 500 PSI or at least 3447 kPa and a clump retention rate of at least 90%, preferably at least 92%, and more preferably at least 95%.

The cooling and drying subsystem 34 of the pellet cold-processing arrangement 32 of the extruded granular absorbent production system 20 of the present invention includes a pellet cooling air blower 52 in fluid-flow communication via an extruded pellet coolant gas conveying duct 54 with the chamber 50 of the pellet collector 48, e.g., pellet-collecting enclosure 48 that supplies gaseous coolant, preferably cooling air, at a temperature of at least 100° F. less or at least 37° C. than the temperature of the pellets 28a exiting the extruder die 42 during operation of the extruder 22 during pellet extrusion. The pellet cooling air blower 52 preferably is a centrifugal fan or squirrel cage blower that draws in ambient air at a temperature no higher than 100° F. or no higher than 37° C., preferably no higher than 90° F. or no higher than 32° C., and more preferably no higher than 80° F. or no higher than 26° F. at a volumetric flow rate high enough to relatively rapidly transport the extruded pellets 28a immediately upon extrusion from the extruder die 42 via a pellet conveying duct 56 of a pneumatic pellet conveyor 58 to a post-extrusion pellet processing device 60 of the post-extrusion granular absorbent pellet processing subsystem 36 while also rapidly cooling and preferably also drying the pellets 28a during pneumatic conveyor transport. In a preferred pellet cold-processing method and cooling and drying subsystem 34 of the pellet cold-processing arrangement 32 of the present invention, the blower 52 turbulently conveys ambient air externally, e.g., outside, of the extruder 22 and chamber 50 through the coolant duct 54 to the chamber 50 which is or functions as a pellet cooling chamber 50 at a high enough volumetric flow rate to cold process the pellets 28a and cool the pellets 28a immediately upon extrusion from the extruder die 42 at a pellet coolant rate of at least 10 degrees Fahrenheit or at least 5 degrees Celsius, preferably at least 15 degrees Fahrenheit or at least 7 degrees Celsius, and more preferably at least 20 degrees Fahrenheit or at least 10 degrees Celsius per second of time, for at least one second and preferably for at least two seconds, after extrusion of transport of the extruded pellets 28a from the extruder die 42 through the pellet cooling chamber 50 and into the pellet conveying duct 56 of the pneumatic conveyor while maintaining a post-extrusion pellet moisture content of the pellets 28a to less than 14%, preferably less than 12%, and more preferably less than about 10%±1% by pellet weight. In a preferred pellet cold-processing method and embodiment, the blower 52 conveys ambient air at a temperature no higher than 100° F. or no higher than 37° C., preferably no higher than 90° F. or no higher than 32° C., and more preferably no higher than 80° F. or no higher than 26° F. through the pellet coolant duct to the pellet cooling chamber 50 at a volumetric flow rate of at least 250 cubic feet per minute (CFM) or at least 7 cubic meters per minute (CMM), preferably at least 500 CFM or at least 14 CMM, and more preferably at least 800 CFM or at least 22 CMM, that convectively cools the pellets via turbulent convective cooling at such an aforementioned cooling rate immediately upon pellet extrusion to preserve the state of the starches in the pellets 28a modified by or during extrusion.

In a preferred embodiment, pellet cooling ambient air delivered at such temperatures and volumetric flow rates into the pellet cooling chamber 50 of the pellet collecting enclosure 48, which also serves as the knife cage 46, substantially completely freezes the state and structure of the modified starches in the pellets 28a immediately upon being extruded from the holes in the die 42 of the extruder 22 in a cold-processing method in accordance with the present invention that thereafter advantageously preserves or maintains the state and structure of the modified starches of the pellets 28a including during and preferably after post-extrusion processing of the pellets 28a by the pellet processing device 60 of the pellet processing subsystem 36. In such a preferred embodiment, the cooling and drying subsystem 34 of the pellet cold-processing arrangement 32 delivers pellet coolant air at one or more such aforementioned low temperatures and volumetric flow rates into the pellet cooling chamber 50 such that quenching of the pellets 28a occurs after extrusion of the pellets 28a from the holes of the die 42 of the extruder 22 while the pellets 28a reside in the chamber 50 substantially completely freezing the state and/or structure of the starches in the pellets 28a physically and/or thermally modified during starch gelatinization and/or extrusion by the extruder 22. Such rapid cooling and preferably quenching of the pellets 28a occurs immediately upon being expelled or discharged from the die 42 of the extruder 22 while in the pellet cooling chamber 50, e.g. pellet quenching chamber 50, such that the starch-based water-soluble binder, including any starch-based cold water soluble binder, formed in each pellet 28a from starch, preferably gelatinized starch, during starch gelatinization and/or extrusion is substantially completely preserved maximizing the amount of starch-based water-soluble binder, including any cold water soluble binder, available in each extruded pellet 28a to serve as starch-based water-soluble binder pellet clumping agent to clump together wetted pellets 28a during granular absorbent use, e.g. during use as litter.

In such a preferred method and embodiment, the pellet cooling chamber 50, e.g., pellet quenching chamber 50, is substantially airtight with the enclosure 48 provided by the knife cage 46 being of substantially gas tight construction. Where of gas tight or airtight construction, the walls that form the knife cage 46 and/or chamber 50 preferably are of imperforate or substantially imperforate construction.

Such a pellet cold-processing arrangement 32, including its pellet cooling and drying subsystem 34, can be constructed, arranged, and/or configured in accordance with one or both of the granular absorbent system and method for treating or processing granular absorbent during granular absorbent transport described and shown in commonly owned U.S. application Ser. No. 14/605,045 and published as U.S. Patent Application Publication No. US 20150145164 A1 and the quenched granular absorbent system and method for making quenched granular absorbent described and shown in commonly owned U.S. application Ser. No. 15/114,069 and published as U.S. Patent Application Publication No. US 20160346981 A1, the entirety of each of which is hereby expressly incorporated herein by reference.

In a preferred method and embodiment of the present invention, such cold-processing of the pellets 28a occurs from immediately upon pellet extrusion all the way until the pellets 28a are conveyed via the pellet conveying duct 56 of the pneumatic pellet conveyor 58 by the pellet coolant air to the pellet processing device 60 of the pellet processing subsystem 36 substantially continuously cooling and drying the pellets 28a the entire way until the pellets 28a reach the pellet processing device 60. Not only does such cold-processing of the pellets 28a substantially completely freeze, preserve and/or maintain the extruder-modified starches, including the water-soluble binder, in each extruded pellet 28a from the instant each pellet 28a is extruded from the extruder into the pellet cooling chamber 50, e.g. pellet quenching chamber 50, but the cooling and drying of each pellet 28a from the time of extrusion until being post-extrusion processed, including by pellet processing device 60, helps preserve and maintain these extruder-modified starches, including the water-soluble binder, present in each pellet 28a during such post-extrusion processing, including by the pellet processing device 60.

In use and operation of the cold processing arrangement 32, including its cooling and drying subsystem 34, each one of the pellets 28a is not only cooled from the time the pellet 28a is extruded from the extruder 22 but each one of the pellets 28a also is dried from the time the pellet is extruded from the extruder 22. As previously discussed, each one of the pellets 28a is both cooled and dried substantially continuously from the time of pellet extrusion preferably until being post-extrusion processed, e.g., by post-extrusion pellet processing device 60, of the post-extrusion pellet processing subsystem 36 preferably by the pellet cooling air that cools and dries the extruded pellets 28a while being conveyed by the airstream of pellet cooling air via the pellet conveying duct of the pneumatic conveyor to the point where post-extrusion pellet processing begins or takes place.

In implementing the cold-processing embodiment and carrying out the cold-processing method, drying of the pellets 28a takes place from the time of extrusion all the way until post-extrusion pellet processing without applying any heat to the pellets 28a and without heating, e.g. heating by external means, the stream of pellet cooling air conveying the pellets 28a to the post-extrusion pellet processing subsystem 36 with each cooled and dried pellet 28a preferably having a moisture content of no greater than about 12%±2% when entering the post-extrusion pellet processing subsystem 36 and/or being post-extrusion pellet processed by the subsystem 36, e.g. by pellet processing device 60. As a result of cold-processing each extruded pellet 28a upon and after extrusion and preferably up until reaching the post-extrusion pellet processing subsystem 36, any changes to the state, structure, phase and/or matrix of starches present in the pellets 28a during post-extrusion processing are minimized and preferably substantially completely prevented.

As discussed in more detail below, any post-extrusion processing of the pellets 28a in the post-extrusion pellet processing subsystem 36, including by post-extrusion pellet processing device 60, preferably is carried out while maintaining the pellets 28a undergoing post-extrusion processing in a substantially cold-processed condition where the temperature of the pellets 28a immediately after post-extrusion processing is within ±5° F. or within ±2° C. to thereby help preserve the state, structure, phase and/or matrix of the extruder-modified starches, including the starch-based water soluble binder, in the post-extrusion processed pellets 28a. In a preferred post-extrusion processing method and implementation in accordance with the present invention, performing post-extrusion pellet processing of the extruded pellets 28a while maintaining the pellet substantially in their cold processed condition advantageously maximizes the amount of starch-based water soluble binder, including any cold water soluble binder, present or which remains present in the post-extrusion processed pellets 28a after post-extrusion processing is completed.

With continued reference to FIG. 1, post-extrusion processing of each cold-processed extruded pellet 28a is carried out by the post-extrusion pellet processing subsystem 36, e.g., by post-extrusion pellet processing device 60, in a manner that minimizes and preferably substantially completely prevents compressing or crushing of the pellets 28a during undergoing post-extrusion pellet processing in the subsystem 36 thereby advantageously minimizing and preferably substantially completely preventing any change in the state, structure, phase and/or matrix of starches, including the extruder-modified starches, present in the pellets 28a due to physical contact and/or mechanical interaction, including any mechanical engagement, with any of the pellets 28a during or as a result of post-extrusion pellet processing. Such post-extrusion processing of each cold-processed extruded pellet 28a preferably also is carried out by the post-extrusion pellet processing subsystem 36, e.g., by pellet processing device 60, without application of any heat from any heat source, e.g., heat-generation source, electrical heating element(s), air heater, or the like, prior to, during or after post-extrusion pellet processing of the pellets 28a in the post-extrusion pellet processing subsystem 36, e.g. by pellet processing device 60, thereby advantageously minimizing and preferably substantially completely preventing any change in the state, structure, phase and/or matrix of starches, including the extruder-modified starches, present in the pellets 28a during or as a result of post-extrusion pellet processing. Such post-extrusion processing of each cold-processed extruded pellet 28a preferably is further carried out by the post-extrusion pellet processing subsystem 36, e.g., by pellet processing device 60, in a manner that minimizes and which preferably substantially completely prevents generation or conduction of heat in or to any of the pellets 28a undergoing post-extrusion pellet processing in the post-extrusion pellet processing system 36, e.g. by pellet processing device 60, thereby advantageously further minimizing and preferably substantially completely preventing any change in the state, structure, phase and/or matrix of starches, including the extruder-modified starches, present in the pellets 28a during or as a result of post-extrusion pellet processing.

With continued reference to FIG. 1, a preferred embodiment of a post-extrusion pellet processing subsystem 36 of the present invention employs a post-extrusion pellet processing device 60 that is a post-extrusion mechanical-engagement pellet processing device 62 that comminutes the extruded pellets 28a arriving in a cold-processed condition in accordance with that disclosed above with the pellets 28a preferably delivered in such a cold-processed processed condition to the device 60 where the pellets 28a have a pellet temperature that is at least 65° F. less or at least 35° C. less, preferably at least 75° F. less or at least 40° C. less, and more preferably at least 90° F. less or at least 70° C. less than the temperature of the pellets 28a upon extrusion from the extruder die 42, i.e., pellet extrusion temperature, and a pellet moisture content of no greater than about 12%±2% of pellet weight. When the extruded pellets 28a arrive at the pellet processing device 60 in such a cold-processed condition ready for post-extrusion mechanical-engagement pellet processing, e.g., post-extrusion pellet comminution, each pellet 28a preferably has a temperature no greater than 145° F. or no greater than 63° C., preferably no greater than 130° F. or no greater than 55° C., and more preferably no greater than about 120° F.±5° F. or no greater than about 50° C.±2.5° C. and has a moisture content no greater than about 10%±1% of pellet weight.

A preferred post-extrusion mechanical-engagement pellet processing device 62 well suited for mechanical-engagement pellet processing via pellet comminution is the pellet comminution machine 64 schematically depicted in FIG. 1 that can be a slicing or cutting pellet processing machine used to form generally longitudinal and/or transverse cuts or slits in the outer surface of the pellets 28a during mechanical-engagement comminution-type pellet processing, but which more preferably is a comminution mill 66, such as a jet mill, cone mill, or vibration mill, constructed and arranged and/or otherwise configured to mechanically engage the pellets 28a in the cold processed condition as the pellets 28a enter the device 64 or mill 66 in a manner that abrades the pellets 28a, removes at least a portion of an outer surface or skin of one or more of the pellets 28a, shears or tears open one or more of the pellets 28a exposing at least a portion of the pellet interior(s), e.g. inner void-filled pellet matrix, and/or severs or lops off one or more lobes, fibrils, fingers or other projections extending outwardly from the outer surface of pellets 28a being post-extrusion processed by device 64 or mill 66, or otherwise mechanically engages and comminutes pellets 28a passing through the device 64 or mill 66 during post-extrusion pellet processing. Whether the post-extrusion mechanical-engagement comminution type pellet processing device 62 is a pellet slicer or pellet cutter type comminution machine 64 that mechanically engages and comminutes pellets 28a passing through the machine 64 during post-extrusion pellet processing, or is a pellet comminution mill 66, the machine 64 or mill 66 used in post-extrusion mechanical-engagement pellet processing preferably comminutes the pellets 28a in a manner that minimizes and preferably substantially completely prevents pulverizing pellets 28a, crushing pellets 28a and otherwise compressing, e.g. mashing or smashing, pellets 28a during post-extrusion pellet processing.

As such, a post-extrusion pellet processing subsystem 36 in accordance with the present invention employs a non-pulverizing, non-crushing, non-compacting and non-compressing post-extrusion mechanical-engagement comminution type pellet processing device 62 that mechanically engages and comminutes pellets 28a passing through the device 62 in a manner that cuts, slits, shears, tears, opens, severs and/or lops off one or more portions of pellets 28a passing through the device 62 during such post-extrusion processing of the pellets 28a. Likewise, whether the device 62 is a pellet slicer or pellet cutter comminution machine 64 or a pellet comminution mill 66, such a pellet slicer or pellet cutter comminution machine 64 also is a non-pulverizing, non-crushing, non-compacting and non-compressing pellet slicing or pellet cutting machine 64 and such a pellet comminution mill 66 also is a non-pulverizing, non-crushing, non-compacting and non-compressing pellet comminution mill 66.

Post-extrusion mechanical-engagement comminution type processing of the pellets 28a while in a cold processed condition advantageously enables portions of one or more of the pellets 28a passing through the non-pulverizing, non-crushing, non-compacting and non-compressing mechanical-engagement comminution type pellet processing device 62, whether the device 62 is a non-pulverizing, non-crushing, non-compacting and non-compressing pellet slicing or pellet cutting machine 64 and/or a non-pulverizing, non-crushing, non-compacting and non-compressing pellet comminution mill 66, modification of the state, structure, phase, or matrix of the extruder-modified starches in the pellets 28*a* passing through during such post-extrusion processing is minimized and preferably substantially completely prevented. By cooling and drying the pellets 28*a* prior to and preferably up to or adjacent entry into the pellet processing device 62, e.g., pellet cutter/slicer machine 64 and/or pellet comminution mill 66, post-extrusion physical modification of the previously extruder modified starches, including the water-soluble starch-based binder, e.g., water-soluble starch-based carbohydrate polymer binder clumping agent, is advantageously minimized and preferably substantially completely prevented during such mechanical engagement comminution type post-extrusion pellet processing. In addition, use of a non-pulverizing, non-crushing, non-compacting and non-compressing mechanical engagement comminution type post-extrusion pellet processing device 62, preferably either a non-pulverizing, non-crushing, non-compacting and non-compressing pellet cutter/slicer machine 64 or a non-pulverizing, non-crushing, non-compacting and non-compressing pellet comminution mill 66, minimizes the amount and/or nature of the mechanical engagement, physical contact, and/or comminution of the pellets 28*a* passing through the device 62, e.g. pellet cutter/slicer machine 64 and/or pellet comminution mill 66, thereby advantageously also helping to minimize and preferably helping to substantially completely prevent post-extrusion physical modification and/or thermal modification of such starches in the pellets 28*a* that were previously physically and/or thermally modified by the extruder 22 during or by gelatinization and/or extrusion.

During such post-extrusion mechanical engagement and/or comminution-type processing of the as-extruded original sized pellets 28*a* by device 62, e.g. pellet cutter-slicer machine 64 or pellet comminution mill 66, of such a preferred post-extrusion pellet processing subsystem 36 in carrying out a method of post-extrusion mechanical engagement and/or comminution type processing of original-sized extruded pellets 28*a* in accordance with the present invention advantageously minimizes and preferably prevents post-extrusion physical modification and/or post-extrusion thermal modification thereby helping to retain, preserve, optimize and preferably maximize the amount, magnitude and/or type of extruder-modified starches present and/or formed in the pellets 28*a* by or during gelatinization and/or pellet extrusion by extruder 22 which further advantageously maintains and preferably optimizes (a) liquid absorption, including absorption of water, urine, liquid fecal matter, and hydrocarbon/petroleum-based oil(s), (b) pellet structural integrity, and/or (c) wetted pellet clumping of the comminuted reduced particle size pellets 28*b* and smaller more finely sized pellet particles 28*c*, e.g., fines 28*c*, produced as a result of comminution of the original-sized and/or as-extruded pellets 28*a* by device 62, e.g. e.g. pellet cutter/slicer machine 64 and/or pellet comminution mill 66, during post-extrusion mechanical engagement and/or comminution type pellet processing.

Such post-extrusion mechanical-engagement and/or comminution-type processing of the cold processed extruded pellets 28*a* in carrying out a preferred implementation of such a post-extrusion pellet processing method of the present invention can be and preferably is performed by comminuting pellets 28*a* as they pass through the device 62, e.g. pellet cutter/slicer machine 64 and/or pellet comminution mill 66, thereby physically modifying at least one of (a) a portion of the outer pellet surface, (b) the shape, and/or (c) the size of one or more as-extruded pellets 28*a* during such post-extrusion pellet processing producing one or more at least slightly smaller sized pellets 28*b* and/or smaller more finely sized pellet particles 28*c*, e.g., fines 28*c* comminuted from one or more such original-extruded pellets 28, that are discharged from the device 62, e.g. pellet cutter/slicer machine 64 and/or pellet comminution mill 66. Thereafter, the reduced size pellets 28*b* and fines 28*c* are then transported, such as preferably via a second pellet conveying duct 68 from the device 62, e.g. pellet cutter/slicer machine 64 and/or pellet comminution mill 66, of the pneumatic conveyor 58 such that cold-processing air cooling and non-heated convection air drying of the pellets 28 entering the device 62, e.g. pellet cutter/slicer machine 64 and/or pellet comminution mill 66, also is carried out, is performed, or otherwise resumes for the comminuted reduced-size pellets 28*b* and even smaller sized fines 28*c*. As such, cold-processing air cooling and non-heated convection air drying of the comminuted reduced-size pellets 28*b* and even smaller sized fines 28*c* preferably is carried out until the pellets 28*b* and fines 28*c* reach a further post-extrusion pellet processing station 70 depicted in FIG. 1 for purposes of example as including or being a pellet holding container 72, such as a bin, bag, hopper or the like, located downstream of the mechanical-engagement comminution type pellet processing device 62 in which the size-reduced pellets 28*b* and even smaller sized fines 28*c* are collected after being discharged from device 62, e.g. pellet cutter/slicer machine 64 and/or pellet comminution mill 66, after post-extrusion mechanical-engagement and/or comminution-type pellet processing of the as-extruded pellets 28*a* has been performed.

In a preferred method implementation and embodiment of a post-extrusion mechanical-engagement and/or comminution-type pellet-processing subsystem 36 of the present invention, it is contemplated that not all of the originally extruded pellets 28*a* will be comminuted by the mechanical-engagement comminution type pellet processing device 62 such that the container 72 of the further downstream post-extrusion pellet processing station 70 is depicted in FIG. 1 as also holding at least a plurality of pairs, i.e. at least three, of as-extruded pellets 28*a* together with at least a plurality of pairs, i.e., at least three, of the particle-size reduced pellets 28*b* and at least a plurality of pairs, i.e., at least three, of the of the smaller sized fines 28*c*. In one such preferred method implementation and embodiment, as-extruded pellets 28*a* are discharged from the extruder 22 in real time during extruder 22 and system 20 operation where the as-extruded pellets 28*a* are cold-process cooled and dried by pellet cold processing arrangement 32 before being post-extrusion processed by post-extrusion mechanical-engagement and/or comminution type pellet processing subsystem 36 also in real time followed by discharge of at least a plurality of and preferably at least a plurality of pairs, i.e. at least 3, of different sized pellets or particles, e.g. pellets 28*a* and/or 28*b* and/or fines 28*c*, formed of or from the as-extruded pellets 28*a* during post-extrusion pellet processing that are received in the container 72 of the downstream station 70. While only one size or type of smaller sized fines 28*c* our depicted in FIG. 1 as being formed by comminution of an as-extruded pellet 28*a* by post-extrusion processing thereof by the mechanical-engagement comminution type pellet processing device 62, at least a plurality of differently sized smaller fines instead of or in addition to the fines 28*c* depicted in FIG. 1 preferably are produced from pellet comminution of as extruded pellets 28*a*. Additionally, comminution of the as-extruded pellets 28*a* by device 62 can and preferably also does produce at least a plurality of differently sized particle size reduced pellets instead of or in addition to the particle size reduced pellets 28b depicted in FIG. 1. As such, in a preferred method and system of post-extrusion mechanical-engagement and/or comminution type pellet processing in accordance with the present invention, at least 2 different sized reduced-sized pellets and at least 2 different sized fines are produced during or from such post-extrusion mechanical-engagement and/or comminution type pellet processing by device 62 instead of or in addition to particle reduced size pellet 28b and fines 28c preferably producing a finished granular absorbent product ready for retail sale, consumer use and/or commercial use composed of a blend of at least 3 differently sized pellets and/or fines, preferably is composed of a blend of at least 4 differently sized pellets and/or fines, and more preferably is composed of a blend of at least 5 differently sized pellets and/or fines.

With continued reference to FIG. 1, container 72 of station 70 preferably holds at least a plurality of pairs of reduced-size pellets 28b and at least a plurality of pairs of even smaller size fines 28c per cubic centimeter of volume of the container 72 as the container 72 is filled therewith during real time operation of the system 20 in carrying out a preferred implementation of a method in accordance with the present invention. In another preferred method implementation and embodiment, container 72 of station 70 preferably holds (a) at least a plurality of pairs of as-extruded pellets 28a that have not been size-reduced during post-extrusion pellet processing by device 62 of subsystem 36, (b) at least a plurality of pairs of reduced-size pellets 28b, and (c) at least a plurality of pairs of even smaller size fines 28c per cubic centimeter of volume of the container 72 when filled therewith during real time operation of the system 20 in accordance with the present invention.

If desired, container 72 of pellet processing station 70 can include or be configured to further process pellets 28a and/or 28b and/or fines 28c that have been discharged from the post-extrusion pellet processing subsystem 36 where the pellets 28a and/or 28b and/or fines 28c can be and preferably are further processed, such as by being coated with one or more coating materials, e.g. powdered bentonite, zeolite, silica, and/or other coating materials, by being stored in a container, such as in a bulk bag or bin for later shipment and/or subsequent packaging as at least part of a granular absorbent product, and/or is blended and/or packaged with other granular materials in a granular absorbent product produced in accordance with the present invention composed of at least 50%, preferably at least 65% and more preferably at least 75% of the comminuted reduced-sized pellets 28b and the even smaller sized fines 28c formed during post-extrusion mechanical engagement and/or comminution type pellet processing of the as-extruded extruded pellets 28a.

It is therefore contemplated that the processing station 70 schematically shown in FIG. 1 located at the end of the cold-process air cooling and non-heated convective, preferably turbulently convective, air drying pneumatic pellet transporting conveyor 58 can be or otherwise include a pellet or particle size separating or classifying station, a pellet or granular blender or blending station, a mixer or mixing station, a pellet or particle coater or coating station, an agglomerator, a bulk bag or bulk bin filling station, a retail container or retail bag packaging line or station, or can be another type of pellet 28b and/or fines 28c processing station, including another post-extrusion mechanical-engagement and/or comminution-type pellet processing device, such as a pellet cutter, pellet slicer, or pellet comminution mill that preferably is of non-pulverizing, non-crushing, non-compacting and non-compressing construction and operation. If desired, a system and method in accordance with the present invention can and preferably does further contemplate one or more additional such processing stations, e.g., comminution device 62 and/or station 70, not shown in FIG. 1 downstream of and linked to processing station 70, such as by another duct (not shown) of pneumatic conveyor 58 and/or by another pellet or particulate matter transport device or mechanism (not shown).

Figure 2:
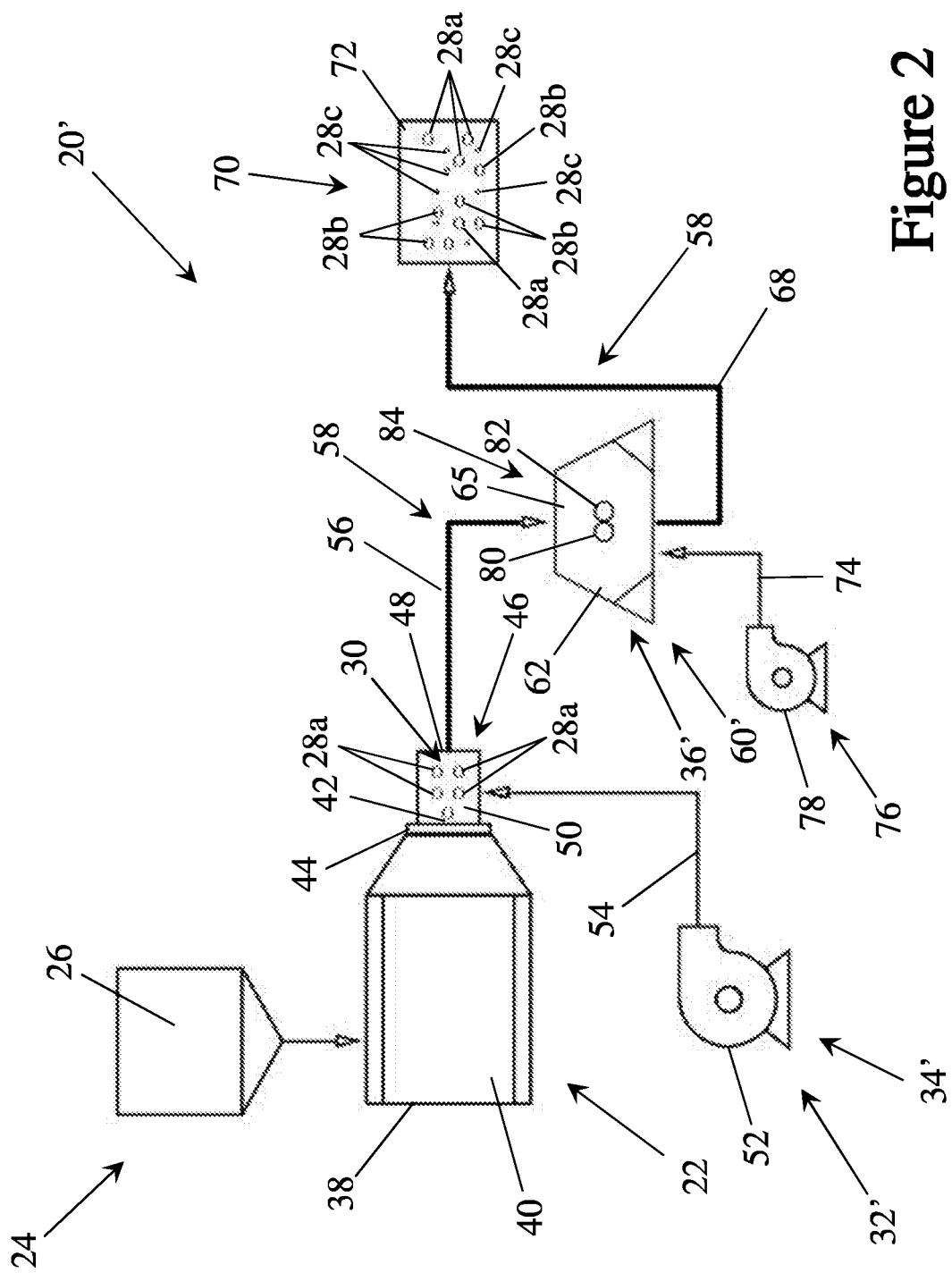

FIG. 2 illustrates another preferred embodiment of an extruded granular absorbent production system 20' that is similar to the system 20 shown in FIG. 1 but which employs a pellet comminuting particle size reducer 62 that preferably is a rotating roll type pellet comminuting mill 65 as the pellet processing device 60' of post-extrusion pellet processing subsystem 36'. In addition, the cold-processing arrangement 32' has a cooling and drying subsystem 34' that includes a second coolant air conveying duct 74 in gas flow communication with the pellet particle size reducer 62 for cold processing as-extruded pellets 28a in real time as the pellets 28a are being processed, e.g. comminuted, by the particle size reducer 62 to minimize and preferably substantially completely prevent any increase in the temperature of the pellets 28a as they are being processed by the particle size reducer 62.

While the coolant air conveying duct 74 can also be in gas flow communication with the pellet cooling air blower 52, the duct 74 preferably is separately supplied with pellet coolant gas, preferably ambient air having a temperature no higher than 100° F. or no higher than 37° C., preferably no higher than 90° F. or no higher than 32° C., and more preferably no higher than 80° F. or no higher than 26° F. at a volumetric flow rate great enough to maintain the temperature of the pellets 28a during processing, e.g., particle-size reduction, by the pellet particle size reducer 62 at substantially the same temperature as the pellet entry temperature of the pellets 28a entering the pellet particle size reducer 62 such that the pellets 28a, reduced particle size pellets 28b, and even smaller sized fines 28c have an exit temperature upon exiting the particle size reducer 62 that is substantially the same as the pellet entry temperature. In the preferred embodiment of the pellet cooling and drying subsystem 34', the subsystem 34' preferably includes a particle size reducer pellet cooling arrangement 76 that includes a blower 78, such as a centrifugal fan or squirrel cage blower, which draws in ambient air outside of the extruder 22 and pellet particle size reducer 62 and discharges it inside the pellet particle size reducer 62 at or adjacent where the pellets 28a are being comminuted and/or particle size reduced under a high enough pressure and/or at a volumetric flow rate sufficiently great to at least maintain the temperature of the as extruded pellets 28a being particle size reduced by the reducer 62 and the temperature of the reduced sized particle pellets 28b and fines 28c formed by the reducer 62 during pellet particle size reduction as discussed hereinabove. In one preferred embodiment and method, operation of the particle size reducer cooling arrangement 76 directs a great enough volumetric flow rate of pellet cooling air into the pellet particle size reducer 62 such that the temperature of the as-extruded pellets 28a, particle size reduced pellets 28b, and fines 28c have a discharge temperature upon exiting the reducer 62 that is at least 1° F. and preferably at least 1° C. lower than the pellet entry temperature of the as extruded pellets 28a entering the reducer 62.

Where equipped with a coolant air conveying duct 74 that supplies ambient pellet cooling to the interior of the pellet particle size reducer 62, cold processing air cooling and convective air drying, preferably turbulently convective air drying, of the pellets 28*a* continues substantially uninterrupted during entry of the as-extruded pellets 28*a* into the pellet particle size reducer 62, during particle size reduction comminution of the as-extruded pellets 28*a* by the pellet particle size reducer 62, and preferably also as the pellets 28*a* and 28*b* and fines 28*c* exit the pellet particle size reducer 62. Depending upon the volumetric air flow rate and the sizing of the pellet conveying duct 68 of the pneumatic conveyor 58 extending downstream from the pellet particle size reducer 62, the pellet cooling air conveyed by or through the coolant air conveying duct 74 into the pellet particle size reducer 62 can also be used to pneumatically direct the pellets 28*a* and/or 28*b* and fines 28*c* being discharged from the pellet particle size reducer 62 into and through the pellet conveying duct 68 advantageously continuing to cold process air cool and air dry the pellets 28*a* and 28*b* and fines 28*c* all the way until they reach the end of the duct 68 and/or processing station 70.

With continued reference to FIG. 2, a preferred particle size reduction machine or pellet size reducer 62 is a rotating roll type pellet comminuting mill 65 having a pair of generally horizontal side-by-side elongate pellet-comminuting corrugated rolls 80 and 82, preferably LePage rolls 80 and 82, which can be and preferably are generally parallel to one another and which rotate toward one another with the differential in the rotational speeds and spacing between the counter-rotating rolls 80 and 82 determining the maximum pellet size or pellet size range to which extruded pellets are particle size reduced during post-extrusion pellet processing. One such preferred pellet or particle size reducer 62 is a LePage corrugated roll mill or LePage roll granulator 84 having a pair of such corrugated LePage rolls 80 and 82 that rotate toward one another during size reduction of extruded pellets 28*a* with one of the LePage rolls 80 being longitudinally corrugated having longitudinally extending corrugations, e.g., longitudinally formed or longitudinally cut corrugations, and the other one of the LePage rolls 82 being circumferentially corrugated having circumferentially spaced apart corrugations extending in a circumferential direction, e.g., circumferentially formed corrugations or circumferentially cut corrugations, with gap and rotational speed differential of the counter-rotating corrugated LePage rolls 80 and 82 comminuting oversized extruded pellets 28*a* in a manner that shears, severs or lops off outwardly extending or projecting portions of the oversized extruded pellets 28*a* without pulverizing, crushing, hammering, or otherwise compressing the oversized pellets 28*a* during particle size reduction. Such a corrugated LePage roll mill or roll granulator 84 constructed with such counterrotating horizontally and circumferentially corrugated rolls 80 and 82 cuts, abrades, severs, shears, shaves or otherwise comminutes outwardly projecting lobes, tendrils, fingers or other portions of oversized pellets 28*a* being particle sized reduced thereby that extend outwardly of the rest of the outer surface of the oversized pellets 28*a* with those outwardly extending portions of the oversized pellet 28*a* severed, lopped off, sheared off, shaved off or otherwise comminuted from the oversized pellet 28*a* produce the more finely sized fines 28*c* with the rest of what remains of the previously oversized pellet 28*a* being a particle size reduced pellet 28*b* in accordance with the present invention. Performing such non-compression induced particle size reduction using such a particle size reduction roller mill 65 that preferably is a LaPage corrugated roll mill or granulator 84 equipped with such horizontally and circumferentially corrugated LePage rollers 80 and 82 advantageously minimizes and preferably substantially completely prevents physical and thermal modification of the extruder-modified starches of extruded pellets contacting the counter-rotating rolls 80 and/or 82, being comminuted by the rolls 80 and/or 82, and/or being particle size reduced by the rolls 80 and/or 82 during particle size reduction operation of the LePage pellet size reduction machine 84.

The present invention is directed to a method, system and processing machine, preferably a pellet size reduction machine, like the pellet or particle size reduction machine 84 shown in FIG. 2, which performs particle size reduction of pellets extruded by an extruder from a starch-containing mixture, e.g., admixture, substantially as fast as pellets are extruded from the extruder in a manner that breaks each pellet that undergoes particle size reduction into two or more smaller sized particles all while prevent compression or compaction thereof during particle size reduction. Such a method, system and pellet or particle size reduction machine preferably reduces pellet particle size using non-compression particle size reduction thereby substantially completely preventing pellet and/or reduced size particle densification from occurring such that the bulk density of reduced size particles formed from extruded pellets undergoing particle size reduction is no greater than the bulk density of the extruded pellets undergoing particle size reduction. Such a method, system and pellet or particle size reduction machine preferably reduces pellet particle size via cold-processing pellet or particle size reduction whereby the temperature of each pellet undergoing non-compression particle size reduction does not substantially increase during non-compression particle size reduction such that the temperature of reduced size particles exiting the particle size reduction machine is no greater than four degrees Celsius hotter than the temperature of extruded pellets entering the particle size reduction machine.

In a preferred method of making extruded pellets well suited for use with the method, system and particle size reduction machine of the present invention, pellets preferably are extruded from a starch-containing admixture formed substantially completely of one or more cereal grains, which can also include cellulosic material, using an extruder in accordance with the method and arranged disclosed in United States Patent Application Publication No. 20150196005, and/or United States Patent Application Publication No. 20150145164, the entirety of each of which is expressly incorporated herein by reference. In one such preferred extruded pellet making method, pellets are extruded from an admixture composed substantially completely of corn, preferably cornmeal which can be de-germed cornmeal, which can include no more than 35% cellulosic material by admixture weight, which has an admixture moisture content no greater than 25% by admixture weight, which is gelatinized and extruded by a single screw extruder at an extrusion temperature at the extrusion die of at least 100 degrees Celsius, preferably at least 110 degrees Celsius, and more preferably at least 125 degrees Celsius, and at an extrusion pressure at the extrusion die of at least 1800 pounds per square inch, preferably at least 2000 pounds per square inch, and more preferably at least 2500 pounds per square inch. In another such preferred extruded pellet making method, pellets are extruded from an admixture composed substantially completely of sorghum, preferably whole grain sorghum which can be and preferably is de-germed, which can include no more than 35% cellulosic material by admixture weight, which has an admixture moisture content no greater than 20% by admixture weight, which is gelatinized and extruded by a single screw extruder at an extrusion temperature at the extrusion die of at least 100 degrees Celsius, preferably at least 120 degrees Celsius, and more preferably at least 135 degrees Celsius, and at an extrusion pressure at the extrusion die of at least 2000 pounds per square inch, preferably at least 2500 pounds per square inch, and more preferably at least 3000 pounds per square inch. Pellets extruded from such an admixture in accordance with such preferred methods and extruder operating parameters each advantageously contain an amount of starch modified by or during extrusion into water soluble binder that preferably is cold water soluble binder in an amount sufficient to cause at least a plurality of pairs of wetted pellets to clump together and form clumps when dried to a moisture content of no greater than 25% by dried clump weight that have a clump compressive strength of at least 300 pounds per square inch, preferably at least 400 pounds per square inch, and more preferably at least 700 pounds per square inch. Pellets extruded from such an admixture in accordance with such preferred methods and extruder operating parameters each advantageously contain an amount of starch modified by or during extrusion into water soluble binder that preferably is cold water soluble binder sufficient to cause at least a plurality of pairs of wetted pellets to clump together define self-clumping pellets producing self-clumping granular absorbent that is well suited for use in animal, pet and cat litter applications as self-clumping litter. Such extruded granular absorbent, including when used as litter, preferably is all-natural, biodegradable, and toilet-flushable.

A laboratory standard or test procedure for determining the water soluble binder, preferably cold water soluble binder, and more preferably amylopectin based cold water soluble binder as a weight percentage of the extruded absorbent granule or the absorbent extrudate granule is set forth below:

Water Solubles (Water Soluble Binder)

Purpose

This test method for litter covers the determination of immediately mobile water solubles, which is defined as the dissolved material and dispersed fine particulate that have been strained through a 100 um opening sieve.

Equipment 1000 mL Beaker
Distilled Water (or low residue equivalent water)
Evaporation Tins
Scale
100 um Sieve Screen (or equivalent)
Magnetic Stir Plate
Magnetic Stir Bar
Oven Analytical Procedure (1) Tare a clean steel 1000 mL beaker on a clean scale.
(2) Add a clean magnetic stir bar to the 1000 mL beaker.
(3) Accurately add 100 grams of litter to the 1000 mL beaker.
(4) Accurately add 900 grams of low residue water to the 1000 mL beaker, and place the beaker on the stir plate with a minor vortex.
(5) After 1 minute of mixing, remove the 1000 mL beaker from the stir plate.
(6) Filter the liquid through a 100 um sieve screen (or equivalent).
(7) Accurately obtain the tare weight of an evaporation pan.
(8) Accurately add 10.00 grams of the sieved solution to the tared pan.
(9) Place the evaporation pan in an oven at 105° C. for 2 hours for a conventional oven. A convection oven can be utilized, but attentive care is required. The time frame could vary between 15 minutes to 45 minutes, depending upon the oven, and care must be taken to prevent the loss of flaking material from the weighing pans or the pick-up of contamination from dirty air.
(10) After the 2 hours (or 15 minutes), remove the evaporation pan from the oven and let it cool for 5 minutes.
(11) Accurately weigh the cooled evaporation pan.
(12) Calculate the water solubles from the data accumulated:

$$\% \text{ Water Solubles} = \frac{(100\%) * (SR) * (W + L)}{(SM) * (L)}$$

SR=grams of Solids Residue
SM=grams of solution/mixture
W=grams of low residue Water added to beaker
L=grams of Litter added to beaker Pellets extruded from such an admixture in accordance with such preferred methods and extruder operating parameters each advantageously contain an amount of starch modified by or during extrusion into water soluble binder, preferably cold water soluble binder, sufficient to cause at least some of the water soluble binder in wetted pellets to become flowable and form a flowable adhesive binder that flows from wetted pellets around and between at least a plurality of pairs of adjacent pellets binding and clumping them together producing self-clumping extruded granular absorbent. Where used as litter, pellets extruded from such an admixture in accordance with such preferred methods and extruder operating parameters each advantageously contain an amount of starch modified by or during extrusion into water soluble binder, preferably cold water soluble binder, sufficient to cause at least some of the water soluble binder in wetted pellets to become flowable and form a flowable adhesive binder that flows from wetted pellets around and between at least a plurality of pairs of adjacent pellets binding and clumping them together producing self-clumping litter. Such extruded granular absorbent, including when used as litter, preferably is all-natural, biodegradable, and toilet-flushable.

FIG. 3A-3H is an 8-page data table showing various clump shape, size, and strength characteristics of clumps formed of various ratios of (a) absorbent extrudate granules extruded under ultrahigh extrusion pressure(s) from a sorghum admixture as disclosed below, and granules of cellulose or cellulosic material disclosed below, and (b) absorbent extrudate granules extruded under ultrahigh extrusion pressure(s) from a sorghum admixture as disclosed below, and granules of corn cob material, e.g., ground or comminuted corn cobs as disclosed below.

Figure 4:
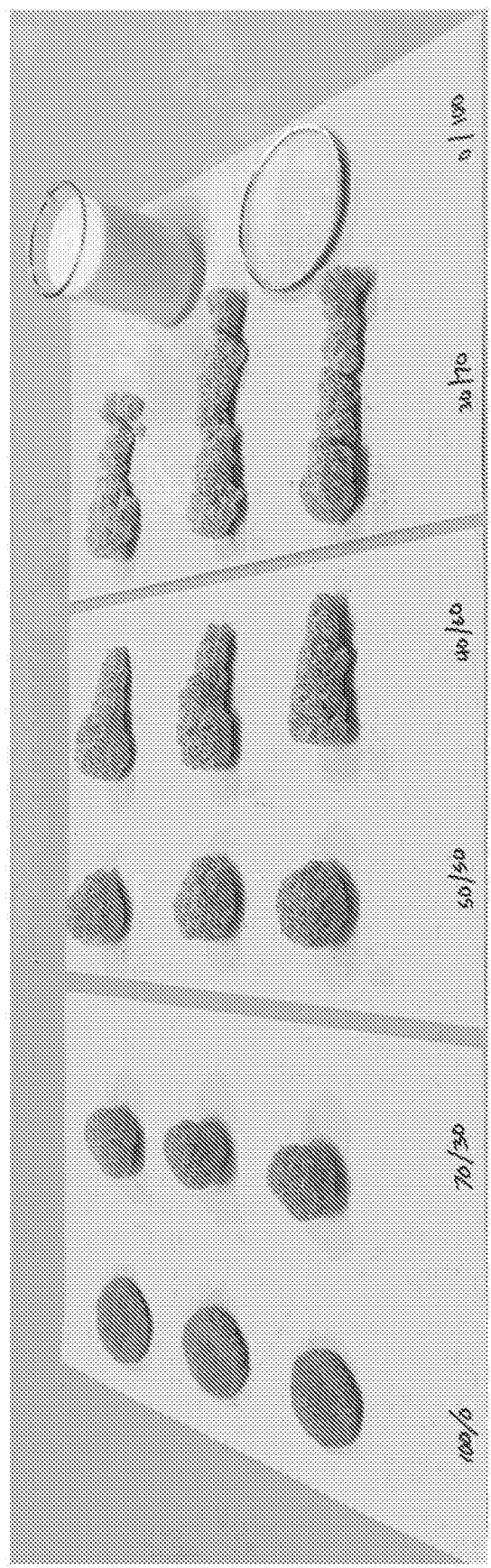
FIG. 4 is a photo of clumps of the blended granular absorbent product where the non-extruded material is composed of plastic beads smaller in size than the granules of absorbent extrudate.
Figure 5:
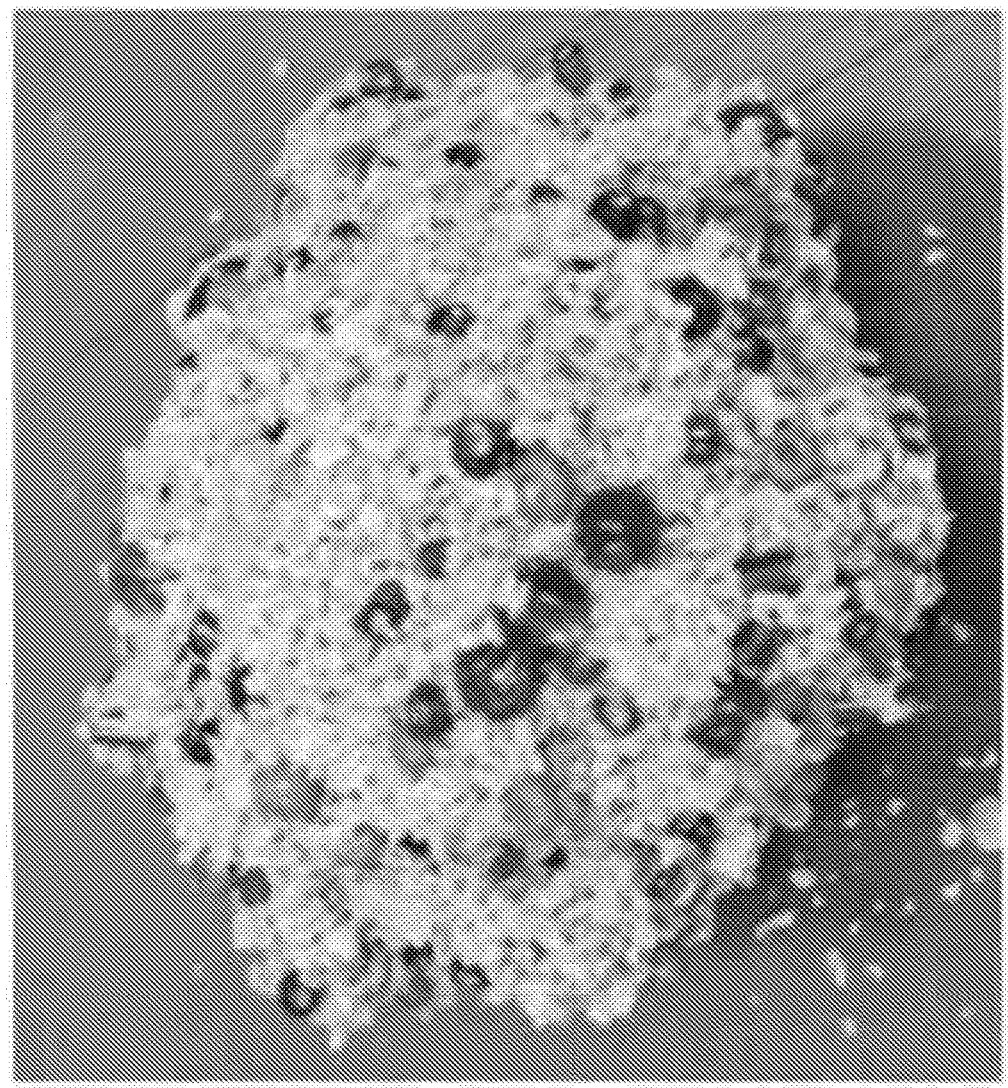
FIG. 5 is a color photo of another blended granular absorbent product where the non-extruded granular material is composed of glass granules having a size at least a plurality, preferably at least a plurality of pairs of times larger than the size of the largest granule of the absorbent extrudate.

FIG. 4 is a photo of clumps of the blended granular absorbent product where the non-extruded material is composed of plastic beads smaller in size than the granules of absorbent extrudate. FIG. 5 is a color photo of another blended granular absorbent product where the non-extruded granular material is composed of glass granules having a size at least a plurality, preferably at least a plurality of pairs of times larger than the size of the largest granule of the absorbent extrudate.

Where used in its as-extruded form, even after particle size reduction in accordance with the present invention has been performed, extruded pellets of such self-clumping granular absorbent, including when used as self-clumping litter, each have at least 7.5% cold water soluble binder by extruded pellet weight with at least some of an outer surface of each extruded pellet being composed of cold water soluble binder. Where particle size reduction has been performed in accordance with the present invention, each size reduced particle formed from extruded pellets that undergo particle size reduction also possess at least 7.5% cold water soluble binder by extruded pellet weight. In at least one granular absorbent embodiment, extruded pellets along with any reduced size particles formed of extruded pellets that underwent particle size reduction in accordance with the present invention contain at least 10% cold water soluble binder. In at least one other granular absorbent embodiment, extruded pellets along with any reduced size particles formed of extruded pellets that underwent particle size reduction in accordance with the present invention contain at least 15% cold water soluble binder. Such extruded granular absorbent, including when used as litter, preferably is all-natural, biodegradable, and toilet-flushable.

In a preferred extruded pellet making method pellets extruded from such admixture(s) in accordance with such preferred method(s) and extruder operating parameter(s) set forth above each advantageously contain an amount of starch physically and/or thermally modified by or during extrusion into cold water soluble binder in an amount sufficient to cause at least a plurality of pairs of wetted pellets to clump together and form clumps having a clump compressive strength of at least 300 pounds per square inch, preferably at least 400 pounds per square inch, and more preferably at least 700 pounds per square inch when compression strength tested in accordance with the litter clump compression strength test procedure set forth below:

Clump Compression Strength Test Procedure

The following equipment was utilized in carrying out extruded granular absorbent (litter) clump compression strength testing:
(1) 15 mL centrifuge tubes with screw top caps, plastic
(2) 3.0 mL disposable pipettes, plastic
(3) Distilled water
(4) Force Gauge: Mark-10 Model M7-500 S/N 3674412
(5) Motorized test stand: Model ESM303 S/N 3979431
(6) Digital control panel: Mark-10 Model DC4060 S/N 3680222
(7) DREMEL hand held high speed rotary power tool with deep cutting wheel
(8) Samples of extruded granular absorbent material (extruded pellets) to be wetted to form clumps therefrom to be compression strength tested Using the above, the following methodology was utilized in performing extruded granular absorbent (litter) clump compressive strength testing:
(1) Saw off tapered end of a 15 mL test tube, and clean off burrs.
(2) Screw on cap of test tube and fill tube with sample material to be tested.
(3) Add distilled water to sample material in test tube (1:1 by weight) to wet sample material (4) Wait 10 seconds
(5) Unscrew cap from test tube and gently push "cast" clump formed of wetted sample material out of test tube using bulbous end of a plastic pipette (snug fit).
(6) Let cast clump sit and dry for 5 days at ambient room temperature conditions.
(7) Using deep cutting wheel attached to a DREMEL high speed rotary tool at high speed greater than 10,000 RPM, cut cast clump into barrel-shaped sections each approximately 0.5 inches thick or long.
(8) Measure the diameter and length of each barrel shaped cast clump section.
(9) Place barrel shaped cast clump section on middle of compression test stand platform, with flat cut ends of barrel shaped cast clump section on top and bottom for compression testing by force gauge.
(10) Using a compression speed of 0.5 inches/minute, determine peak compression strength of barrel shaped cast clump section using force gauge.

An alternative laboratory standard or test procedure for determining clump performance when wetted with water is set forth below:

Litter Clumping Test Procedure

Purpose
This test method covers the determination of acceptable litter clumping performance.
Equipment
Buret—at least 10 mL
Buret stand with clamp
2% aqueous sea salt solution
Container greater than 3 inches in depth, preferably with a see through bottom
Litter—sample to be tested
Analytical Procedure
(1) Fill the Buret to the full/starting mark with the 2% aqueous sea salt solution.
(2) Pour the sample of litter to be tested into the dish with approximately 3 inches of leveled litter depth.
(3) With the buret approximately ¾" inch above the surface of the litter and toward the middle of the dish, release 10 mL of 2% aqueous sea salt solution at room temperature into the litter sample.
(4) Allow at least 30 seconds for clumping.
(5) Review the bottom of the container to ensure that none of the solution had reached the bottom.
(6) Remove the prepared clump from the litter.
(7) Measure the clump's depth and record the value in the appropriate records.
Results
(1) Performance results are acceptable when the clump's depth is less than that defined by the particular material's specifications, which is generally limited around 2.0-2.5 inches.
(2) Record Pass/Fail results into the appropriate records.

In a preferred method, system and pellet size reduction machine, such as the LePage corrugated roller equipped particle size reduction machine 84 schematically depicted in FIG. 2, particle size reduction is produced by reducing the size of at least a plurality of pellets extruded by at least a plurality of extruders preferably doing so substantially simultaneously upon or right after pellet extrusion. In another preferred method, system and pellet size reduction machine, particle size reduction is substantially simultaneously performed on at least a plurality of pairs of pellets, i.e., at least three, extruded substantially simultaneously by or from at least a plurality of extruders and preferably at least a plurality of pairs of extruders, i.e., at least three extruders, preferably doing so substantially simultaneously upon or right after pellet extrusion and while each one of the extruders is operating (preferably while each is substantially simultaneously discharging at least a plurality of pairs of extruded pellets per second with the particle size reduction machine processing at least a plurality of pairs of extruded pellets from each one of the extruders feeding extruded pellets thereto during each second particle size reduction machine operation).

Particle size reduction is advantageously done in a manner that produces two or more smaller sized particles from each extruded pellet that undergoes particle size reduction where each smaller sized particle has a bulk density no greater than the bulk density of the extruded pellet from which the smaller sized particles were formed. In a preferred method, system and particle size reduction machine of the present invention, such as the LePage corrugated roller equipped particle size reduction machine 84 schematically depicted in FIG. 2, each pellet undergoing pellet or particle size reduction is particle size reduced by the particle size reduction machine in a manner that produces (a) a smaller reduced size particle that is smaller in size than the extruded pellet from which the smaller reduced size particle was formed, and (b) at least one finer sized particle or fine(s) produced from the same extruded pellet that is smaller in size than the smaller reduced size particle also produced from the same extruded pellet during particle size reduction thereof. In another preferred method, system and particle size reduction machine of the present invention, each pellet undergoing pellet or particle size reduction is particle size reduced by the particle size reduction machine in a manner that produces at least one smaller sized particle and at least a plurality of fines therefrom. In still another preferred method, system and particle size reduction machine of the present invention, each pellet undergoing pellet or particle size reduction is particle size reduced by the particle size reduction machine in a manner that produces at least one smaller sized particle and at least a plurality of pairs of fines, i.e., at least three fines, therefrom.

In carrying out a preferred method of extruded pellet particle size reduction using a system that preferably includes a non-compression inducing particle size reduction machine in accordance with the present invention, a particle size reduction setting of the particle size reduction machine is set to process extruded pellets larger in size than the particle size reduction setting by reducing pellet size in a manner that breaks up these larger sized pellets into (a) at least one smaller size particle of a size smaller than that of the larger sized pellet from which it was formed, and (b) at least one even smaller size fine of a size smaller than the at least one smaller size particle. In one such preferred method, system and particle size reduction machine embodiment, the particle size reduction machine is set at a particle size reduction setting that produces at least a plurality of fines, preferably at least a plurality of pairs of fines, from each larger size extruded pellet that undergoes particle size reduction by the particle size reduction machine. In such a preferred method, system and particle size reduction machine embodiment, each larger sized extruded pellet that undergoes particle size reduction also forms at least one smaller sized particle having a size larger than each one of the fines produced therefrom in addition to the fines produced thereby.

Changing the particle size reduction setting of the particle size reduction machine, e.g., machine 84, changes the minimum size at or above which extruded pellets and/or any other particle passing through the particle size reduction machine must possess in order to be actually processed by the particle size reduction machine in a manner that preferably reduces pellet size or incoming particle size by breaking off one or more pieces therefrom during particle size reduction. Pellets and any other particles passing through the particle size reduction machine of a size smaller than the particle size reduction setting of the particle size reduction machine preferably pass through the particle size reduction machine substantially completely untouched or unprocessed by the particle size reduction machine.

In a preferred particle size reduction machine embodiment, pellets and any other particles entering the particle size reduction machine pass through substantially untouched where their maximum extent, i.e., largest portion, whether it be the length, width, and/or thickness of the pellet or entering particle, is smaller than or less than the particle size reduction setting of the particle size reduction machine. In such a preferred particle size reduction machine embodiment, pellets and any other particles entering the particle size reduction machine having a maximum extent, i.e., largest portion, whether it be the length, width, and/or thickness of the pellet or entering particle, greater than or larger than the particle size reduction setting of the particle size reduction machine are processed by the particle size reduction machine reducing their particle size via non-compression induced particle size reduction. Such a preferred particle size reduction machine performs non-compression induced particle size reduction by shearing, tearing, cutting, slitting, twisting and/or pulling each larger sized pellet or other larger sized particle of a size greater than the particle size reduction setting of the particle size reduction machine such that the particle size reduction machine thereby shears off one or more pieces or portions therefrom, tears off one or more pieces or portions therefrom, cuts off one or more pieces or portions therefrom, slits one or more pieces or portions therefrom, twists off one or more pieces or portions therefrom, and/or pulls off one or more pieces or portions therefrom.

By reducing the size of pellets and/or other particles of a size greater than the particle size reduction setting of the particle size reduction machine via shearing, tearing, cutting, slitting, twisting and/or pulling particle size reduction is advantageously accomplished without compressing or compacting the larger sized pellet and/or larger sized particle undergoing particle size reduction such that densification does not occur, pores and internal voids remain open and substantially intact, and the matrix of each pellet and/or particle, including the smaller sized particles and fines formed therefrom during particle size reduction, remains substantially unaffected. In addition, because particle size reduction is accomplished through contact or engagement with larger sized pellets and/or larger sized particles that shears, tears, twists, cuts, slits, and/or pulls apart the larger sized pellets and/or larger sized particles undergoing particle size reduction, the bulk density of each smaller sized particle and each one of the fines formed by such particle size reduction has a bulk density no greater than and preferably less than the bulk density of the larger sized pellets and/or larger sized particles prior to undergoing particle size reduction. This shearing action, tearing action, twisting action, cutting action, slitting action and/or pulling apart action on each larger sized pellet and/or larger sized particle undergoing such non-compression induced particle size reduction in accordance with the present invention preferably not only reduces bulk density in the smaller sized particles and fines produced during particle size reduction, but also opens up the void filled interior of each larger sized pellet and/or larger sized particle and all reduced size particles and fines formed therefrom thereby advantageously not only improving and/or increasing absorption during granular absorbent use but also increasing and/or speeding the rate or speed at which absorption or liquid uptake occurs during granular absorbent use.

Such a preferred method, system and particle size reduction machine in accordance with the invention performs such non-compression induced or non-compression particle size reduction in a manner that requires less energy during particle size reduction advantageously minimizing and preferably substantially completely preventing heating of pellets and/or other particles passing through the particle size reduction machine in a manner that substantially changes or otherwise adversely affects or impacts the internal matrix, including starch matrix, of each pellet or particle being particle sized reduced and/or passing through. Heating preferably is minimized sufficiently enough to also prevent starch retrogradation from occurring, to also prevent any change in form or phase of starch from taking place, as well as to also prevent any other change or transition to starch from happening thereby preserving optimal absorbent performance so absorption capacity and/or absorption rate is at least as great in the size reduced particles as the absorption capacity and/or absorption rate of the pellets and/or particles entering the particle size reduction machine. In at least one method implementation, system and/or particle size reduction machine embodiment, such low energy non-compression induced or non-compression particle size reduction carried out by such a particle size reduction machine constructed in accordance with the present advantageously minimizes and preferably substantially completely prevents larger sized pellets and/or larger sized particles undergoing particle size reduction from heating and increasing their temperature by no more than four degrees Celsius, preferably no more than two degrees Celsius, and more preferably no more than one degree Celsius during particle size reduction.

In a preferred method implementation and embodiment, the present invention is directed to a method, system and pellet size reduction machine that preferably is or includes a roll granulator or granulating mill of non-compression induced particle size reduction construction that reduces the size of extruded pellets and/or other granular absorbent granules or particles passing by processing extruded pellets and/or other granular absorbent granules or particles in a manner that performs (a) tensile/tensile stress or force induced particle size reduction, (b) shear or shear stress or force induced particle size reduction, and/or (c) torsion or twisting stress or force induced particle size reduction thereby advantageously substantially completely preventing or avoiding formation of any compressed or compact regions on or in any reduced size particle produced in accordance with the present invention. In a preferred method and system, a preferred roll granulator or granulating mill 84 configured to perform such non-compression induced particle size reduction has a pair of spaced apart rolls, preferably LePage corrugated circle-chill rolls 80 and 82, which rotate during non-compression induced particle size reduction to perform particle size reduction in a manner that shears, pulls apart and/or twists apart pellets having a size wider and/or longer than a preset and preferably selectively variable space or spacing of a gap between the rolls. In a preferred method and embodiment, one of the rolls preferably rotates during particle size reduction at a rotational speed in revolutions per minute that is greater than a rotational speed of the other one of the rolls.

The gap spacing between the rolls can be selectively and preferably relatively precisely varied or set providing a particle size reduction setting of such a roll-type particle size reduction machine of non-compression inducing particle size reduction construction that can be selectively set and/or varied to determine a minimum pellet or particle size at or greater than which an extruded pellet or particle entering the particle size reduction machine must possess or be in order for non-compression induced particle size reduction to be performed by the particle size reduction machine. Varying the particle size reduction setting by selectively setting the space or spacing between the rolls can also be one, including dynamically during extruder and particle size reduction machine operation to relatively precisely control the size, amount and/or ratio of more finely sized particles produced from extruded pellets and other particle entering the particle size reduction machine having a length and/or width at least as great as and preferably greater than the particle size reduction setting. Increasing the particle size reduction setting by increasing the size of the gap between the rolls of the machine correspondingly and preferably proportionally increases the size of the fines produced while at the same time correspondingly and preferably decreasing the amount of fines produced during particle size reduction machine operation. Conversely, decreasing the particle size reduction setting by decreasing the size of the gap between the rolls of the machine correspondingly and preferably proportionally decreases the size of the fines produced while at the same time correspondingly and preferably increasing the amount of fines produced during particle size reduction machine operation.

In this manner, the particle size reduction setting of such a particle size reduction machine can be and preferably is set relative to the largest size of pellets being extruded by each extruder feeding the particle size reduction machine in order to increase or decrease the amount of fines produced from the extruded pellets. In this manner, the particle size reduction setting of such a particle size reduction machine inline with the discharge end of one or more extruders feeding extruded pellets to the particle size reduction machine can be and preferably is selectively varied to correspondingly increase (by decreasing the spacing or gap in changing the particle size reduction setting) the ratio or total amount of fines in the final granular absorbent product or correspondingly decrease (by increasing the spacing or gap in changing the particle size reduction setting) the ratio or total amount of fines in the final granular absorbent product to achieve a desired ratio or ratio range of fines in the final granular absorbent product. In a preferred method, system and particle size reduction machine, the fines ratio of the final granular absorbent product being produced during extruder and inline particle size reduction machine operation is monitored in real time and (a) the spacing or gap between the rolls is automatically adjusted to increase the spacing or gap to particle size reduce fewer pellets and hence produce fewer fines where less fines are needed to achieve the desired minimum fines ratio in the final granular absorbent product, and/or (b) the spacing or gap between the rolls is automatically adjusted to decrease the spacing or gap to particle size reduce more pellets and hence produce more fines where more fines are needed to achieve the desired minimum fines ratio in the final granular absorbent product.

In a preferred method, system and particle size reduction machine embodiment and configuration, the particle size reduction setting is set and/or varied in order to produce enough fines having a particle size no larger than 14 US sieve (and having a particle size between 14 US sieve and 60 US sieve or between 14 US sieve and 80 US sieve) during particle size reduction of extruded pellets of a size larger than the particle size reduction setting in order for the resultant final granular absorbent product, e.g., final granular absorbent blend or final granular absorbent mixture ready for packaging, shipment and sale, to contain at least 10% fines by total weight of the final granular absorbent product and no more than 50% fines by total weight of the final granular absorbent product. In one such preferred method, system and particle size reduction machine embodiment and configuration, the particle size reduction setting is set and/or varied in order to control the size of the gap or spacing between the rolls to produce enough fines having a particle size no larger than 14 US sieve (and having a particle size between 14 US sieve and 60 US sieve or between 14 US sieve and 80 US sieve) during particle size reduction of extruded pellets of a size (largest extent of pellet) larger than the gap size or roll spacing in order for the resultant final granular absorbent product, e.g., final granular absorbent blend or final granular absorbent mixture ready for packaging, shipment and sale, to contain at least 15% fines by total weight of the final granular absorbent product and no more than 40% fines by total weight of the final granular absorbent product. Where the final granular absorbent blend product is litter or intended for use as animal, pet or cat litter, such a preferred method, system and particle size reduction machine embodiment is operated in a manner where the size of the gap or spacing between rolls is set and preferably varied in real time during extruder operation to produce self-clumping cat litter in accordance with the present invention preferably having at least 15% fines by total weight of the final self-clumping litter product in order to prevent vertically extending clumps ("stalactite clumps") from forming in the litter box during urination by a cat during litter use and preferably having no more than 40% fines by total weight of the final litter product in order to prevent urine from pooling on top of the surface of litter in the litter box during cat urination during litter use.

In another such preferred method, system and particle size reduction machine embodiment and configuration, the particle size reduction setting is set and/or varied in order to control the size of the gap or spacing between the rolls to produce enough fines having a particle size no larger than 14 US sieve (and having a particle size between 14 US sieve and 60 US sieve or between 14 US sieve and 80 US sieve) during particle size reduction of extruded pellets of a size (largest extent of pellet) larger than the gap size or roll spacing in order for the resultant final granular absorbent product, e.g., final granular absorbent blend or final granular absorbent mixture ready for packaging, shipment and sale, to contain at least 20% fines by total weight of the final granular absorbent product and no more than 40% fines by total weight of the final granular absorbent product. Where the final granular absorbent blend product is litter or intended for use as animal, pet or cat litter, such a preferred method, system and particle size reduction machine embodiment is operated in a manner where the size of the gap or spacing between rolls is set and preferably varied in real time during extruder operation to produce self-clumping cat litter in accordance with the present invention preferably having a sufficient amount of fines in excess of the minimum 15% fines by total weight of the final self-clumping litter product needed for proper generally horizontal litter clumping, preferably having at least 20% fines (i.e. contain at least 5% excess fines), in order to prevent vertically extending clumps ("stalactite clumps") of urine wetted pellets, particles and fines from forming in the litter box during urination by a cat during litter use and to ensure any clumps of such urine wetted pellets, particles and fines properly form in the litter box during cat urination on top of the litter box and extend generally horizontally on top of the litter in the litter box. Controlling the particle size reduction setting, i.e., gap size or roll spacing, in order to ensure at least 5% excess fines are produced helps ensure there will be at least 15% fines by total litter product in the litter box when at least half of the litter in the litter box has been spent or used because fines are spent or used more rapidly in a greater amount than the extruded pellets and other larger size particles in the litter box having a size larger than the fines (preferably having a size larger than 14 US sieve and preferably no greater than 7 US sieve or 8 US sieve).

In still another such preferred method, system and particle size reduction machine embodiment and configuration, the particle size reduction setting is set and/or varied in order to control the size of the gap or spacing between the rolls to produce enough fines having a particle size no larger than 14 US sieve (and having a particle size between 14 US sieve and 60 US sieve or between 14 US sieve and 80 US sieve) during particle size reduction of extruded pellets of a size (largest extent of pellet) larger than the gap size or roll spacing in order for the resultant final granular absorbent product, e.g., final granular absorbent blend or final granular absorbent mixture ready for packaging, shipment and sale, to contain at least 25% fines by total weight of the final granular absorbent product and no more than 45% fines by total weight of the final granular absorbent product. Where the final granular absorbent blend product is litter or intended for use as animal, pet or cat litter, such a preferred method, system and particle size reduction machine embodiment is operated in a manner where the size of the gap or spacing between rolls is set and preferably varied in real time during extruder operation to produce self-clumping cat litter in accordance with the present invention preferably having a sufficient amount of fines in excess of the minimum 15% fines by total weight of the final self-clumping litter product needed for proper horizontal clumping, preferably having at least 25% fines (i.e. contain at least 10% excess fines), in order to prevent vertically extending clumps ("stalactite clumps") of urine wetted pellets, particles and fines from forming in the litter box during urination by a cat during litter use and to ensure any clumps of such urine wetted pellets, particles and fines properly form in the litter box during cat urination on top of the litter box and extend generally horizontally on top of the litter in the litter box. Controlling the particle size reduction setting, i.e., gap size or roll spacing, in order to ensure at least 10% excess fines are produced helps ensure there will be at least 15% fines by total litter product in the litter box when at least half of the litter in the litter box has been spent or used because fines are spent or used more rapidly in a greater amount than the extruded pellets and other larger size particles in the litter box having a size larger than the fines (preferably having a size larger than 14 US sieve and preferably no greater than 8 US sieve).

It is contemplated that a particle size reduction machine constructed and configured in accordance with the present invention is included in the extruded granular absorbent making and processing system and line shown and described in U.S. Patent Application Publication No. 20150145164, the entirety of which is expressly incorporated herein by reference. Such a method, system and particle size reduction machine of the present invention also facilitates cold post-extrusion processing of pellets extruded by one or more extruders that are processed in the manner shown and described in U.S. Patent Application Publication No. 20150145164 including during pneumatic conveyor transport. In a preferred extruded granular absorbent processing line, a particle size reduction machine constructed and configured in accordance with the present invention is disposed in line with the pneumatic conveyor, preferably located at the end of the conveyor, such that pellets extruded from each extruder feeding into the conveyor are ultimately transported to the particle size reduction machine for cold particle reduction processing of extruded pellets and other particles delivered thereto that have a size greater than the gap size or roll spacing particle size reduction setting. The rest of the pellets, other particles, and fines created during and after extrusion of a size smaller than the gap size or roll spacing particle size reduction setting preferably pass through the gap or spacing between the rotating rollers of the particle size reduction machine without being particle size reduced. After passing through the particle size reduction machine, the pellets, reduced size particles, other smaller sized particles, and fines preferably form a final granular absorbent mixture or blend product containing a suitably acceptable ratio or minimum product percentage of fines that is ready for packaging, shipment, sale and end use.

In a particularly preferred particle size reduction method and system, particle size reduction processing of extruded pellets and/or other extruded granular absorbent particles is carried out in a cold-processing particle size reduction method, system and/or step of the present invention where the temperature of extruded pellets and any other extruded granular absorbent particles undergoing particle size reduction rises no more than two degrees Celsius during particle size reduction, preferably rises no more than one degree Celsius during particle size reduction, and more preferably rises no more than one-half of a degree Celsius during particle size reduction. Where the method and system is or includes such cold-processing particle size reduction, non-compression induced cold-processed particle size reduction is performed such that the temperature of any extruded pellets and/or other extruded granular absorbent particles rises no more than two degrees Celsius during particle size reduction, preferably rises no more than one degree Celsius during particle size reduction, and more preferably rises no more than one-half of a degree Celsius during particle size reduction.

The method(s) and system(s) of the present invention, including any equipment for performing non-compression induced pellet and other extruded granular absorbent particle size reduction is well suited for use with and/or in making (a) water-absorbing granular absorbent (and finished/final water-absorbing granular absorbent product), (b) oil-absorbing granular absorbent (and finished/final oil-absorbent granular absorbent product), (c) granular absorbent well suited for use in oil-absorbing and water-absorbing applications including ints its finished/final oil and water absorbing granular absorbent finished product, and/or (d) animal, pet and/or cat litter including finished/final litter product composed of such non-compression induced particle size reduced pellets.

Understandably, the present invention has been described above in terms of one or more preferred embodiments and methods. It is recognized that various alternatives and modifications may be made to these embodiments and methods that are within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

The invention claimed is:

1. A method of making extruded granular sorbent comprising:
   (a) providing an extruder and a starch-containing admixture;
   (b) pressurizing the starch-containing admixture in the extruder to a pressure of at least 2000 pounds per square inch (i) gelatinizing at least some of the starch of the starch-containing admixture in the extruder, and (ii) modifying at least some of the starch of the starch-containing admixture in the extruder into a water-soluble binder that is cold water soluble at room temperature; and
   (c) extruding the pressurized starch-containing admixture from the extruder producing a water absorbent and oil adsorbent extrudate discharged from the extruder with the absorbent extrudate containing (i) gelatinized starch, and (ii) water-soluble binder, the water absorbent and oil adsorbent extrudate comprising a self-clumping extruded granular sorbent having at least 10% by extruded granular sorbent weight of the cold water-soluble binder that is water soluble at room temperature that forms a clump of the extruded granular sorbent when wetted with water or urine, the self-clumping extruded granular sorbent absorbing or adsorbing at least two times the dry or unwetted weight of the extruded granular sorbent in water or urine wetting the extruded granular sorbent within two seconds of the water or urine first making contact with or wetting the extruded granular sorbent.

2. The method of claim 1, wherein the at least 10% cold water-soluble binder in the extruded granular sorbent is formed of starch in the starch-containing admixture modified by application of an ultrahigh extrusion pressure of at least 2500 PSI while in the extruder and/or during extrusion from the extruder forming the water-soluble binder in the extruded granular sorbent.

3. The method of claim 1, wherein the at least 10% cold water-soluble binder in the extruded granular sorbent is formed of starch in the starch-containing admixture that is physically modified within the extruder by and/or during application of an ultrahigh extrusion pressure of at least 2000 PSI while in the extruder.

4. The method of claim 1, wherein the at least 10% cold water-soluble binder in the extruded granular sorbent is formed of starch in the starch-containing admixture that is physically modified and thermally modified within the extruder by and/or during application of an ultrahigh extrusion pressure of at least 2000 PSI while in the extruder.

5. The method of claim 1, wherein the extruder granular sorbent swells up by at least 3% when wetted with enough water or urine to cause the extruded granular sorbent to hold at least three times the weight of the extruded granular sorbent in water or urine.

6. The method of claim 1, wherein the extruder granular sorbent swells up by at least 5% when wetted with water or urine.

7. The method of claim 1, wherein the cold water-soluble binder in the extruded granular sorbent is water soluble at a temperature of less than 75 degrees Fahrenheit.

8. The method of claim 1, wherein all of the water-soluble binder in the extruded granular sorbent is cold water-soluble binder that is water soluble at room temperature.

9. The method of claim 1, wherein application of the ultrahigh pressure of at least 2000 PSI to the starch-containing admixture in the extruder modifies starch within the extruder such that the extruder extrudes granular sorbent with modified starch that causes the extruded granular sorbent to swell at least 1% in size when wetted with water or urine.

10. The method of claim 1, wherein application of the ultrahigh pressure of at least 2000 PSI to the starch-containing admixture in the extruder physically modifies starch within the extruder such that the extruder extrudes granular sorbent containing physically-modified starch that swells at least 1% in size when wetted with water or urine.

11. The method of claim 1, wherein application of the ultrahigh pressure of at least 2000 PSI to the starch-containing admixture in the extruder physically and thermally modifies starch within the extruder such that the extruder extrudes granular sorbent containing physically and thermally modified starch that swells at least 1% in size when wetted with water or urine.

12. The method of claim 1, wherein application of the ultrahigh pressure of at least 2000 PSI to the starch-containing admixture in the extruder gelatinizes starch within the extruder that is physically modified and/or thermally modified by or during ultrahigh pressure extrusion producing extruded granular sorbent that swells at least 3% in size when the extruded granular absorbent is wetted with water or urine.

13. The method of claim 1, wherein retention of the at least some of the water or urine by the extruded granular sorbent wetted thereby causes the extruded granular sorbent to swell at least 1% in size compared to the size of the extruded granular sorbent before being wetted with the water or urine.

14. The method of claim 13, wherein retention of water or urine by the extruded granular sorbent is due to one of absorption and adsorption of at least some of the water or urine by the extruded granular sorbent.

15. The method of claim 1, wherein the starch matrix within the extruded granular sorbent formed by the application of ultrahigh extrusion pressure of at least 2000 PSI is comprised of cold water soluble starch that facilitates holding or retention within the extruded sorbent absorbent of at least some of the water or urine wetting the extruded granular sorbent and causing at least some swelling of the wetted extruded granular sorbent.

16. The method of claim 1, wherein the starch matrix within the extruded granular sorbent formed by the application of ultrahigh extrusion pressure of at least 2000 PSI is comprised of cold water soluble starch that substantially instantly solubilizes within one second when wetted by water or urine thereby facilitating holding or retention within the extruded granular sorbent of at least some of the water or urine first coming into contact with and wetting the extruded granular sorbent.

17. The method of claim 1, wherein the extruded granular sorbent absorbs and/or adsorbs at least one times the dry or unwetted weight of the extruded granular sorbent in water or urine wetting the extruded granular absorbent within about one-quarter second of the water or urine first making wetting contact with the extruded granular sorbent.

18. The method of claim 1, wherein the extruded granular sorbent absorbs and/or adsorbs at least two times the dry or unwetted mass of the extruded granular sorbent in water or urine wetting the extruded granular sorbent within about one-half second of the water or urine first making wetting contact with the extruded granular sorbent.

19. The method of claim 1, wherein the extruded granular sorbent absorbs and/or adsorbs at least three times the dry or unwetted weight of the extruded granular sorbent in water or urine wetting the extruded granular sorbent within one second of the water or urine first making wetting contact with the extruded granular sorbent.

20. The method of claim 1, wherein the extruded granular sorbent absorbs and/or adsorbs at least four times the dry or unwetted weight of the extruded granular sorbent in water or urine wetting the extruded granular sorbent within one second of the water or urine first making wetting contact with the extruded granular sorbent.

21. The method of claim 1, wherein the extruded granular sorbent absorbs and/or adsorbs at least five times the dry or unwetted weight of the extruded granular sorbent in water or urine wetting the extruded granular sorbent within two seconds of the water or urine first making wetting contact with the extruded granular sorbent.

22. The method of claim 1, wherein the extruded granular sorbent swells up by at least 3% when wetted with water or urine and the water of urine wetting the extruded granular sorbent is absorbed by the extruded granular sorbent.

23. The method of claim 1, wherein the extruded granular sorbent swells up by at least 5% when wetted with enough water or urine to cause the extruded granular sorbent to hold at least one times the weight of the extruded granular sorbent in water or urine.

24. The method of claim 1, wherein the extruded granular sorbent swells up by at least 5% when wetted with enough water or urine to cause the extruded granular sorbent to hold at least two times the weight of the extruded granular sorbent in water or urine.

25. The method of claim 1, wherein the extruded granular sorbent swells up by at least 5% when wetted with enough water or urine to cause the extruded granular sorbent to hold at least three times the weight of the extruded granular sorbent in water or urine.

26. The method of claim 1, wherein the extruded granular sorbent has at least 12.5% cold water soluble binder formed by ultrahigh pressure extrusion at an ultrahigh extrusion pressure of at least 2500 PSI.

27. The method of claim 1, wherein the extruded granular absorbent is comprised of at least a plurality of pairs of granules thereof; further comprising the additional step of making a granular absorbent product comprised of at least a plurality of pairs of the extruded granular sorbent and at least a plurality of pairs of a non-extruded granular material; and wherein the proportion of granules of the extruded granular absorbent relative to the granules of the non-extruded granular material is great enough for at least a plurality of the extruded granular absorbent granules and at least a plurality of non-extruded granular material granules to agglutinate into a clump thereof when at least the plurality of the extruded granular absorbent granules is wetted with water or urine.

28. The method of claim 27, wherein the granules of non-extruded granular material are each comprised of a non-absorbent material.

29. The method of claim 28, wherein the granules of non-extruded non-absorbent granular material each have an imperforate outer surface.

30. The method of claim 28, wherein the granules of non-extruded non-absorbent granular material each have a smooth outer surface.

31. The method of claim 28, wherein the granules of non-extruded non-absorbent granular material are each comprised of plastic or glass.

32. The method of claim 28, wherein the granules of non-extruded non-absorbent granular material are in the form of balls, pellets or beads.

33. The method of claim 32, wherein the granules of non-extruded non-absorbent granular material each have an imperforate outer surface.

34. The method of claim 33, wherein the granules of non-extruded non-absorbent granular material are each comprised of plastic or glass.

35. The method of claim 32, wherein the granules of non-extruded non-absorbent granular material each have a smooth outer surface.

36. The method of claim 35, wherein the granules of non-extruded non-absorbent granular material are each comprised of plastic or glass.

37. The method of claim 27, wherein the proportion of the non-extruded granular material relative to the extruded granular sorbent is at least 30% of the non-extruded granular material and no more than 70% of the extruded granular sorbent.

38. The method of claim 37, wherein the granules of non-extruded granular material are each comprised of a non-absorbent material.

39. The method of claim 37, wherein the granules of non-extruded granular material each have an imperforate outer surface.

40. The method of claim 37, wherein the granules of non-extruded granular material have a smooth outer surface.

41. The method of claim 37, wherein the granules of non-extruded granular material are comprised of plastic or glass.

42. The method of claim 37, wherein the granules of non-extruded granular material are in the form of balls, pellets or beads.

43. The method of claim 42, wherein the granules of non-extruded granular material are non-absorbent and have an imperforate outer surface.

44. The method of claim 42, wherein the granules of non-extruded granular material are comprised of plastic or glass.

45. The method of claim 42, wherein the granules of non-extruded granular material have a smooth outer surface.

46. The method of claim 45, wherein the granules of non-extruded granular material are comprised of plastic or glass.

* * * * *